United States Patent
Kinoshita

(10) Patent No.: US 6,580,549 B1
(45) Date of Patent: Jun. 17, 2003

(54) WAVELENGTH-MULTIPLEXED LIGHT AMPLIFYING APPARATUS, OPTICAL AMPLIFIER AND OPTICAL ADD-AND-DROP APPARATUS USING WAVELENGTH-MULTIPLEXED LIGHT AMPLIFYING BASIC UNIT

(75) Inventor: Susumu Kinoshita, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/632,588

(22) Filed: Aug. 4, 2000

Related U.S. Application Data

(63) Continuation-in-part of application No. 09/490,845, filed on Jan. 24, 2000, now Pat. No. 6,426,832.

(30) Foreign Application Priority Data

Feb. 5, 1999 (JP) .............................. 11-029350
Jan. 19, 2000 (JP) ......................... 2000-10510

(51) Int. Cl.$^7$ ................................................ H01S 3/00
(52) U.S. Cl. ................... 359/337; 359/341.41; 359/349
(58) Field of Search ........................... 359/337, 341.41, 359/349

(56) References Cited

U.S. PATENT DOCUMENTS 5,644,423 A * 7/1997 Iwano ......................... 359/337
5,986,800 A * 11/1999 Kosaka ....................... 359/341

FOREIGN PATENT DOCUMENTS

JP 3-123323 5/1991

OTHER PUBLICATIONS

"A Design of 1 Tbps Throughput Optical Switch Using Semiconductor Optical Amplifier Gate" by S. Takahashi, et al. of C&C Media Research Laboratories, NEC Corporation, Sep. 7, 1998.

"10 Gb/s Optical Data Link for Tb/s Throughput Optical Switch" by H. Takahashi, et al. of C&C Media Research Laboratories, NEC Corporation, Sep. 7, 1998.

"Method for Constructing Optical Fiber Amplifier and Technique for Controlling the Same" by S. Kinoshita of Fujitsu Limited.

"10 Gbit/s/port, 256x256 WD/SD Optical Crossbar Switch Using Semiconductor Optical Amplifier Gates" by Y. Suemura, et al. of Optical–electronics Research Laboratories, NEC Corporation.

* cited by examiner

Primary Examiner—Mark Hellner
(74) Attorney, Agent, or Firm—Staas & Halsey LLP

(57) ABSTRACT

The present invention relates to a wavelength-multiplexed light amplifying apparatus to be used in a state of being connected to a branching portion of a multiplexing/branching unit or to be used for a m×n matrix optical switch of an optical cross-connect. The wavelength-multiplexed light amplifying apparatus is composed of a plurality of wavelength-multiplexed light amplifying units and an optical feedback loop system. A signal input port of an optical branching section in one wavelength-multiplexed light amplifying unit is connected to an output side of an optical amplifying section in the preceding wavelength-multiplexed light amplifying unit. This configuration disperses the power loss of an optical signal to perform amplification with high efficiency and further enables the expansion of the branching port in the in-service. Additionally, it can eliminate the need for the installation of an optical isolator or reduce the required value of isolation to stabilize the system, or can accomplish the control to maintain the gains of all ports constant.

65 Claims, 19 Drawing Sheets

WAVELENGTH-MULTIPLEXED LIGHT AMPLIFYING APPARATUS, OPTICAL AMPLIFIER AND OPTICAL ADD-AND-DROP APPARATUS USING WAVELENGTH-MULTIPLEXED LIGHT AMPLIFYING BASIC UNIT

CROSS-REFERENCE TO RELATED APPLICATION

This application is a Continuation-In-Part (CIP) of U.S. patent application Ser. No. 09/490,845, filed Jan. 24, 2000 now U.S. Pat. No. 6,426,832 now pending, the disclosure of which is incorporated herein by reference.

BACKGROUND OF THE INVENTION

1. Field of the Invention

The present invention relates to a wavelength-multiplexed light amplifying apparatus, an optical amplifier, and further to an optical add-and-drop apparatus (optical ADM:Optical Add-Drop Multiplexer) using a wavelength-multiplexed light amplifying basic unit.

2. Description of the Related Art

In recent years, the improvement of the transmission technology using an optical fiber has developed enterprises related to point-to-point wavelength division multiplexing (WDM), where the technical development for a photonic network has taken place extensively. This photonic network signifies a network which uses optical wavelengths as identification information for multiplexing and non-multiplexing. As one of the features the photonic network has, there is an optical add-and-drop function. The dropping function of an optical add-and-drop unit in this photonic network is realizable by a broadcast function. This broadcast function means a function of distributing the directions multiplexed signals advance in, but not different from a function of demultiplexing an optical signal power. Referring to FIG. 18, a description will be given hereinbelow of the broadcast function according to a conventional technique.

FIG. 18 is an illustration of one example of configuration of an optical add-and-drop multiplexer. For instance, let it be assumed that, when an optical signal comprising a plurality of wavelengths (ch1 to ch64) multiplexed is transmitted from a city A positioned on the left side in FIG. 18 to a city B positioned on the right side in the same illustration, in a city C lying between these cities A and B, of these wavelengths, ch1 to ch32 are dropped, whereas different ch1 to ch32 are instead added thereto. In this instance, ch33 to ch64 are passed through. A wavelength-multiplexed optical signal coming from the left side in FIG. 18 is amplified in an optical amplifier 70a while another optical signal coming through an adding section 70d is then added thereto in an AOTF (AcoustoOptical Tunable Filter) 70b. Furthermore, a portion of the first-mentioned optical signal is dropped and inputted to a branching section 71, while the second-mentioned optical signal is amplified in an optical amplifier 70c and then transmitted to the right side in FIG. 18. This AOTF 70b is a convenient device while it is difficult to make it. AOTF 70b can drop ch1 to ch32 and newly add ch1 to ch32. Herein, the channel number is equivalent to the assigned wavelength. For example, when ch1 is dropped in the AOTF 70b, ch1 becomes totally empty so that another information can be assigned to ch1 and added thereto. On the other hand, after the optical signal dropped in the AOTF 70b is amplified in an EDF optical amplifier (Erbium-doped Fiber Optical Amplifier) 71a, its optical signal power is divided or split in an optical coupler 71b and subsequently inputted to tunable filters 72 so that the wavelength-multiplexed optical signal appears at each port. In this case, the reason for the amplification in the EDF optical amplifier 71a is that, for example, if an optical signal is divided into 1000, its power reduces to 1/1000. That is, a need for the amplification exists for maintaining the original power. In addition, the optical signal is distributed through the use of a splitter not having a wavelength characteristic or an AWG (Arrayed Waveguide Grating) having a wavelength characteristic. That is, a component for realizing this optical add-and-drop function utilizes a property of changing its advancing direction in accordance with an optical wavelength. When a wavelength-multiplexed light is distributed in relation to each desired wavelength in this way, since that distribution is made after it is amplified up to an extremely high output level in an optical amplifying system, the loss of the optical signal in the latter section of the EDF optical amplifier 71a has great influence on the efficiency. This efficiency signifies the efficiency of conversion from an excitation optical power into a signal optical power.

In FIG. 18, let it be assumed that the dropped 32ch-wavelength-multiplexed signal is distributed or branched into 16 ports. Additionally, let it be assumed that 0 dBm per 1ch (which will be referred to hereinafter as 0 dBm/ch) is kept as an optical signal quality at each branch (division) port. In this case, for maintaining 0 dBm/ch at the optical signal quality at each branch port, an output power at each branch port requires 15 dBm (32 mW for 32 ch), and a value forming the sum of 15 dBm and a theoretical limit value on the division into 16 becomes necessary at an output terminal of the EDF optical amplifier 71a. This theoretical limit value signifies the value of the original optical signal needed for the optical signal to have a given quality after the division. As well known, when the original optical signal is divided into two, each of the optical signals after the division results in the loss of 3 dB as compared with the original value, and when being divided into 16, each of the optical signals after the division suffers a loss of 12 dB as compared with the original value. Accordingly, when one optical signal is divided into 16, the original optical signal is required to have a value larger by at least 12 dB than the power value of each of the divided optical signals. In other words, in the case that one optical signal is divided into 16, the theoretical limit value of the output power of the EDF optical amplifier 71a becomes 12 dB, and in this instance, the needed value at the output terminal of the EDF optical amplifier 71a comes to 15 dBm+12 dBm=27 dBm. Additionally, taking into consideration an excess loss of the distribution (branch) optical coupler 71b, the output power of (27+α) dBm becomes necessary at the output terminal of the EDF optical amplifier 71a. In the following description, this value α will be taken as 2 dB, for example. That is, the output power of 29 dBm becomes necessary at the output terminal of the EDF optical amplifier 71a.

On the other hand, looking at a system of input to this EDF optical amplifier 71a, since 0 dBm/ch is needed while 32 ch is dropped, the total input power to the EDF optical amplifier 71a comes to 15 dBm. Besides, this EDF optical amplifier 71a is made up of optical parts such as an optical isolator and an optical coupler, which causes a loss of approximately 2 dB. In consequence, a large output of 31 dBm(=27+2+2=1260 mW) develops at the output terminal of an EDFA (Erbium-Doped Fiber Amplifier) (not shown) in the EDF optical amplifier 71a, while the output terminal of the EDF optical amplifier 71a produces 29 dBm(=790 mW). Additionally, assuming that the conversion efficiency from an excitation light to a signal light in the EDF optical amplifier 71a is 50%, the required excitation power reaches 1580 mW.

Thus, the operating conditions of this optical amplifying section 71a are as follows.

1) input power: 15 dBm (0 dBm/ch, 32 waves)
2) output power: 29 dBm (31 dBm at the output terminal of EDFA)
3) gain: 14 dB
4) required excitation power: 1580 mW From this, it is found that a large signal optical power of 1260 mW×0.37=470 mW (1260 mW=31 dBm) disappears between the output terminal of the EDF optical amplifier 71a and the output terminal of the optical amplifying section 71a. That is, since an excess loss (0.37; corresponding to −2 dB) occurs at the time when the signal power rises, the useless signal power increases. Additionally, even if the divisions is small in number, because a high-output optical amplifier becomes necessary at the initial introduction, the initial investment becomes higher.

For this reason, there is a need to realize the broadcast function efficiently. That is, if a broadcast system with higher efficiency is realized, a signal with a desired wavelength becomes selectable in a manner that an optical filter for performing wavelength selection at every port is placed at a spot subsequent to the point of distribution of the optical signal, and the flexible distribution becomes feasible. Besides, if realized, this broadcast function is also applicable to a distribution system such as an optical subscriber system.

In addition, Japanese Laid-Open (Kokai) HEI 3-123323 (which will be referred to hereinafter as a publication) discloses a technique on a fiber coupler for preventing the reduction of the optical intensity, occurring whenever the division takes place, to considerably increase the dividable hierarchies. FIG. 19 shows an arrangement of this fiber coupler. In the arrangement shown in FIG. 19, fiber couplers are combined to provide three division hierarchies, where a signal light $S_0$ inputted to an input section 3 is introduced into a branching section 2 while an excitation light P inputted to another input section 3 is also led to the branching section 2 so that they are distributed to an output sides 4 of an optical fiber and then transmitted to amplification fibers 5. The signal light amplified in the amplification fiber 5 is subsequently distributed through a second branching section 12 to second optical fibers 13 and further distributed through third branching sections 14 to third optical fibers 15, thus outputting signal lights $S_1$ to $S_8$ therefrom.

However, the technique disclosed by this publication relates to light with a single wavelength, but the publication does not refer to a technique on wavelength-multiplexed light at all.

SUMMARY OF THE INVENTION

The present invention has been developed with a view to eliminating the above-mentioned problems, and it is therefore an object of the invention to provide a wavelength-multiplexed light amplifying apparatus and an optical amplifier to be connected to branch ports of an add-and-drop apparatus for adding a wavelength multiplexed optical signal and for dropping and outputting a wavelength multiplexed optical signal, or a wavelength-multiplexed light amplifying apparatus and an optical amplifier to be used for an m×n matrix optical switch in an optical cross-connect unit, where basic amplifying units to which 1:1 optical couplers and EDFAs are coupled alternately are connected in a multistage fashion to distribute a power loss of an optical signal for accomplishing a high-efficiency amplification, to enable the expansion of the branch ports on the in-service, to render an optical isolator unnecessary or reduce the required isolation value for stabilizing the system, and to implement control so that the gains at all the ports are maintained constant, and further to provide an optical add-and-drop apparatus using a wavelength-multiplexed light amplifying basic unit.

For this purpose, in accordance with this invention, there is provided a wavelength-multiplexed light amplifying apparatus comprising a plurality of wavelength-multiplexed light amplifying units, with a signal input port of an optical branching section in one wavelength-multiplexed light amplifying unit connected to an output side of an optical amplifying section in the preceding wavelength-multiplexed light amplifying unit, and an optical feedback loop system.

Thus, as compared with the case of amplifying a wavelength-multiplexed optical signal as a whole, the optical signal power reduces considerably, which presents a higher-efficiency characteristic. In addition, since each of the first to third wavelength-multiplexed light amplifying basic units is composed of the optical branching section having the two input ports and the two output ports for outputting a wavelength-multiplexed optical signal through the two output ports and the optical amplifying sections connected to the two output ports of this optical branching section, the amplification mediums are disposed dispersedly in an optical distribution system, which permits the realization of a stable optical amplifier without relying on an optical isolator. Still additionally, since the optical amplifying sections and the optical branching sections are connected alternately to each other, the effective gain in the amplifier lowers to produce a reflection resistance, and if the gain of the optical amplifying section is set at a lower value than the division (branch) loss, the effective gain becomes minus, which eliminates the need for each optical amplifying section being interposed between optical isolators and, hence, simplifies the system. Moreover, the excess loss of a system including the optical amplifier and the distribution system is reducible so that the unstable operation due to the reflection is eliminable without using an optical isolator.

In this configuration, it is also appropriate that an auxiliary excitation light source is connected to the other input port of at least one of the plurality of wavelength-multiplexed light amplifying basic units, or that an isolator is connected to the signal input port of the first wavelength-multiplexed light amplifying basic unit in at least one of the plurality of wavelength-multiplexed light amplifying units.

Furthermore, it is also appropriate that an auxiliary excitation light source is connected to the other input port of the aforesaid wavelength-multiplexed light amplifying basic unit, or that an isolator is connected to the signal input port of the aforesaid wavelength-multiplexed light amplifying basic unit.

Still furthermore, it is also appropriate that an auxiliary excitation light source is connected to the other input port in at least one of the plurality of wavelength-multiplexed light amplifying basic units, or that an isolator is connected to the signal input port in at least one of the plurality of wavelength-multiplexed light amplifying basic units.

In this case, it is possible to strengthen the excitation optical power when needed, and since the excitation light source can be distributed equally through the use of the optical branching section (1:1 optical coupler), the excitation optical power can be supplied equally through a simple configuration to each of the optical amplifying sections, which eliminates the need for the use of multiplexing units for adding or multiplexing an excitation light and a signal light, or reduces the required number of multiplexing units.

In addition, in addition to avoiding the unstable operation due to the reflecting and returning light, the reverse ASE gathering from the output side to the input side is shut off, thereby preventing the saturation of the optical amplifier due to the reverse ASE.

Moreover, it is also acceptable that, in at least two of the plurality of wavelength-multiplexed light amplifying units, the output side of the optical amplifying section of each of the second and third wavelength-multiplexed light amplifying basic units in the preceding wavelength-multiplexed light amplifying unit are connected through an oblique (skew) connector to the input side of the signal input port of the first wavelength-multiplexed light amplifying basic unit in the subsequent-stage wavelength-multiplexed light amplifying unit.

Furthermore, it is also acceptable that, in at least two of the plurality of wavelength-multiplexed light amplifying basic units, the output side of the optical amplifying section of the preceding wavelength-multiplexed light amplifying basic unit is connected through an oblique connector to the input side of the signal input port in the subsequent-stage wavelength-multiplexed light amplifying basic unit.

In this case, light reflection does not occur on the connector surface, so that useless light amplification is preventable.

Still furthermore, it is also possible that an input monitor is provided to detect the input to the fourth wavelength-multiplexed light amplifying basic unit, and the gain control means includes a control section for producing a gain control signal on the basis of the output information and the detection result by the input monitor and for supplying the gain control signal to an excitation light source provided on the input side of the gain equalizer for controlling an excitation state of the excitation light source.

In this case, the control of the wavelength characteristic of the gain at all the branch ports becomes feasible, and the control of the wavelength characteristic of the gain becomes possible at all the ports in a manner that feedback control is implemented for the forefront excitation light source.

Furthermore, in accordance with this invention, there is provided a wavelength-multiplexed light amplifying apparatus comprising a plurality of wavelength-multiplexed light amplifying basic units, with the wavelength-multiplexed light amplifying basic units being connected in a multistage fashion in a manner that the signal input port of the optical branching section is connected to an output side of the optical amplifying section of the preceding wavelength-multiplexed light amplifying basic unit and an optical feedback loop system.

Thus, if the user wants the extension of the service, the extension in service becomes easily feasible. That is, by newly and additionally buying this wavelength-multiplexed light amplifying basic unit, the user can easily increase the number of divisions. This extension can be performed without interrupting the current service. In addition, if the forefront excitation light source has a power sufficient to excite the rearmost wavelength-multiplexed light amplifying basic unit, there is no need to place an excitation light source in the intermediate wavelength-multiplexed light amplifying basic units. Still additionally, an excitation light source can be installed in the intermediate wavelength-multiplexed light amplifying basic units when needed, and excitation light sources can be connected to all the wavelength-multiplexed light amplifying basic units, thus achieving flexible excitation. Besides, the respective elements are constructed with optical parts having the same characteristic, and this suits the mass production, and offers excellent expansion.

Furthermore, in this configuration, it is also possible that an input monitor is provided to detect the input to the forefront unit of the plurality of wavelength-multiplexed light amplifying basic units arranged in multistage fashion, and the gain control means includes a control section for producing a gain control signal on the basis of the output information and the detection result by the input monitor and for supplying the gain control signal to an excitation light source provided on the input side of the gain equalizer for controlling an exciting state of the excitation light source.

In this case, the control of the wavelength characteristic of the gain at all the branch ports becomes feasible, and the control of the wavelength characteristic of the gain becomes possible at all the ports in a manner that feedback control is implemented for the forefront excitation light source.

Still furthermore, in accordance with this invention, there is provided a wavelength-multiplexed light amplifying apparatus comprising a wavelength-multiplexed light amplifying basic unit and an optical feedback loop system.

Thus, this system can be offered as simple equipment to the users, while the users can easily increase the number of divisions without interrupting the current service.

In this configuration, it is also possible that an input monitor is provided to detect the input to the wavelength-multiplexed light amplifying basic unit arranged in multistage fashion, and the gain control means includes a control section for producing a gain control signal on the basis of the output information and the detection result by the input monitor and for supplying the gain control signal to an excitation light source provided on the input side of the gain equalizer for controlling an exciting state of the excitation light source.

Thus, the control of the wavelength characteristic of the gain at all the branch ports becomes feasible, and the control of the wavelength characteristic of the gain becomes possible at all the ports in a manner that feedback control is implemented for the forefront excitation light source.

In this case, it is possible that the optical branching section of the aforesaid wavelength-multiplexed light amplifying basic unit is constructed as a 1:1 optical coupler and the optical amplifying section of the aforesaid wavelength-multiplexed light amplifying basic unit is constructed to have a gain equivalent to a division loss in the optical branching section or a gain lower than the division loss, or that the optical branching section, the optical amplifying section and a connecting section between the optical branching section and optical amplifying section in the aforesaid wavelength-multiplexed light amplifying basic unit are constructed as an optical waveguide made from a glass or a semiconductor.

Thus, the division and the amplification are alternately conducted when viewed from the output side, and each of the optical amplifying sections can maintain the theoretical limit value (for example, 15 dBm) as long as it performs the amplification at a gain (for example, 18 dB) with a level or magnitude capable of compensating for the power loss (for example 3 dB) occurring at the division into two, thereby presenting high-efficiency expansion. Additionally, a stable optical amplifier becomes realizable, and there occurs no situation where the optical power strengthens locally, which offers a higher-efficiency characteristic.

In addition, it is also possible that the aforesaid gain control means is equipped with a filter for selecting a desired-wavelength optical signal from the output information and an optical attenuator for attenuating the desired-wavelength optical signal extracted through the filter for the laser resonance and further for supplying the attenuated optical signal to the input side of the gain equalizer. This filter can also be constructed as a filter for selecting an optical signal with a wavelength being out of a wavelength band needed for transmission.

Thus, the port to be feedbacked is only one in number, and the forefront excitation light source can vary the excitation light to maintain the gain of each of the ports constant, so that the gains of all the ports are maintainable constant with a simple construction.

Still furthermore, in accordance with this invention, there is provided a wavelength-multiplexed light amplifying apparatus made to be connected to a branching port of a multiplexing/branching unit which receives a wavelength-multiplexed optical signal composed from optical signals of M kinds of wavelengths (M signifies a natural number) and a wavelength-multiplexed optical signal composed from optical signals of N kinds of wavelengths and further which branches them into a wavelength-multiplexed optical signal composed from optical signals of (M+N−L) kinds of wavelengths (N and L signify a natural number) and a wavelength-multiplexed optical signal composed from optical signals of L kinds of wavelengths, the wavelength-multiplexed light amplifying apparatus comprising a plurality of wavelength-multiplexed light amplifying basic units each including an optical branching section for receiving the wavelength-multiplexed optical signal, and optical amplifying sections respectively connected to the two output ports of the optical branching section, with the wavelength-multiplexed light amplifying basic units being connected in a multistage fashion in a manner that the signal input port of the optical branching section in one wavelength-multiplexed basic unit is connected to an output side of the optical amplifying section of another preceding wavelength-multiplexed light amplifying basic unit, and an excitation light source connected to the other input port of the optical branching section of the forefront unit of the plurality of wavelength-multiplexed light amplifying basic units.

Thus, a broadcast function is easily realizable, and the extension of the branch ports on the in-service becomes possible.

Moreover, in accordance with this invention, there is provided a wavelength-multiplexed light amplifying apparatus for use in an m×n matrix optical switch (m and n signify a natural number) in an optical cross-connect unit, comprising a plurality of wavelength-multiplexed light amplifying basic units each including an optical branching section for receiving a wavelength-multiplexed optical signal and optical amplifying sections respectively connected to the two output ports of the optical branching section, with the wavelength-multiplexed light amplifying basic units being connected in a multistage fashion in a manner that the signal input port of the optical branching section in one wavelength-multiplexed basic unit is connected to an output side of the optical amplifying section of another preceding wavelength-multiplexed light amplifying basic unit, and an excitation light source connected to the other input port of the optical branching section of the forefront unit of the plurality of wavelength-multiplexed light amplifying basic units.

Thus, this system is applicable to a distribution system such as an optical subscriber system, and the expansion on the in-service is easily feasible.

In addition, in accordance with this invention, there is provided an optical add-and-drop apparatus using wavelength-multiplexed light amplifying basic units, comprising a first-stage unit for distributing a wavelength-multiplexed optical signal composed from optical signals of X kinds of wavelengths, a first broadcast unit connected to an output side of the first-stage unit for broadcasting the wavelength-multiplexed optical signal outputted from the first-stage unit, a second broadcast unit connected to the output side of the first-stage unit for broadcasting the wavelength-multiplexed optical signal outputted from the first-stage unit and for dropping an optical signal, an optical carrier signal outputting section for outputting an optical carrier signal and for adding an optical signal and a selecting section connected to an output side of the first broadcast unit and an output side of the optical carrier signal outputting section for selectively outputting the wavelength-multiplexed optical signal from the first broadcast unit and the optical carrier signal from the optical carrier signal outputting section, wherein the first-stage unit is constructed as a first-stage wavelength-multiplexed light amplifying basic unit composed of an optical branching section for receiving the wavelength-multiplexed optical signal, composed from the optical signals of the X kinds of wavelengths and optical amplifying sections respectively connected to the two output ports of the optical branching section, and the first broadcast unit includes a plurality of multiplexing wavelength-multiplexed light amplifying basic units each identical in configuration to the first-stage wavelength-multiplexed light amplifying basic unit, with these multiplexing wavelength-multiplexed light amplifying basic units being connected in a multistage fashion and the second broadcast unit includes a plurality of distribution wavelength-multiplexed light amplifying basic units each identical in configuration to the first-stage wavelength-multiplexed light amplifying basic unit, with the distribution wavelength-multiplexed light amplifying basic units being connected in a multistage fashion and further includes a plurality of dropping optical filters for selectively outputting an optical signal with a predetermined wavelength to an output side of the optical amplifying section, while the selecting section includes switch sections, Y in number, for conducting switching between passage and interruption of the wavelength-multiplexed optical signal, coupling sections, Y in number, for conducting coupling between a wavelength-multiplexed optical signal line of the switching sections and an optical carrier signal line from the optical carrier signal outputting section and a multiplexing section for wavelength-multiplexing Y kinds of optical signals from the coupling sections to output a wavelength-multiplexed optical signal, and the switching sections are made to selectively conduct switching between an operation of allowing Y kinds of wavelength-multiplexed optical signals from the first broadcast unit to pass to be outputted from the multiplexing section and an operation of allowing Y kinds of optical carrier signals from the optical carrier signal outputting section to pass to be outputted from the multiplexing section.

Thus, the add-and-drop function is realizable with the same wavelength-multiplexed light amplifying units, which permits flexible extension and expansion of an optical network.

Moreover, in the wavelength-multiplexed light amplifying apparatus, it is also appropriate that an excitation light re-inputting section is provided in connection relation between the fourth wavelength-multiplexed light amplifying basic unit and at least the forefront wavelength-multiplexed light amplifying unit for removing a wavelength-multiplexed optical signal component from a leakage optical signal outputted from the fourth wavelength-multiplexed light amplifying basic unit to extract an excitation light and further for branching the extracted excitation light into a plurality of excitation lights to output the plurality of excitation lights, that an excitation light re-inputting section is provided between the forefront unit of the wavelength-multiplexed light amplifying base units connected in a multistage fashion and at least the forefront wavelength-multiplexed light amplifying unit for removing a wavelength-multiplexed optical signal component from a leakage optical signal outputted from the forefront wavelength-multiplexed light amplifying basic unit to extract an excitation light and further for branching the extracted excitation light into a plurality of excitation lights to output the plurality of excitation lights, or that provided are a fourth wavelength-multiplexed light amplifying basic unit identical in configuration to the wavelength-multiplexed light amplifying basic unit, with an output side of one optical amplifying section being connected to the signal input port of the wavelength-multiplexed light amplifying unit and an excitation light re-inputting section provided between the fourth wavelength-multiplexed light amplifying basic unit and the wavelength-multiplexed light amplifying basic unit for removing a wavelength-multiplexed optical signal component from a leakage optical signal outputted from the fourth wavelength-multiplexed light amplifying basic unit to extract an excitation light and further for branching the extracted excitation light into a plurality of excitation lights to output the plurality of excitation lights.

In addition, it is also appropriate that the excitation light re-inputting section includes a filter for removing a wavelength-multiplexed optical signal component from the leakage optical signal outputted from the fourth wavelength-multiplexed light amplifying basic unit to extract an excitation light and an optical branching section which is connected to the filter and an output side of which is connected to at least the signal input port of the second wavelength-multiplexed light amplifying basic unit in the forefront wavelength-multiplexed light amplifying unit and the signal input port of the third wavelength-multiplexed light amplifying basic unit, for putting the excitation light extracted by the filter in the forefront wavelength-multiplexed light amplifying unit, that the excitation light re-inputting section includes a filter for removing a wavelength-multiplexed optical signal component from the leakage optical signal outputted from the forefront wavelength-multiplexed light amplifying basic unit to extract an excitation light and an optical branching section which is connected to the filter and an output side of which is connected to at least the signal input port of the second wavelength-multiplexed light amplifying basic unit in the forefront wavelength-multiplexed light amplifying unit and the signal input port of the third wavelength-multiplexed light amplifying basic unit, for putting the excitation light extracted by the filter in the forefront wavelength-multiplexed light amplifying unit, or that the excitation light re-inputting section includes a filter for removing the wavelength-multiplexed optical signal component from a leakage optical signal outputted from the fourth wavelength-multiplexed light amplifying basic unit to extract an excitation light and an optical branching section which is connected to the filter and an output side of which is connected to the other input port of the wavelength-multiplexed light amplifying unit, for putting the excitation light extracted by the filter in the wavelength-multiplexed light amplifying basic unit.

Furthermore, in accordance with this invention, an optical add-and-drop apparatus using wavelength-multiplexed light amplifying basic units comprises a first stage unit for broadcasting a first wavelength-multiplexed optical signal composed from optical signals of X kinds of wavelengths, a first broadcast unit connected to an output side of the first-stage unit for broadcasting the first wavelength-multiplexed optical signal outputted from the first-stage unit, an additional signal outputting section for multiplexing a plurality of optical carrier signals to output a second wavelength-multiplexed optical signal, and a transmission outputting section connected to an output side of the first-stage unit and an output side of the additional signal outputting section for coupling the first wavelength-multiplexed optical signal from the first-stage unit with the second wavelength-multiplexed optical signal from the additional signal outputting section, wherein the first-stage unit is constructed as a first-stage wavelength-multiplexed light amplifying basic unit composed of an optical branching section having two input ports and two output ports for receiving the wavelength-multiplexed optical signal, composed from the optical signals of X kinds of wavelengths, through a signal input port forming one of the two input ports to output the first wavelength-multiplexed optical signal through the two output ports, with the other signal input port being connected to an excitation light source and optical amplifying sections respectively connected to the two output ports of the optical branching section, and the first broadcast unit includes a plurality of branching wavelength-multiplexed light amplifying basic units each identical in configuration to the first-stage wavelength-multiplexed light amplifying basic unit, with the plurality of branching wavelength-multiplexed light amplifying basic units being connected in a multistage fashion in a manner that the signal input port of the optical branching section in one multiplexing wavelength-multiplexed light amplifying basic unit is connected to an output side of the optical amplifying section in the preceding branching wavelength-multiplexed light amplifying basic unit, with one input port of the optical branching section in the forefront unit of the plurality of branching wavelength-multiplexed light amplifying basic units being connected to an output port of one optical amplifying section in the first-stage wavelength-multiplexed light amplifying basic unit, and with a plurality of dropping optical filters each for selecting the optical signal having a predetermined wavelength being provided at an output side of the optical amplifying section of the rearmost basic unit of the plurality of branching wavelength-multiplexed light amplifying basic units, and further the additional signal outputting section includes a plurality of optical carrier signal generating sections each for outputting an optical carrier signal and a multiplexing section connected to the side of the plurality of optical carrier signal generating sections for multiplexing the plurality of optical carrier signals from the plurality of optical carrier signal outputting sections to output the second wavelength-multiplexed optical signal, and even the transmission outputting section includes a coupling section connected to the first-stage unit and further to the additional signal outputting section for coupling the first wavelength-multiplexed optical signal from the first-stage unit with the second wavelength-multiplexed optical signal from the additional signal outputting section to output a third wavelength-multiplexed optical signal and an optical amplifier for amplifying the third wavelength-multiplexed optical signal from the coupling section to output the amplified third wavelength-multiplexed optical signal.

In addition, in the optical add-and-drop apparatus, it is also possible that further provided are an amplifying section provided on an input side of the first-stage unit for amplifying an optical signal to output an amplified optical signal and first dispersion compensating section connected to the amplifying section and further to the signal input port of the optical branching section in the first-stage unit for compensating for dispersion of the amplified optical signal to put a compensation optical signal subjected to the dispersion compensation in the signal port of the optical branching section.

Still additionally, in the optical add-and-drop apparatus, it is also possible that further provided is a second dispersion compensating section connected to the optical amplifier of the transmission outputting section for compensating for dispersion of the amplified third wavelength-multiplexed optical signal to put a compensation optical signal subjected to the dispersion compensation.

Moreover, in accordance with this invention, there is provided a wavelength-multiplexed light amplifying apparatus comprising an optical amplifying medium for amplifying input light, an optical branching/amplifying section for branching the optical signal, outputted from the optical amplifying medium, into a plurality of branched optical signals and further for amplifying each of the branched optical signals for compensating for a loss resulting from the branching, and gain control means connected to the optical branching/amplifying section for controlling a gain of the optical amplifying medium on the basis of the optical signal from the optical branching/amplifying section.

Thus, this method can conduct extraction processing for a desired wavelength in inconsideration of the influence on the other wavelengths and further can avoid, for example, the occurrence of coherent crosstalk easily. Additionally, leakage excitation light can be reused, thereby accomplishing efficient amplification.

Further, in accordance with this invention, there is provided an optical amplifier comprising a beam splitter splitting an input light, having a portion for amplifying the input light, a pumping light source emitting a pumping light, a monitor monitoring an output light of the beam splitter, and a controller controlling a power of the pumping light in accordance with an output of the monitor.

DESCRIPTION OF THE PREFERRED EMBODIMENTS

Embodiments of the present invention will be described hereinbelow with reference to the drawings.

(A) Description of a First Embodiment of the Invention

Figure 1:
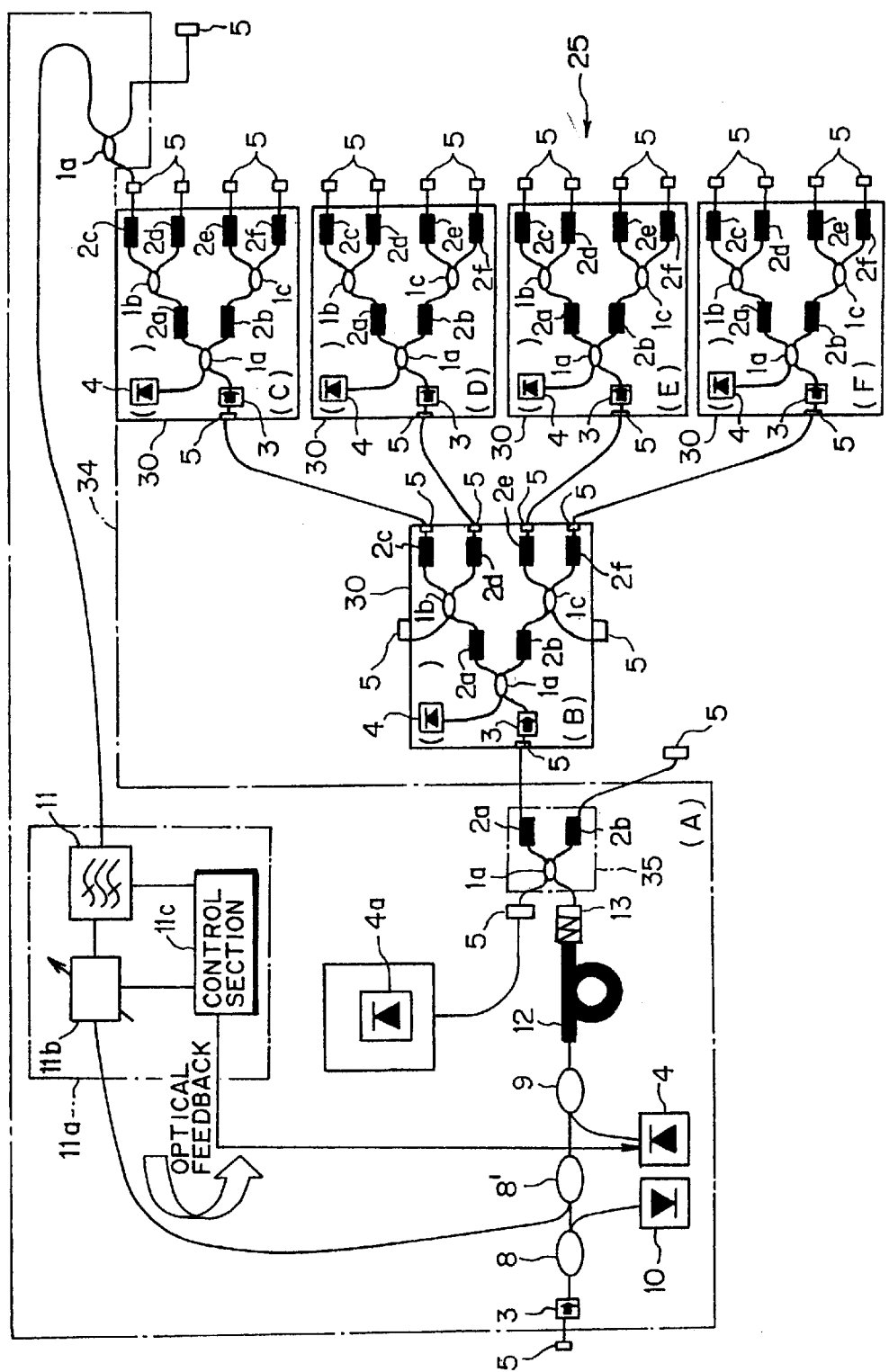
FIG. 1 is an illustration of a wavelength-multiplexed light amplifying apparatus according to a first embodiment of the present invention.

FIG. 1 shows a wavelength-multiplexed light amplifying apparatus according to a first embodiment of this invention. A wavelength-multiplexed light amplifying apparatus, designated generally at numeral 25 in FIG. 1, is for distributing one optical signal to 32 users, and employs optical feedback control. Besides, in the wavelength-multiplexed light amplifying apparatus 25 shown in FIG. 1, of the 32 users, 16 users are put in the illustration, and this system is mainly for use in a system shown in FIG. 2.

Figure 2:
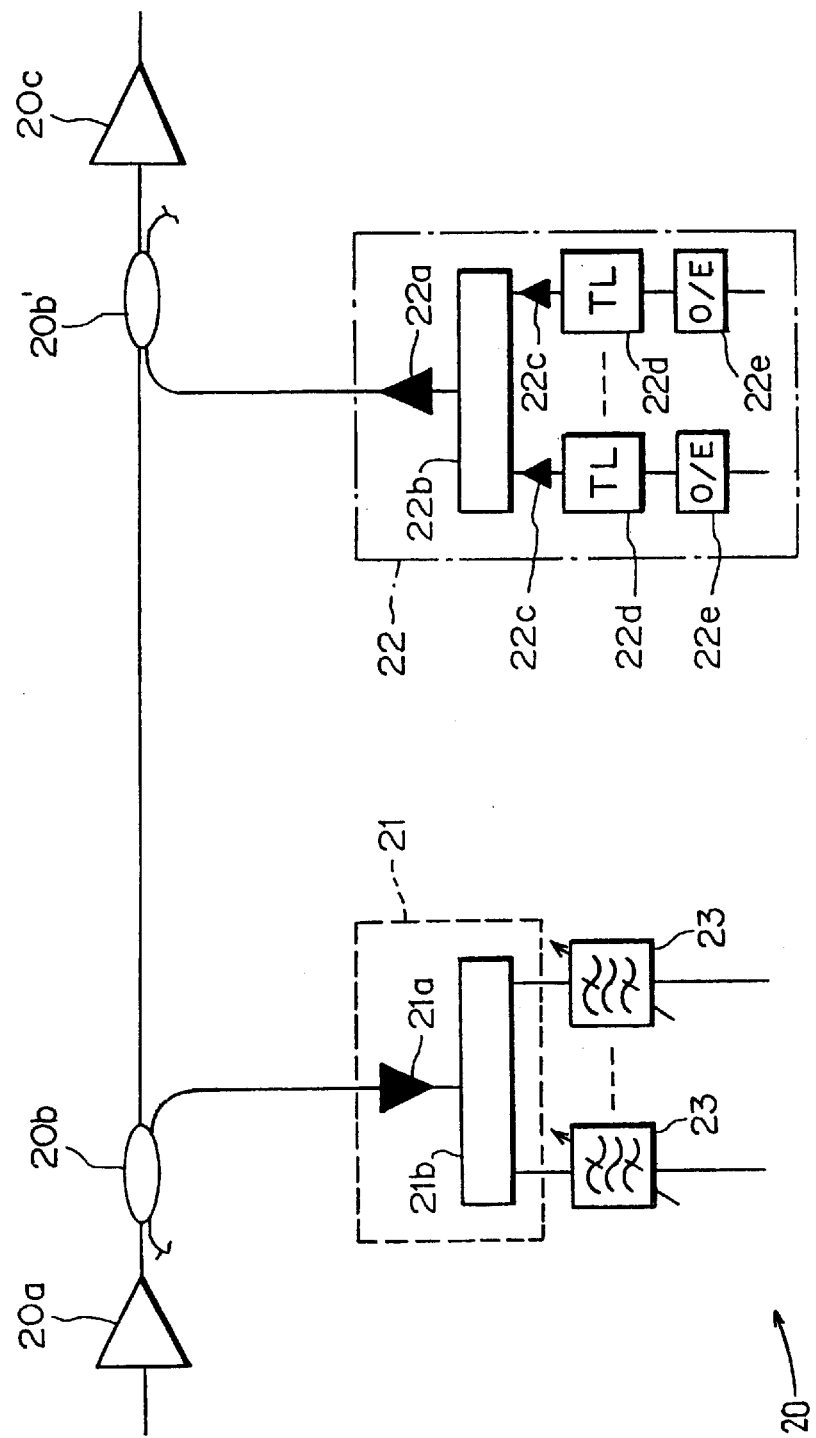
FIG. 2 is a block diagram illustrating an aspect of the present invention.

FIG. 2 is a block diagram illustrating an aspect of the optical add-and-drop apparatus (optical add-and-drop apparatus using wavelength-multiplexed light amplifying basic unit) and shows a configuration of a broadcast section based upon the first embodiment of this invention. In the optical add-and-drop apparatus 20, as shown in FIG. 2, ch1 to ch64 are dropped from an optical signal transmitted from the left side of FIG. 2 and wherein 64 wavelengths (ch1 to ch64) are multiplexed, while different ch65 to ch96 are added to the optical signal so that an optical signal wherein 96 wavelengths (ch1 to ch96) are multiplexed is transmitted toward the right side of FIG. 2. This optical add-and-drop apparatus 20 comprises optical amplifiers 20a and 20c, an optical coupler 20b, 20b', an optical branching section 21 and an optical multiplexing section 22. The optical multiplexing section 22 is composed of an EDF optical amplifier 22a for conducting optical amplification, a multiplexing section 22b for multiplexing or coupling a plurality of optical signals, an one-wave optical amplifier 22c for amplifying one wave, a variable wavelength tunable laser 22d and a PD (Photo Diode) 22e for conducting an O/E conversion, while the optical branching section 21 is composed of an EDF optical amplifier 21a for amplifying power to maintain the original optical signal power and an optical coupler 21b for distributing an optical signal. The function of this PD 22e is receiving a signal and outputting a signal to be used for transmitting the same signal having another wavelength by the tunable laser 22d. Further, the combination of the PD 22e and the tunable laser 22d is a transponder.

A wavelength-multiplexed optical signal coming from the left side of FIG. 2 is amplified in the optical amplifier 20a and a portion of the optical signal is dropped in the optical coupler 20b while an optical signal coming from the adding section 22 is added to be inputted to the optical coupler 20b'. Then in the optical coupler 20b', the optical signal coming from the adding section 22 and the optical signal (ch1 to ch64) amplified in the optical amplifier 20a are added (ch1 to ch96). The added optical signal is then amplified in the optical amplifier 20c and transmitted toward the right side of FIG. 2.

Further, in the branching section 21, for example, the optical signal with 64 wavelengths (ch1 to ch64) multiplexed is amplified up to 64 times in the EDF optical amplifier 21a and then demultiplexed in the optical coupler 21b so that the 64-wavelength-multiplexed (ch1 to ch64) optical signal is distributed to each port, and an optical signal with a desired wavelength is selected through a wavelength section optical filter 23. Accordingly, owing to this optical add-and-drop apparatus 20, a wavelength-multiplexed signal is outputted to each port in a broadcasted condition. This function can be realized by using the wavelength-multiplexed light amplifying apparatus 25.

Returning again to FIG. 1, the wavelength-multiplexed light amplifying apparatus 25 comprises a plurality of wavelength-multiplexed light amplifying units 30, connected in a multistage fashion as indicated as sections (B), (C), (D), (E) and (F), and an optical feedback loop system 34 (the left side in this illustration). The relationship in connection therebetween will be described hereinbelow with reference to FIG. 3.

Figure 3:
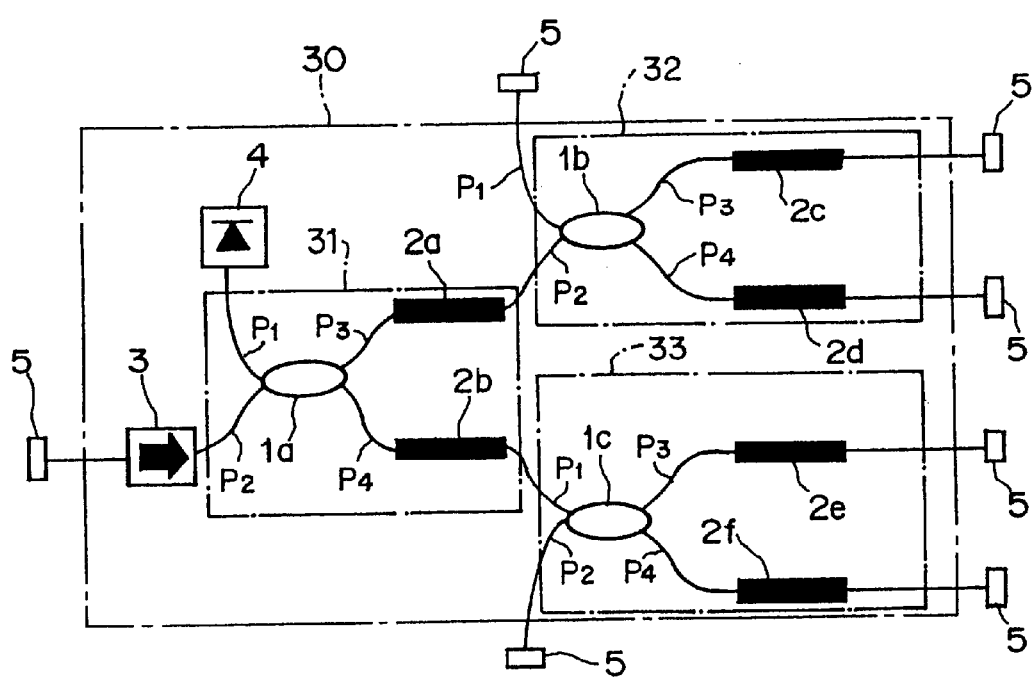
FIG. 3 is a block diagram showing a configuration of a wavelength-multiplexed light amplifying unit in the first embodiment of this invention.

FIG. 3 is a block diagram showing a configuration of a wavelength-multiplexed light amplifying unit 30 in the first embodiment of this invention. In FIG. 3, the wavelength-multiplexed light amplifying unit 30 includes three basic units, a first wavelength-multiplexed light amplifying basic unit 31, a second wavelength-multiplexed light amplifying basic unit 32 and a third wavelength-multiplexed light amplifying basic unit 33, with an optical isolator 3 being connected to one signal input port of the first wavelength-multiplexed light amplifying basic unit 31 while a excitation light source 4 being connected to the other signal input port thereof.

In this configuration, the first wavelength-multiplexed light amplifying basic unit 31 is composed of an optical branching section 1a and optical amplifying sections 2a and 2b. The optical branching section 1a has two input ports $P_1$, $P_2$ and two output ports $P_3$, $P_4$, and receives a wavelength-multiplexed optical signal, composed from optical signals with a plurality of wavelengths, through its signal input port $P_2$ forming one of the two input ports $P_1$ and $P_2$ to output the wavelength-multiplexed optical signal through the two output ports $P_3$ and $P_4$. Besides, this optical branching section 1a is constructed using a 1:1 optical coupler. Furthermore, the optical amplifying sections 2a and 2b are connected to the two output ports $P_3$ and $P_4$ of the optical branching section 1a, respectively, and are constructed as optical amplifying sections having a gain equivalent to a division (branch) loss in the optical branching section 1a or lower than the branch loss. Additionally, each of these optical amplifying sections 2a and 2b is constructed using an EDF (Erbium-Doped Fiber) or EDW (Erbium-doped Waveguide), and has a gain of approximately 3 to 6 dB close to the division loss (3 dB).

The second wavelength-multiplexed light amplifying basic unit 32 has the same arrangement as that of the first wavelength-multiplexed light amplifying basic unit 31, where the input side of its signal input port $P_2$ is connected to the output side of the one optical amplifying section 2a of the first wavelength-multiplexed light amplifying basic unit 31. Furthermore, the third wavelength-multiplexed light amplifying basic unit 33 similarly has the same arrangement as that of the first wavelength-multiplexed light amplifying basic unit 31, where the input side of its signal input port $P_1$ is connected to the output side of the other optical amplifying section 2b of the first wavelength-multiplexed light amplifying basic unit 31. In this case, the names of the input/output ports of these optical branching sections 1b and 1c are identical to those of the input/output ports of the optical branching section 1a, and in the following description, these port names will sometimes be used although being omitted from the illustrations.

Furthermore, in the wavelength-multiplexed light amplifying unit 30, the optical isolator 3 is an optical part which allows the transmission of a light beam in the forward direction but intercepting a light bean in the reverse direction, and displays a high resistance to reflecting and returning light. The excitation light source 4 is an LD (Laser Diode) controllable from the external, and is made such that its output is controllable variably. In addition, in this wavelength-multiplexed light amplifying unit 30, connectors 5 are installed on the input side of the optical isolator 3, the input port side of the optical branching section 1b, the input port side of the optical branching section 1c and the output sides of the optical amplifying sections 2c, 2d, 2e and 2f. Light from an auxiliary excitation light source 4a is inputted to the input port $P_1$ of the optical branching section 1b and the input port $P_2$ of the optical branching section 1c, so that the auxiliary excitation light source 4a is connected to the other input port $P_1$ in the second wavelength-multiplexed light amplifying basic unit 32 and further to the other input port $P_2$ in the third wavelength-multiplexed light amplifying basic unit 33. In the illustrations referred to for the following description, the connectors 5 connected to the optical branching sections 1b and 1c in this wavelength-multiplexed light amplifying unit 30 will sometimes be omitted for convenience only.

As described above, in the first wavelength-multiplexed light amplifying basic unit 31, of the input side two ports $P_1$ and $P_2$ of the optical branching section 1a, one port $P_1$ is used as an excitation port while the other port $P_2$ is used as an input port, and amplification mediums (optical amplifying sections 2a and 2b) having an equal gain for substantially compensating for the division loss, the excess loss of the optical coupler (optical branching section 1a) and the connector loss are connected to the output side two ports $P_3$ and $P_4$ of the same optical branching section 1a. In addition, the optical branching section 1a (1:1 optical coupler) is employed simultaneously for the division (branch) of the signal optical power into two and the division of the excitation optical power into two. Furthermore, the second wavelength-multiplexed light amplifying basic unit 32 and the third wavelength-multiplexed light amplifying basic unit 33 fully have the same configuration, and the optical amplifying section 2a in the first wavelength-multiplexed light amplifying basic unit 31 is connected to the input port $P_2$ of the optical branching section 1b in the second wavelength-multiplexed light amplifying basic unit 32, while the optical amplifying section 2b in the first wavelength-multiplexed light amplifying basic unit 31 is connected to the input port $P_1$ of the optical branching section 1c in the third wavelength-multiplexed light amplifying basic unit 33. Accordingly, this wavelength-multiplexed light amplifying unit 30 also functions as a distribution system for distributing an optical signal.

On the other hand, when the input side is viewed from the uppermost one (the uppermost connector on the right side in FIG. 3) of the output side connectors 5 in the wavelength-multiplexed light amplifying unit 30 shown in FIG. 3, the optical branching sections 1a, 1b and the optical amplifying sections 2a, 2c are connected alternately connected to each other. For maintaining the output level of each of the optical amplifying sections 2a to 2f at 15 dBm/ch(=0 dBm/ch), the gain of each of the optical amplifying sections 2a to 2f can take 3 dB which makes up for the power loss originating from the division into two, and in a manner that the power of an optical signal inputted to each of the optical amplifying sections 2a to 2f is set at 18 dBm, even if a loss of 3 dB occurs due to the division, the amplification can compensate for the loss of 3 dB. In other words, if each of the optical amplifying sections 2a to 2f performs the amplification at a gain (for example, 18 dB) which can compensate for the power loss (for example, 3 dB) stemming from the division into two, the theoretical limit value (for example, 15 dBm) is maintainable so that the number of users is increasable without the occurrence of attenuation. Besides, without employing a configuration in which a separate optical distribution system is provided after the amplification of an optical signal to distribute the optical signal, this invention employs an arrangement in which the amplification mediums are dispersed in the optical distribution system, so that the dispersion of the loss takes place.

Furthermore, since the optical amplifying sections 2a to 2f (EDFA) and the optical branching sections 1a to 1c (1:1 optical coupler) are connected alternately to each other, the EDFAs forming the amplification mediums are disconnected in division loss; which lowers the effective gain in the amplifier to create a resistance to reflection. That is, the operation is stable even if the required value of the isolation is low, or there is no need to interpose each of the amplifying sections 2a to 2f between the optical isolators 3; in consequence, it is possible to remove the unstable operation occurring due to the reflection.

This will be understood from the following description. In the case of the use of the EDFA, oscillation occurs due to light reflection between optical parts connected before and after this EDFA. Accordingly, in order to prevent the occurrence of this oscillation, a need for the installation of the optical isolator 3 exists for $R_1 \cdot R_2 \cdot G^2 \ll 1$, where $R_1$ represents a reflection coefficient, $R_2$ designates a reflection coefficient of an optical part following the EDFA and G denotes a gain of the EDFA. In the case that parts are connected alternately in a multistage fashion like this embodiment, since the optical parts standing before and after the EDFA produce a loss, even if the optical isolator 3 does not exist, the stabilization condition of $R_1 \cdot R_2 \cdot G^2 \ll 1$ is satisfied, thereby providing a stable operation. In addition, if the gain of the EDFA is lower than the loss resulting from the division loss, the effective gain of a combination of an EDFA and a 1:1 optical coupler assumes a minus value and a slight loss develops; in consequence, the optical isolator 3 becomes unnecessary. In this case, in the wavelength-multiplexed light amplifying unit 30; since the optical signal power decreases little by little toward a distribution portion, the system can be simplified while the signal quality is maintainable. Besides, the excess loss of the system including the optical amplifier and the distribution system is reducible.

Referring again to FIG. 1, of the wavelength-multiplexed light amplifying units 30 denoted by (B) to (F), the optical amplifying section 2c in (B) is connected to (C), and similarly the optical amplifying section 2d in (B) is connected to (D), and further the optical amplifying section 2e in (B) is connected to (E), and even the optical amplifying section 2f in (B) is connected to (F). That is, these wavelength-multiplexed light amplifying units 30 are connected in a multistage fashion in a manner that the signal input port $P_1$ of the optical branching section 1a of the first wavelength-multiplexed light amplifying basic unit 31 in one wavelength-multiplexed light amplifying unit 30 is connected to the output side of the optical amplifying section 2c (2d, 2e, 2f) of the second or third wavelength-multiplexed light amplifying basic unit 32 or 33 in the preceding wavelength-multiplexed light amplifying unit 30 (indicated by (B)). Additionally, the output of the optical amplifying section 2c in (C) is inputted to the optical feedback loop system 34, so that the wavelength characteristic of the gain is controlled regularly to maintain the gains of all the ports constant.

Figure 4:
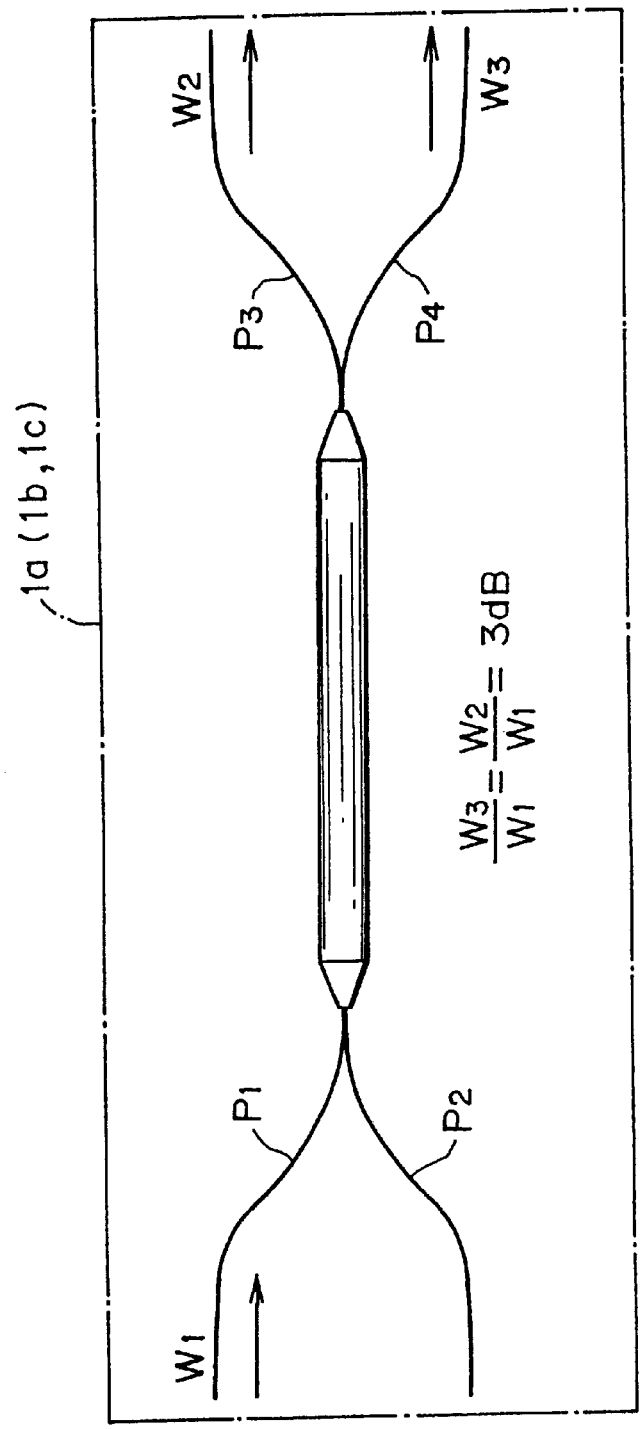
FIG. 4 is an illustration of a configuration of an optical branching section in the first embodiment of this invention.

FIG. 4 is an illustration of a configuration of the optical branching section 1a (or 1b, 1c) in the first embodiment of this invention. In FIG. 4, the optical branching section 1a (1b, 1c) is constructed with a 1:1 optical coupler, and is made to multiplex or add optical signals inputted from the port $P_1$ and the port $P_2$ and further to branch and output an optical signal to the port $P_3$ and the port $P_4$. The power $W_1$ of the optical signal inputted from the port $P_1$ is divided so that the optical signal powers $W_2$ and $W_3$ at the port $P_3$ and the port $P_4$ are halved. Additionally, also in further embodiments and modifications thereof, these optical branching sections 1a (1b, 1c) have a structure shown in FIG. 4. Incidentally, the optical branching sections 1a to 1c, the optical amplifying sections 2a to 2f and the connecting sections between the optical branching section 1a to 1c and the optical amplifying sections 2a to 2f in the first to third wavelength-multiplexed light amplifying basic units 31 to 33 can also be constructed using an optical waveguide made of a glass or a semiconductor.

Returning again to FIG. 1, the optical feedback loop system 34 is constructed as follows. That is, this optical feedback loop system 34 is made up of an input monitor section comprising an optical branching section 1a, a gain control means 11a, an optical isolator 3, an optical coupler 8 and a PD 10; a multiplexing section comprising an optical coupler 8', an excitation light source 4 and a multiplexer (multiplexing portion) 9; and an amplifying section comprising an EDFA 12, a gain equalizer 13, a fourth wavelength-multiplexed light amplifying basic unit 35, an auxiliary excitation light source 4a and a connector 5.

In this arrangement, the optical branching section 1a is for deriving the output from the rearmost wavelength-multiplexed light amplifying unit 30, and this function is achievable through the use of a 10:1 optical coupler. The gain control means 11a is for controlling the gains of the plurality of wavelength-multiplexed light amplifying units 30, arranged in a multistage fashion, on the basis of the output information from the wavelength-multiplexed light amplifying unit 30 indicated at (C), and this function is achievable by an optical filter 11, a variable attenuator 11b and a control section 11c. This optical filter 11 is for selecting an optical signal with a desired wavelength from the output information, and is constructed as a filter for selecting an optical signal having a wavelength being out of a wavelength band needed for the transmission. Furthermore, the variable attenuator 11b is for attenuating the optical signal from the optical filter 11 to supply it to the input side of the gain equalizer 13, with this function being obtainable by an optical attenuator. Still furthermore, the control section 11c is for controlling the wavelength characteristic of the gain, and is for controlling the output of the excitation light source 4.

With this configuration, from a wavelength-multiplexed optical signal outputted from the optical branching section 1a, the optical filter 11 selects an optical signal (output information) having an optical frequency which is out of that wavelength-multiplexed band, with the detection of that wavelength being made through a laser resonance. The control section 11c controls the wavelength characteristic of the gain, and the variable attenuator 11b attenuates the optical signal and controls the outputs of the excitation light source 4 and the auxiliary excitation light source 4a. Thus, the output of the excitation light source 4 and the output of the auxiliary excitation light source 4a to be inputted to the input ports $P_1$ of the optical branching sections 1a of the wavelength-multiplexed light amplifying units 30 indicated at (B) to (F) are controlled automatically (APC: Auto Power Control) so that the control of the wavelength characteristics of the gains in all the optical branching sections 1a to 1c becomes possible.

Furthermore, the optical isolator 3 is for conducting the isolation about the optical amplification in the optical feedback loop system 34, and the optical coupler 8 is for performing the optical coupling in which the ratio of the output to the next stage and the input monitor is 10:1, and further the PD 10 is for detecting the input to the fourth wavelength-multiplexed light amplifying basic unit 35, with the input light to this feedback system 34 being coupled in the optical coupler 8 for monitoring.

Still furthermore, the optical coupler 8' is for performing the optical coupling with the ratio of an input signal from the previous-stage and a feedback signal being 10:1, and the excitation light source 4 is an LD for excitation, and the multiplexer 9 is for multiplexing excitation light from the excitation light source 4 and a wavelength-multiplexed optical signal together.

Still furthermore, the EDFA 12 is an amplification fiber, and the gain equalizer 13 is for equalizing an optical signal outputted from the EDFA 12 in optical frequency, with they being interposed between the multiplexer 9 and the signal input port $P_2$ of the fourth wavelength-multiplexed light amplifying basic unit 35. Accordingly, the irregular amplification gain characteristic of an optical signal is leveled by the gain equalizer 13. Additionally, the auxiliary excitation light source 4a is a light source for compensation, and supplies light to the input ports $P_1$ of the optical branching sections 1a of the wavelength-multiplexed light amplifying units 30 expressed by (B) to (F), so that the control of the gain wavelength characteristics at all the optical branching sections 1a to 1c in the wavelength-multiplexed light amplifying units 30 becomes possible.

Accordingly, the wavelength-multiplexed light amplifying apparatus 25 is made up of an EDFA 12 (an optical amplifying medium) for amplifying input light, wavelength-multiplexed light amplifying units 30 (optical branching/amplifying sections), expressed by (B), (C), (D), (E) and (F), for branching an optical signal outputted from this EDFA 12 into a plurality of optical signals and further for amplifying the respective branched optical signals for compensating for a loss resulting from the branching, and a gain control means 11a connected to the optical branching/amplifying sections 30 for controlling the gain of the EDFA 12 in accordance with the optical signals from the optical branching/amplifying sections 30.

Further, the wavelength-multiplexed light amplifying apparatus 25 functions as an optical amplifier and comprises a beam splitting means (beam splitter), an excitation light source (pumping light source) 4, a monitoring means and a control means (gain control means 11a). The beam splitting means have a portion for amplifying the input light and have a function which split an input light. This function is realized by cooperating the wavelength-multiplexed light amplifying unit 30 indicated by (B), (C), (D), (E) and (F). Moreover, the excitation light source 4 emits a pumping light for pumping optical amplifying portion of the beam splitting means. Additionally, the monitoring means have a function which monitor the output light of the beam splitting means, and this function works by cooperating of the optical isolator 3, the optical coupler 8 and the PD 10. And the more, the gain control means 11a has a function which controls a power of the excitation light based on the value outputted from the monitoring means.

The fourth wavelength-multiplexed light amplifying basic unit 35 is for coupling the output of the auxiliary excitation light source 4a connected through the optical connector 5 and the output of the gain equalizer 13 and for inputting the coupling result to the wavelength-multiplexed light amplifying unit 30 expressed as (B). As well as described above, this unit 35 is composed of optical branching section 1a and optical amplifying sections 2a and 2b. Thus, the wavelength-multiplexed light amplifying unit 30 has the same configuration as that of the first wavelength-multiplexed light amplifying basic unit 31, and the output side of its one optical amplifying section 2a is connected to the signal input port $P_2$ of the first wavelength-multiplexed light amplifying basic unit 31 in the forefront unit 30 (indicated at B) of the plurality of wavelength-multiplexed light amplifying units arranged in a multistage fashion.

Accordingly, the operational flow of this wavelength-multiplexed light amplifying apparatus 25 is as follows. That is, an optical signal outputted from the fourth wavelength-multiplexed light amplifying basic unit 35, indicated at (A) in FIG. 1, is inputted to the wavelength-multiplexed light amplifying unit 30 indicated at (B) where that signal is branched or divided into four. Furthermore, these four divisions of the optical signal are distributed to the wavelength-multiplexed light amplifying unit 30 indicated at (C), the wavelength-multiplexed light amplifying unit indicated at (D), the wavelength-multiplexed light amplifying unit indicated at (E) and the wavelength-multiplexed light amplifying unit indicated at (F), respectively, thereby producing 16 distributions. Likewise, an optical signal outputted from the optical amplifying section 2a in the fourth wavelength-multiplexed light amplifying basic unit 35 in FIG. 1 undergoes 16 distributions although omitted from the illustration, thus realizing the broadcast function.

Furthermore, an optical signal outputted from the wavelength-multiplexed light amplifying unit 30 denoted at (C) is inputted to the optical branching section 1a of the optical feedback loop system 34, and an optical signal from this optical branching section 1a is inputted to the optical filter 11 to extract an optical signal having a frequency which is out of a frequency area to be wavelength-multiplexed, and the control section 11c monitors the power of the extracted optical signal and the variable attenuator 11b adjusts the attenuation, thereby controlling the input of the optical coupler 8'. Additionally, a control signal from this control section 11c is given to the excitation light source 4 and the auxiliary excitation light source 4a.

On the other hand, an optical signal from the other wavelength-multiplexed light amplifying apparatus, coming from the left side in FIG. 1, is inputted through the connector 5 and the optical isolator 3 to the optical coupler 8, and its level is always monitored by the PD 10. Furthermore, in the multiplexer 9, the output of the optical coupler 8' is multiplexed with an optical signal from the excitation light source 4, and this signal is optically amplified in the EDFA 12, and its optical spectrum is leveled in the gain equalizer 13. An optical signal from the gain equalizer 13 and an optical signal outputted from the auxiliary excitation light source 4a are coupled to each other in the optical branching section 1a in the fourth wavelength-multiplexed light amplifying basic unit 35, and again inputted to the optical amplifying section 2a or the optical amplifying section 2b.

As described above, this wavelength-multiplexed light amplifying apparatus 25 internally includes the wavelength-multiplexed light amplifying units 30 connected in a multistage fashion and the optical feedback loop system 34, and, for the purpose of the constant-gain control, the reduction of noise and the leveling of gain band, monitors and controls the input power and the output power through the use of the excitation light source 4, the multiplexer 9, the EDFA 12, the gain equalizer 13 and others. Additionally, the light compensation becomes possible through the use of the optical branching section 1a (1:1 optical coupler) of the fourth wavelength-multiplexed light amplifying basic unit 35 in the optical feedback loop system 34. Still additionally, this wavelength-multiplexed light amplifying apparatus 25 feedbacks an optical signal from one port to constitute a laser resonator (the optical filter 11, the control section 11a, the variable attenuator 11b), and handles the wavelength characteristic of the gain by adjusting the attenuation of the variable attenuator 11b in the optical feedback loop system 34.

Moreover, this wavelength-multiplexed light amplifying apparatus 25 can also be expressed as follows looking at the function of the optical add-and-drop apparatus shown in FIG. 2. For instance, in FIG. 2, it is applicable as M=64, N=10 and L=32. That is, this wavelength-multiplexed light amplifying apparatus 20 is a wavelength-multiplexed light amplifying apparatus to be connected to a branching port of a multiplexing/branching unit which receives a wavelength-multiplexed optical signal comprising optical signals of 64 kinds of wavelengths and a wavelength-multiplexed optical signal comprising optical signals of 10 kinds of wavelengths and branches the input into a wavelength-multiplexed optical signal comprising optical signals of (64+10−32) kinds of wavelengths and a wavelength-multiplexed optical signal comprising optical signals of 32 kinds of wavelengths to output them, and this wavelength-multiplexed light amplifying apparatus 20 has a plurality of wavelength-multiplexed light amplifying basic units 30b (basic units which will be described later with reference to FIG. 7) each comprising an optical branching section 1a including two input ports $P_1$ and $P_2$ and two output ports $P_3$ and $P_4$ for receiving a wavelength-multiplexed optical signal comprising optical signals of 32 kinds of wavelengths through the signal input port $P_2$ forming one input port of the two input ports to output wavelength-multiplexed optical signals through the two output ports $P_3$ and $P_4$ and optical amplifying sections 2a and 2b respectively connected to the two output ports $P_3$ and $P_4$ of the optical branching section 1a. These wavelength-multiplexed light amplifying basic units 30b are connected in a multistage fashion in a manner that the signal input port $P_2$ of the optical branching section 1a is connected to the output side of the optical amplifying section 2c in the preceding (previous-stage) wavelength-multiplexed light amplifying basic unit 30b, and the excitation light source 4 is connected to the other input port $P_1$ of the optical branching section 1a in the forefront unit of the plurality of wavelength-multiplexed light amplifying basic units 30b. Additionally, this easily realizes a broadcast function, and permits application for an optical add-and-drop apparatus.

Concretely, if using only the branch into two, the user purchases three parts, that is, (A), (B) and (C) in FIG. 1. Furthermore, if the branch into five is needed later, the user further increases (D). Similarly, up to the branch into 16 is possible if the user adds (D), (E) and (F). For the branch into 17, (B) and (C) are connected to the empty port $P_3$ of (A) of the fourth wavelength-multiplexed light amplifying basic unit 35 in the optical feedback loop system 34. In this way, a maximum of branch into 32 becomes possible, and the hardware is expandable according to the demands. Furthermore, if the hardware operating currently is left as it is and the user additionally purchases the hardware when he wants the extension of the service, it is possible to meet the communication requests.

With this configuration, an optical signal from the fourth wavelength-multiplexed light amplifying basic unit 35 is broadcasted and distributed into a desired number, the information on the optical signal outputted from the rearmost unit is fed back to accomplish the wavelength-multiplexed light output control appropriately.

Concretely, an optical signal of 18 dBm inputted to the optical branching section 1a of the fourth wavelength-multiplexed light amplifying basic unit 35 becomes 15 dBm at the output of the optical branching section 1a, and gets a gain of 3 dB at the optical amplifying section 2a so that a power of 18 dBm is outputted from the optical amplifying section 2a. This optical signal of 18 dBm is branched into two in the optical branching section 1a of the first wavelength-multiplexed light amplifying basic unit 31 in the wavelength-multiplexed light amplifying unit 30 indicated at (B), and becomes 15 dBm at the output of the optical branching section 1a, while it again takes a gain of 3 dB at the optical amplifying section 2a to regain 18 dBm at the output of the optical amplifying section 2a. Additionally, this optical signal of 18 dBm is also branched into two in the optical branching section 1b of the second wavelength-multiplexed light amplifying basic unit 32 in the wavelength-multiplexed light amplifying unit 30 indicated at (B), and takes a gain of 3 dB to reach 18 dBm before outputted. This optical signal is inputted to the wavelength-multiplexed light amplifying unit 30 indicated at (C), and similarly branched and amplified before inputted into the optical feedback loop system 34.

Thus, the information (output information) on the outputted optical signal from the rearmost unit is fed back and, in the gain control means 11a, the output information works for the input side optical coupler 8', the excitation light source 4 and the auxiliary excitation light source 4a, which ensures appropriate control.

In this way, without employing a configuration in which another optical distribution system is prepared to distribute an optical signal amplified, this wavelength-multiplexed light amplifying apparatus 25 is arranged such that amplifying mediums are dispersed in the optical distribution system as taken in the wavelength-multiplexed light amplifying units 30 indicated at (B) to (F); whereupon the optical signal is gradually distributed after amplified, thereby dispersing the loss. Accordingly, as compared with a method in which an optical signal is amplified at a time and distributed, the increase in optical power does not occur locally, thereby presenting a higher-efficiency characteristic. That is, in this wavelength-multiplexed light amplifying apparatus 25, the signal optical power assumes approximately 18 dBm(=63 mW) at most, and decreases significantly as compared with the maximum optical power occurring when a wavelength-multiplexed optical signal is amplified at a time. Additionally, unlike the case in which it is amplified at a time, a large loss of the signal optical power does not occur. In this case, the excess loss does not constitute a main factor to the loss.

Furthermore, as described above, in this wavelength-multiplexed light amplifying apparatus 25, since the amplifying mediums (optical amplifying sections 2a to 2f) are disconnected effectively due to the effective loss due to the distribution, stable operation is realizable without relying on the optical isolator 3. Additionally, in this wavelength-multiplexed light amplifying apparatus 25, in the wavelength-multiplexed light amplifying units 30 connected as a distribution system in a multistage fashion, since the optical branching sections 1a to 1c (1:1 optical couplers) are connected utilizing a free portion of the two input ports, it is possible to eliminate the need for the multiplexer 9 which multiplexes the excitation light and the signal light, or to decrease the required number. Still additionally, since the light from the excitation light source 4 is equally distributed utilizing the optical branching sections 1a to 1c (1:1 optical couplers), it is possible to supply the equal excitation optical power to the respective optical amplifying sections 2a to 2f with a simple configuration. On the other hand, if the optical isolator 3 is used on the input side of the component, in addition to avoiding the unstable operation resulting from the reflection returning light, it is possible to shut off the reverse-direction ASE (Amplified Spontaneous Emission) coming from the output side to the input side, thereby preventing the saturation of the optical amplifier due to the reverse-direction ASE.

Moreover, this wavelength-multiplexed light amplifying apparatus 25 can offer easy expansion in the in-service. That is, if the user additionally purchases this wavelength-multiplexed light amplifying unit 30 after the introduction of this wavelength-multiplexed light amplifying apparatus 25, the expansion becomes easily feasible in the number of branches, and becomes possible without interrupting the current service, thus presenting higher-quality service. Additionally, in the broadcast system 20 shown in FIG. 2, a wavelength-multiplexed optical signal is output through each port, and if only a desired wavelength is selected therefrom through a wavelength selecting filter, the optical signal distribution function is realizable, thus providing the broadcast function.

Furthermore, in this wavelength-multiplexed light amplifying apparatus 25, the optical part in each component is composed of the optical amplifying sections (EDFA) 2a to 2f, the optical couplers 1a to 1c, the optical switch, the excitation light source 4 and the optical isolator 3, which have the equal characteristic; therefore, this system 25 is suitable for the mass production and excellent expansion is attainable. For instance, in FIG. 1, the units (B) to (F) other than (A), have the completely same configuration, thus enabling the mass production.

Still furthermore, in the wavelength-multiplexed light amplifying units 30, since the light from the excitation light source 4 in the forefront unit is distributed equally, if the excitation light source 4 in the forefront unit has a power sufficient to excite the optical amplifying sections 2a to 2f in the rearmost wavelength-multiplexed light amplifying unit 30, there is no need to provide the excitation light source 4 in the intermediate wavelength-multiplexed light amplifying units 30. For instance, if an optical signal outputted from (A) has a power sufficient to excite the following amplifying units, the excitation light source 4 is not required in (B) to (F), while the excitation light source 4 can be placed in (B) when needed. Additionally, the excitation light source 4 can also be connected to all the amplifying units of (A) to (C). Accordingly, it is possible to employ the exciting method flexibly. Still additionally, it is also appropriate that one large-output excitation light source is prepared and is connected to an excitation portion (for example, the port $P_1$ of the optical branching section 1a) of each of the wavelength-multiplexed light amplifying units 30. This is equivalent to the case in which, in a gas station, gasoline is distributed from a gasoline tank to many motor vehicles at a time.

Moreover, the wavelength-multiplexed light amplifying apparatus 25 is made to receive laser light (compensatory light) from the auxiliary excitation light source 4a under the control of one portion $P_1$ of the forefront unit (the fourth wavelength-multiplexed light amplifying basic unit 35 indicated at (A) in FIG. 1), and the laser light by the distribution system is outputted equally to all the ports and the control of the wavelength characteristic of the gain at all the branching ports becomes possible. Likewise, since the magnitude of the excitation optical power is equal in the respective distribution systems, in a manner that only one port is represented and monitored so that the feedback control is implemented for the excitation light source 4 in the forefront unit to control the wavelength characteristic of the gain, the wavelength characteristics of the gain at all the ports are controllable. Additionally, since the gains at all the ports vary equally, the port to be fed back is only one, and if the excitation light is altered to maintain the gain at each of the ports constant, it is possible to maintain the gains at all the ports constant with a simple configuration.

In addition, it is also possible to change the configuration of the wavelength-multiplexed light amplifying unit 30.

Figure 5:
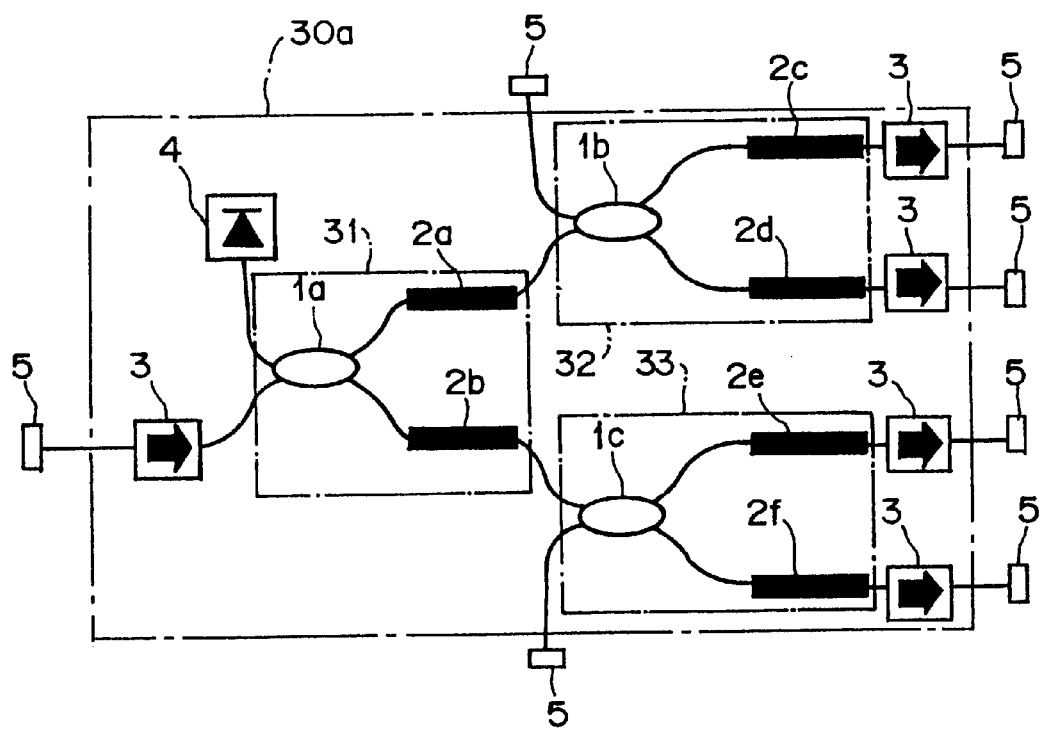
FIG. 5 is a block diagram showing a configuration of another wavelength-multiplexed light amplifying unit in the first embodiment of this invention.

FIG. 5 is a block diagram showing a configuration of another wavelength-multiplexed light amplifying unit according to the first embodiment of this invention. This wavelength-multiplexed light amplifying unit, designated generally at numeral 30a in FIG. 5, comprises three basic units, that is, a first wavelength-multiplexed light amplifying basic unit 31, a second wavelength-multiplexed light amplifying basic unit 32 and a third wavelength-multiplexed light amplifying basic unit 33, and further comprises an optical isolator 3 and an excitation light source 4 on the preceding side of the first wavelength-multiplexed light amplifying basic unit 31, and still further comprises optical isolators 3 coupled to two ports $P_3$ and $P_4$ on the output side of the second wavelength-multiplexed light amplifying basic unit 32 and optical isolators 3 coupled to two ports $P_3$ and $P_4$ on the output side of the third wavelength-multiplexed light amplifying basic unit 33. Additionally, each of an input port $P_1$ of an optical branching section 1b and an input port $P_2$ of an optical branching section 1c is connectable through a connector 5 to an auxiliary excitation light source 4a. Still additionally, the input side optical isolator 3 is connected through a connector 5 to the preceding wavelength-multiplexed light amplifying unit 30a, while the four output side optical isolators 3 are connected through connectors 5 to the following wavelength-multiplexed light amplifying unit 30a. These parts are the same as those described above, and the same description will be omitted for brevity. Furthermore, since the optical isolators 3 are inserted into these four places, the resistance to the reflection improves. This configuration operates as well as the above-described wavelength-multiplexed light amplifying unit 30 and offers the same effects.

Figure 6:
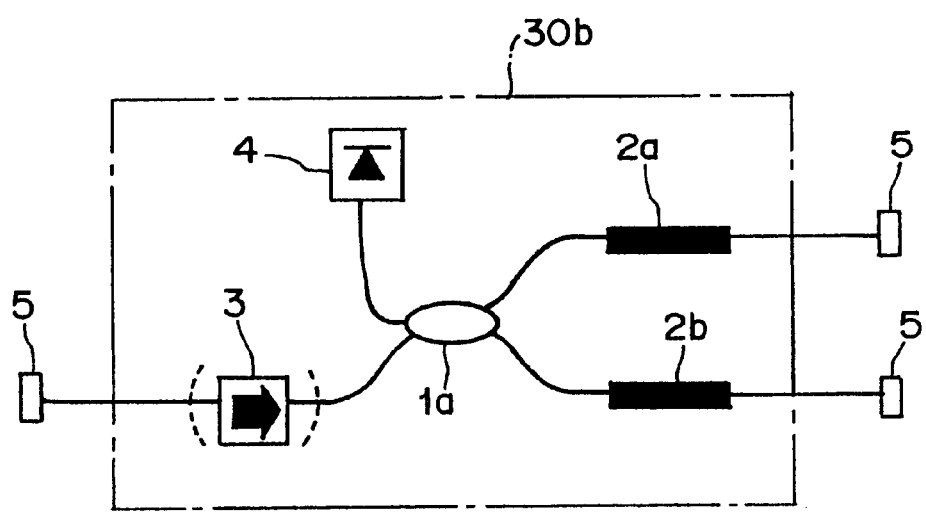
FIG. 6 is an illustration of a configuration of a block of a further wavelength-multiplexed light amplifying unit in the first embodiment of this invention.

Furthermore, looking at the point that, in this wavelength-multiplexed light amplifying unit 30a, an optical branching section 1a and an optical amplifying section 2a are connected to each other, the following unit combination is considered as an amplifying basic unit. FIG. 6 is a block diagram showing another wavelength-multiplexed light amplifying unit according to the first embodiment of this invention. In a wavelength-multiplexed light amplifying apparatus 25, looking at the point that the optical branching section 1a and the optical amplifying sections 2a and 2b are connected to each other, this wavelength-multiplexed light amplifying basic unit, designated generally at numeral 30b in FIG. 6, can be considered to constitute a multistage wavelength-multiplexed light amplifying unit, and this is put to use. That is, the wavelength-multiplexed light amplifying basic unit 30b shown in FIG. 6 is provided with the optical branching section 1a and the optical amplifying sections 2a and 2b, and further equipped with an optical isolator 3 and an excitation light source 4 on the input port $P_2$ side of the optical branching section 1a. In this case, the optical isolator 3 can be omitted for convenience in design. Additionally, the input side of the optical isolator 3 and the output sides of the optical amplifying sections 2a and 2b are connected through connectors 5 to the preceding and following wavelength-multiplexed light amplifying basic units 30b, respectively. Still additionally, the optical branching section 1a in FIG. 6 is constructed as a 1:1 optical coupler, while the optical amplifying sections 2a and 2b are constructed as an optical amplifying section having a gain equivalent to the branch loss in the optical branching loss 1a or having a gain lower than that branch loss, besides, in this wavelength-multiplexed light amplifying basic unit 30b, the optical branching section 1a, the optical amplifying sections 2a and 2b and a connecting section between the optical branching section 1a and the optical amplifying sections 2a and 2b can also be constructed using an optical waveguide made of a glass or a semiconductor. The other parts are the same as those described above, and the same description thereof will be omitted for simplicity.

Thus, the wavelength-multiplexed light amplifying unit comprises a plurality of wavelength-multiplexed light amplifying basic units 30b, each of which is composed of an optical branching section 1a having two input ports $P_1$ and $P_2$ and two output ports $P_3$ and $P_4$ for receiving a wavelength-multiplexed optical signal comprising optical signals of a plurality of wavelengths through the signal input port $P_2$ forming one of the two input ports $P_1$ and $P_2$ to output the wavelength-multiplexed optical signal through the two output ports $P_3$ and $P_4$ and optical amplifying sections 2a and 2b respectively connected to the two output ports $P_3$ and $P_4$ of the optical branching section 1a, with these wavelength-multiplexed light amplifying basic units 30b being connected in a multistage fashion in a manner that the signal input port $P_2$ of the optical branching section 1a of one wavelength-multiplexed light amplifying basic unit 30b is connected to the output side of the optical amplifying section 2a, 2b in the preceding wavelength-multiplexed light amplifying basic unit 30b, an excitation light source 4, a multiplexer 9 for multiplexing the excitation light from the excitation light source 4 and the wavelength-multiplexed optical signal, a gain equalizer 13 interposed between the multiplexer 9 and the signal input port $P_2$ of the forefront unit 30b of the plurality of wavelength-multiplexed light amplifying basic units 30b disposed in a multistage fashion, and a gain control means 11a for implementing gain control of the plurality of wavelength-multiplexed light amplifying basic units 30b, disposed in a multistage fashion, on the basis of output information from the rearmost unit 30b of the plurality of wavelength-multiplexed light amplifying basic units 30b.

Accordingly, instead of the wavelength-multiplexed light amplifying unit 30 comprising the first wavelength-multiplexed light amplifying basic unit 31 to the third wavelength-multiplexed light amplifying basic unit 33, it is also considered that the multistage connection of these wavelength-multiplexed light amplifying basic units 30b produces a configuration of a wavelength-multiplexed light amplifying apparatus.

In addition, in the case connected in a multistage fashion, as well as the system described with reference to FIG. 1, it is also possible that the auxiliary excitation light source 4a is connected to the other input port $P_1$ of at least one of the plurality of wavelength-multiplexed light amplifying basic units 30b, or that the optical isolator 3 is connected to the signal input port $P_2$ therein. Furthermore, in this case, the gain control means 11a can also be composed of an optical filter 11 and an optical attenuator (variable attenuator 11b) for attenuating an optical signal with a desired wavelength, extracted in the optical filter 11, for laser resonance to supply the attenuated optical signal to the input side of the gain equalizer 13. This optical filter 11 is constructed as a filter made to select an optical signal with a wavelength being out of a given wavelength band needed for transmission.

Incidentally, only one of these wavelength-multiplexed light amplifying basic units can constitute a wavelength-multiplexed light amplifying apparatus.

Figure 7:
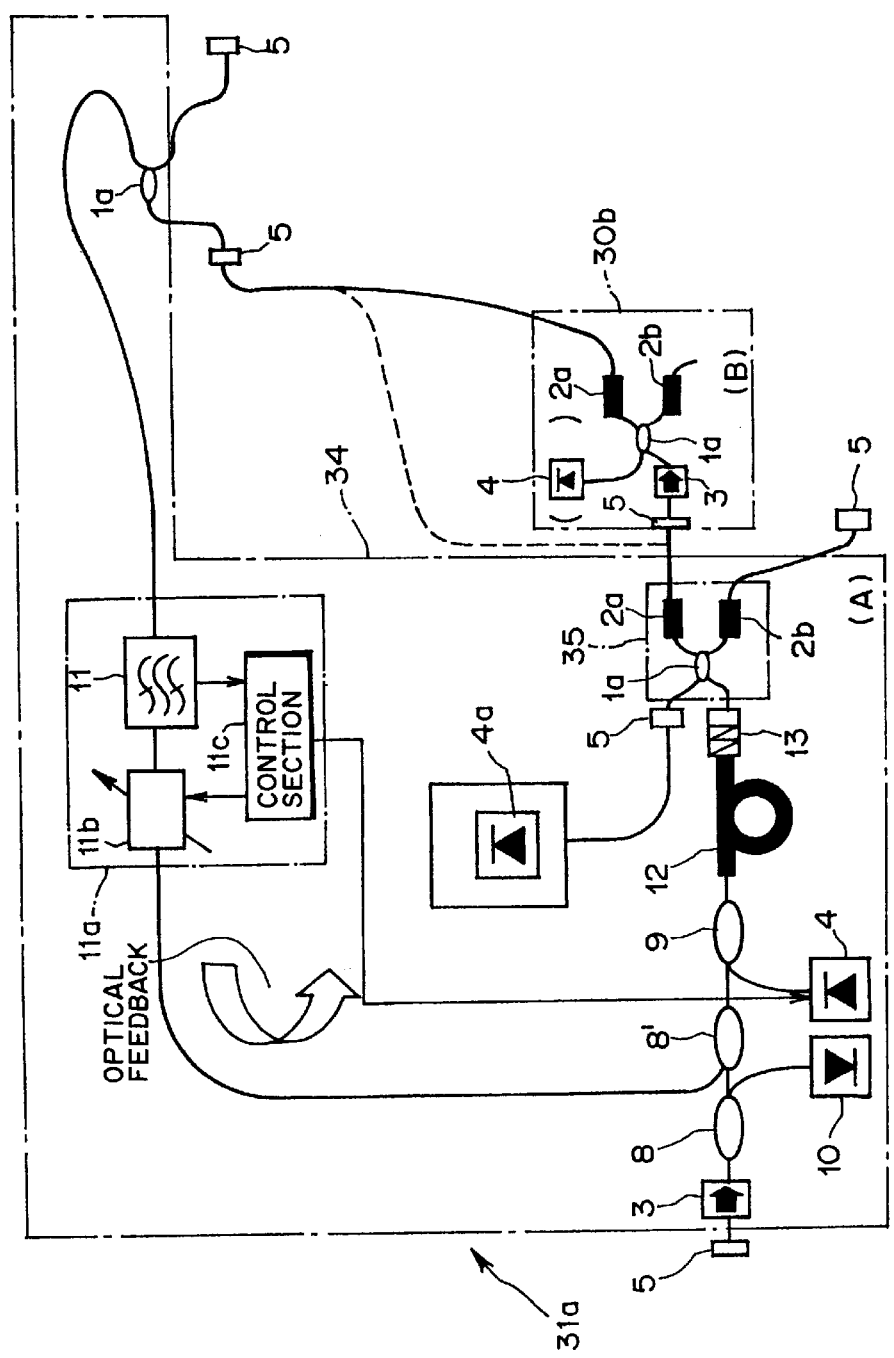
FIG. 7 is an illustration of another wavelength-multiplexed light amplifying apparatus according to the first embodiment of this invention.

FIG. 7 is an illustration of a further wavelength-multiplexed light amplifying apparatus according to the first embodiment of this invention. The wavelength-multiplexed light amplifying apparatus, designated generally at numeral 31a in FIG. 7, is made up of a wavelength-multiplexed light amplifying basic unit 30b and an optical feedback loop system 34. In this configuration, let it be assumed that, as indicated by an broken line in FIG. 7, the output light from a fourth wavelength-multiplexed light amplifying basic unit 35 in the optical feedback loop system 34 is inputted directly to an optical branching section 1a in the optical feedback loop system 34.

The fourth wavelength-multiplexed light amplifying basic unit 35 in the optical feedback loop system 34 shown in FIG. 7 is equipped with the optical branching section 1a and optical amplifying sections 2a and 2b. The optical branching section 1a is a 1:1 optical coupler, while the optical amplifying sections 2a and 2b are an optical amplifying section having a gain equivalent to the branch loss in the optical branching section 1a or having a gain lower than that branch loss. Additionally, the optical branching section 1a, the optical amplifying sections 2a and 2b and a connecting section between the optical branching section 1a and the optical amplifying sections 2a and 2b can also be constructed using an optical waveguide made of a glass or a semiconductor. Still additionally, an optical isolator 3 is coupled through optical couplers 8 and 8', a multiplexer 9 and an EDFA 12 to the signal input port $P_2$ in the fourth wavelength-multiplexed light amplifying basic unit 35, while an auxiliary excitation light source 4a is coupled to the other input port $P_1$ therein.

On the other hand, the optical feedback loop system 34 is made up of an optical branching section 1a, a gain control means 11a, an optical isolator 3, an optical coupler 8, an LD 10, an optical coupler 8', an excitation light source 4, a multiplexer 9, an EDFA 12, a gain equalizer 13, an auxiliary excitation light source 4a, a connector 5, and the fourth wavelength-multiplexed light amplifying basic unit 35. The gain control means 11a is composed of an optical filter 11 for selecting an optical signal with a desired wavelength from the output information, an optical attenuator (variable attenuator 11b) for attenuating the optical signal with the desired wavelength, extracted through the optical filter 11, for the laser resonance to supply the attenuated optical signal to the input side of the gain equalizer 13, and a control section 11c, with this optical filter 11 being made to select an optical signal with a wavelength being out of a given wavelength band needed for transmission. The other parts are the same as those described above, and the same description thereof will be omitted for brevity.

Thus, this wavelength-multiplexed light amplifying apparatus 31a comprises a fourth wavelength-multiplexed light amplifying basic unit 35 composed of an optical branching section 1a having two input ports $P_1$ and $P_2$ and two output ports $P_3$ and $P_4$ for receiving a wavelength-multiplexed optical signal comprising optical signals of a plurality of wavelengths through a signal input port $P_2$ forming one of the two input ports $P_1$ and $P_2$ to output the wavelength-multiplexed optical signal through the two output ports $P_3$ and $P_4$ and optical amplifying sections 2a and 2b respectively connected to the two output ports $P_3$ and $P_4$ of the optical branching section 1a, an excitation light source 4, a multiplexer 9 for multiplexing the excitation light from the excitation light source 4 and the wavelength-multiplexed optical signal, a gain equalizer 13 interposed between the multiplexer 9 and the signal input port $P_2$ of the fourth wavelength-multiplexed light amplifying basic unit 35, and a gain control means 11a for implementing gain control of the fourth wavelength-multiplexed light amplifying basic unit 35 on the basis of the output information from the fourth wavelength-multiplexed light amplifying basic unit 35.

Furthermore, with this configuration, in FIG. 7, an optical signal from the fourth wavelength-multiplexed light amplifying basic unit 35 is inputted directly to the optical branching section 1a in the optical feedback loop system 34 as indicated by a broken line, thereby accomplishing appropriate control, while, for the user's expansion, another amplifying unit can be connected through a connector 5 to the optical amplifying section 2b of the fourth wavelength-multiplexed light amplifying basic unit 35.

Still furthermore, apart from that indicated by the broken line, in FIG. 7, in the case in which an optical signal from the fourth wavelength-multiplexed light amplifying basic unit 35 is inputted to the wavelength-multiplexed light amplifying basic unit 30b, needless to say, the optical signal is distributed into two in the wavelength-multiplexed light amplifying basic unit 30b indicated at (B), and the output optical signal information from this wavelength-multiplexed light amplifying basic unit 30b is fed back, thereby accomplishing appropriate wavelength-multiplexed light output control. Additionally, the expansion of branch becomes possible through connectors 5.

Figure 8:
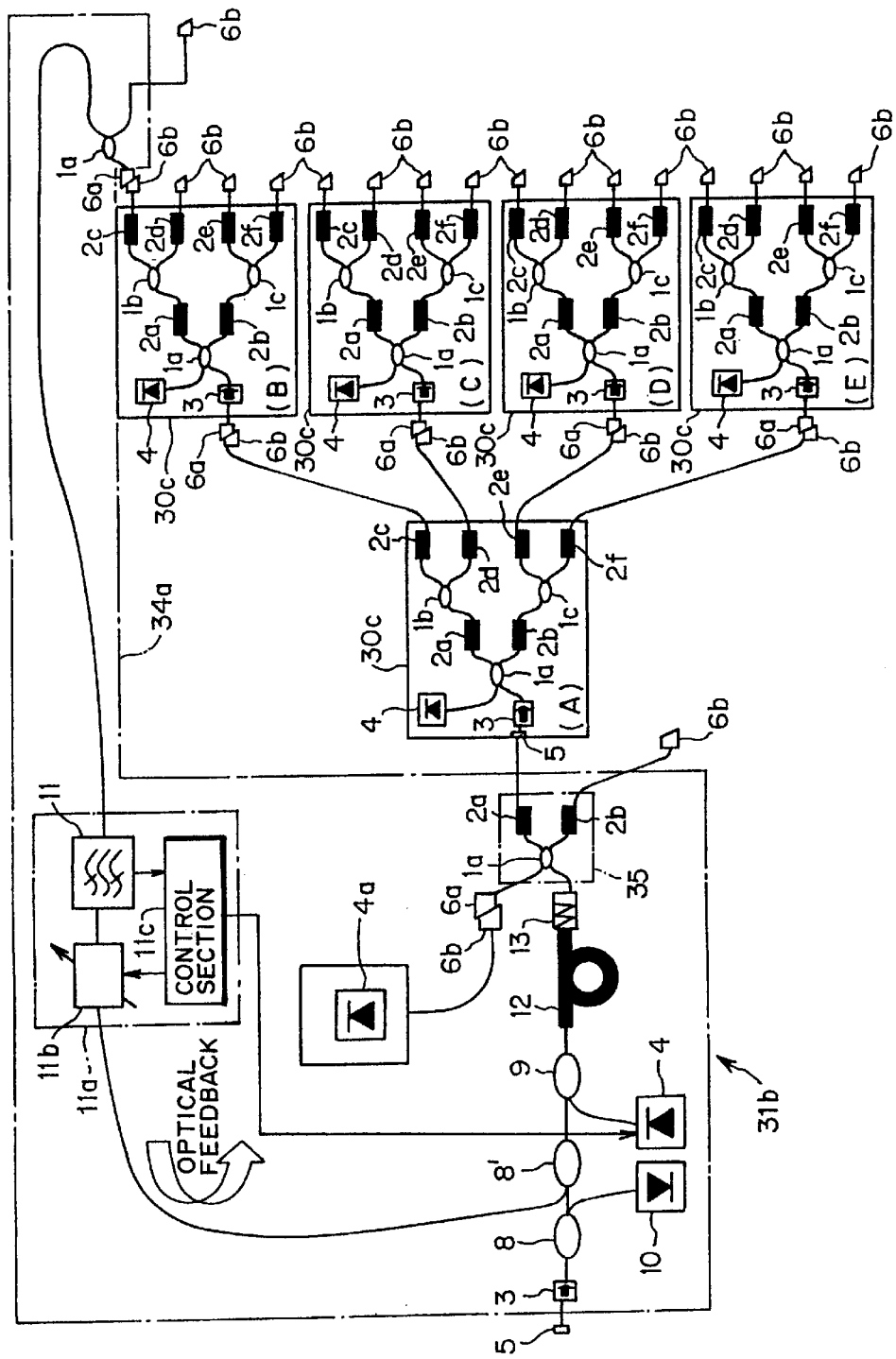
FIG. 8 is an illustration of a wavelength-multiplexed light amplifying apparatus according to a first modification of the first embodiment of this invention.

In this way, with only the fourth wavelength-multiplexed light amplifying basic unit 35, an optical feedback loop system is constructible, so that it is possible to offer it as simplified equipment. Additionally, if the user purchases the wavelength-multiplexed light amplifying basic unit 30b after the introduction of the wavelength-multiplexed light amplifying apparatus 31a, the increase in the number of branches becomes easily feasible without interrupting the current service. (A1) Description of a First Modification of the First Embodiment of the Invention FIG. 8 is an illustration of a wavelength-multiplexed light amplifying apparatus according to a first modification of the first embodiment of this invention. In FIG. 8, a wavelength-multiplexed light amplifying apparatus, is designated generally at numeral 31b, is for distributing one optical signal in 32 directions (distribution into 32 is illustrated), and employs control by an optical feedback. Additionally, as well as the first embodiment, the wavelength-multiplexed light amplifying apparatus 31b principally uses an optical add-and-drop function at a place required.

In FIG. 8, the wavelength-multiplexed light amplifying apparatus 31b is made up of a plurality of wavelength-multiplexed light amplifying units 30c (indicated at (A) to (E) in FIG. 8)] connected in a multistage fashion, and an optical feedback loop system 34a (a left-side part in FIG. 8). Furthermore, each of the wavelength-multiplexed light amplifying units 30c is composed of a first wavelength-multiplexed light amplifying basic unit 31, a second wavelength-multiplexed light amplifying basic unit 32 and a third wavelength-multiplexed light amplifying basic unit 33.

Figure 18:
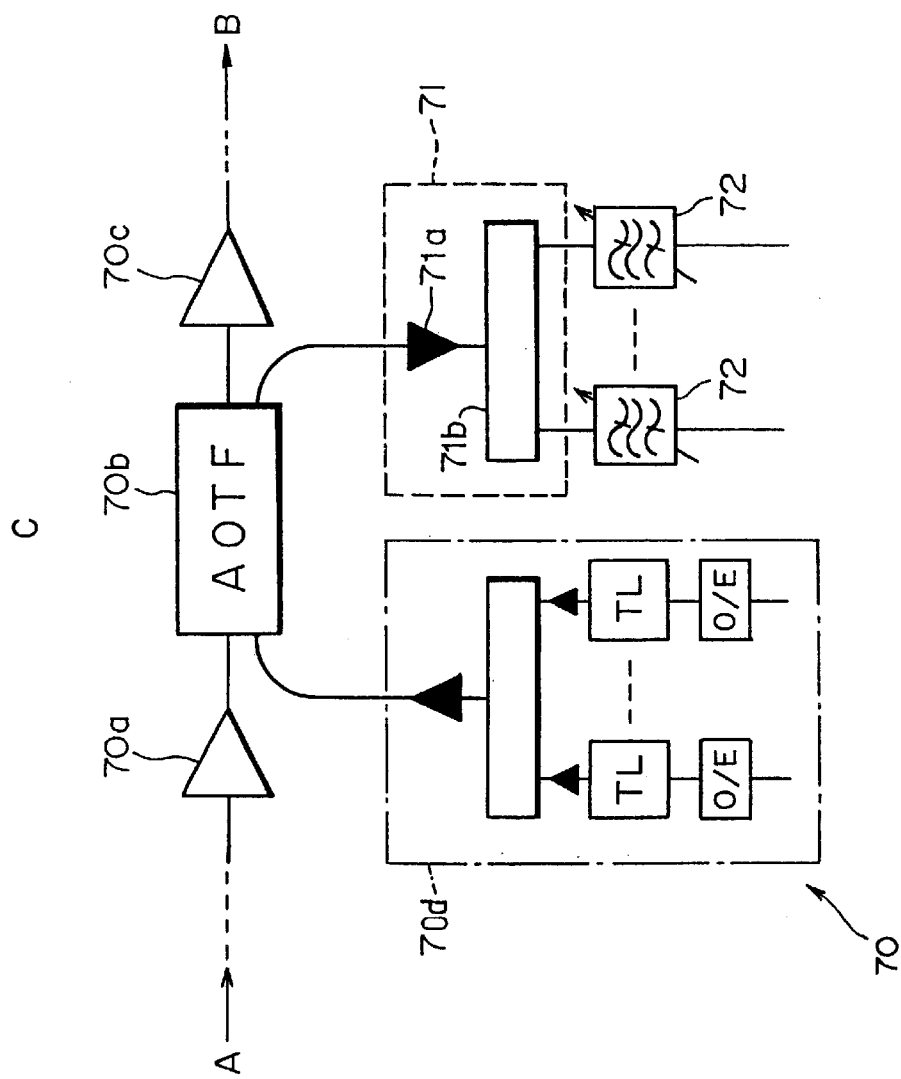
FIG. 18 is an illustration of one example of configuration of an optical add-and-drop multiplexing apparatus.
Figure 19:
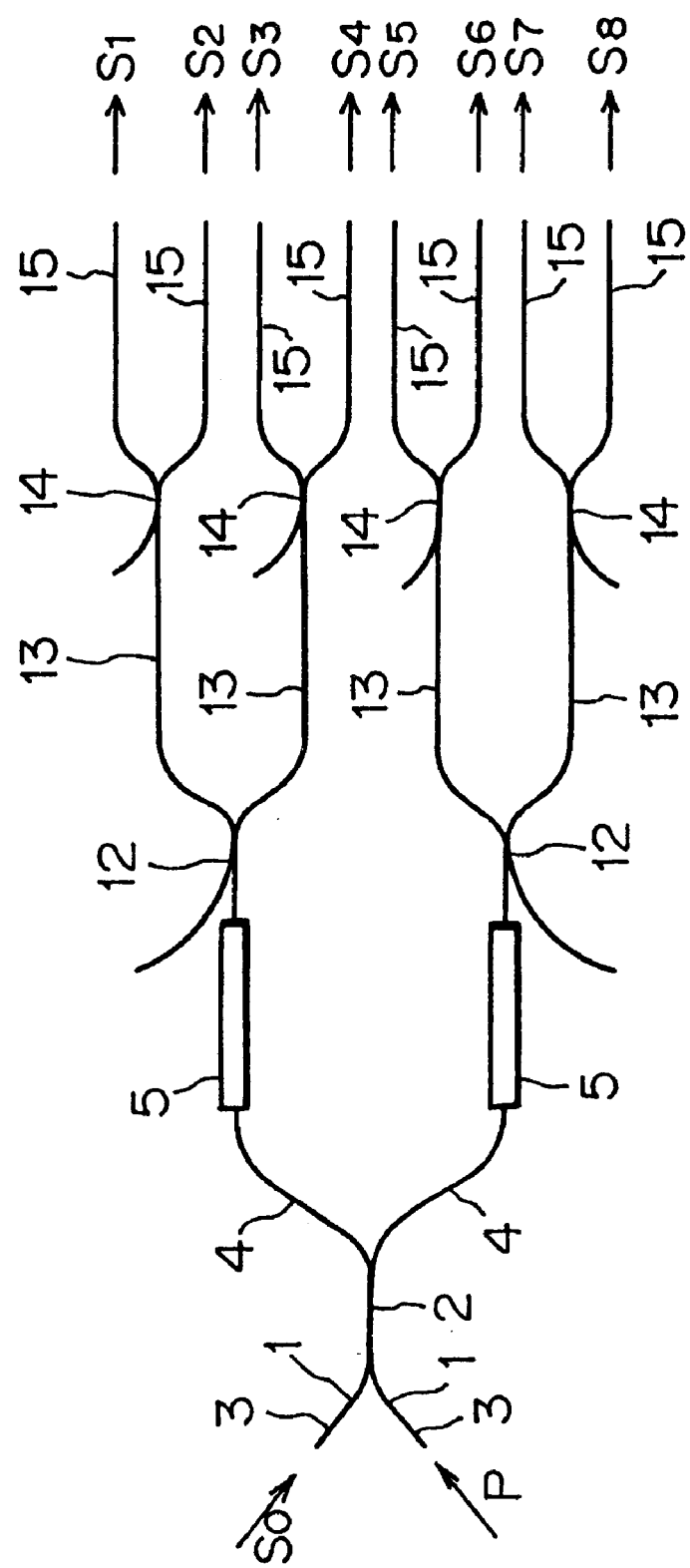
FIG. 19 is an illustration of a configuration of a fiber coupler.

A difference of this wavelength-multiplexed light amplifying unit 30c from the above-described wavelength-multiplexed light amplifying unit 30 is that a connector this wavelength-multiplexed light amplifying unit 30c uses differs and an optical feedback loop system 34a uses an oblique connectors 6a and 6b, different in configuration from that described above, between an auxiliary excitation light source 4a and a fourth wavelength-multiplexed light amplifying basic unit 35 as shown in FIG. 8. The oblique connectors 6a and 6b can prevent useless light amplification by inhibiting the occurrence of light reflection on their connector surfaces. Furthermore, in at least two ((A) and (B) in FIG. 18)] of the aforesaid plurality of wavelength-multiplexed light amplifying units 30c, the output sides of optical amplifying sections 2c and 2d of the second and third wavelength-multiplexed light amplifying basic units 32 and 33 in the preceding side wavelength-multiplexed light amplifying unit 30c (A)] and the input sides of signal input ports $P_2$ of the first wavelength-multiplexed light amplifying basic unit 31 in the following side wavelength-multiplexed light amplifying units 30c ((B) to (E))] are connected through oblique connectors 6a and 6b to each other. Likewise, in FIG. 8, an optical signal outputted from the optical amplifying section 2b in the fourth wavelength-multiplexed light amplifying basic unit 35 is, although omitted, distributed through optical connectors 6b into 16. As FIG. 8 shows, these wavelength-multiplexed light amplifying units 30c are connected in a multistage fashion in a manner that the signal input port $P_1$ of the optical branching section 1a of the first wavelength-multiplexed light amplifying basic unit 31 in one wavelength-multiplexed light amplifying unit 30c is connected to the output side of the optical amplifying section 2c (2d, 2e, 2f) of the second wavelength-multiplexed light amplifying basic unit 32 or the third wavelength-multiplexed light amplifying basic unit 33 in the wavelength-multiplexed light amplifying unit 30c preceding the one wavelength-multiplexed light amplifying unit 30c. The other components marked with the same reference numerals as those used above are identical to or correspond in function to those described above, and the description will be omitted for simplicity.

Figure 9:
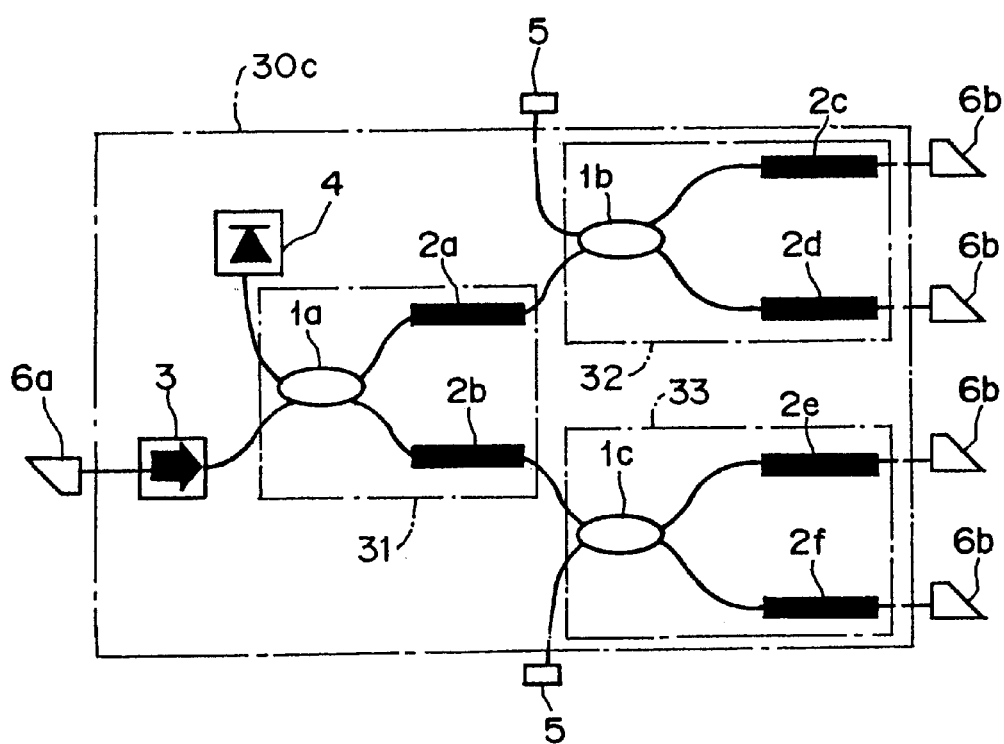
FIG. 9 is a block diagram showing a configuration of a wavelength-multiplexed light amplifying unit in the first modification of the first embodiment of this invention.

FIG. 9 is a block diagram showing a configuration of a wavelength-multiplexed light amplifying unit according to the first modification of the first embodiment of this invention. In FIG. 9, the wavelength-multiplexed light amplifying unit 30c is made up of the three basic units, that is, the first wavelength-multiplexed light amplifying basic unit 31 comprising an optical branching section 1a and optical amplifying sections 2a and 2b, the second wavelength-multiplexed light amplifying basic unit 32 comprising an optical branching section 1b and optical amplifying sections 2c and 2d and the third wavelength-multiplexed light amplifying basic unit 33 comprising an optical branching section 1c and optical amplifying sections 2e and 2f, and further includes an optical isolator 3 and an excitation light source 4 preceding the first wavelength-multiplexed light amplifying basic unit 31. Additionally, connectors 5 are provided at the input port $P_1$ of the optical branching section 1b and at the input port $P_2$ of the optical branching section 1c, respectively, while a connector 6a is placed on the input side of the optical isolator 3 and connectors 6b are placed on the output sides of the optical amplifying sections 2c, 2d, 2e and 2f.

This configuration operates similarly to the above-described operation, and additionally prevents useless light amplification because the connection made through the oblique connectors 6a and 6b prevents the light reflection on the connector surfaces.

Incidentally, it is also possible to, instead of the plurality of wavelength-multiplexed light amplifying units 30c shown in FIG. 8, employ wavelength-multiplexed light amplifying basic units 30b (see FIG. 6) comprising a set of units. That is, in two wavelength-multiplexed light amplifying basic units 30b, the connections between the output sides (see FIG. 6) of the optical amplifying sections 2a and 2b in the preceding side wavelength-multiplexed light amplifying basic unit 30b and the input sides of the signal input ports $P_2$ in the following side wavelength-multiplexed light amplifying basic units 30c can also be made through the oblique connectors 6a and 6b.

Furthermore, it is also possible that a leakage optical signal is again inputted as an excitation light source in the other wavelength-multiplexed light amplifying basic unit 30c.

Figure 16:
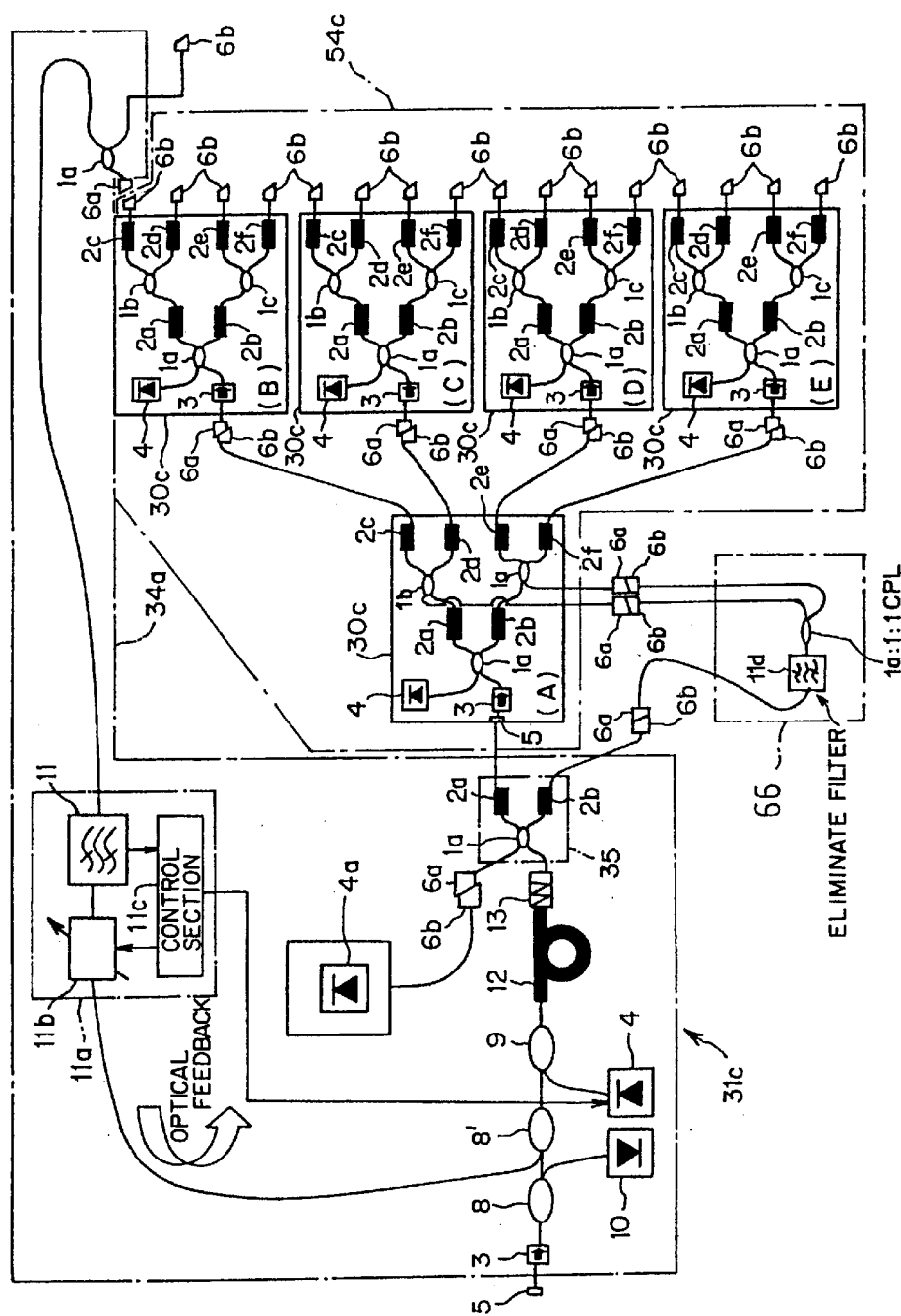
FIG. 16 is an illustration of a different wavelength-multiplexed light amplifying apparatus according to a first modification of the first embodiment of this invention.

FIG. 16 is an illustration of a different wavelength-multiplexed light amplifying apparatus according to the first modification of the first embodiment of this invention, where the wavelength-multiplexed light amplifying apparatus 31c has a configuration in which an excitation light re-inputting section 66 is added to the wavelength-multiplexed light amplifying apparatus 31b shown in FIG. 8 in a state where oblique connectors 6b and 6a are interposed therebetween.

This excitation light re-inputting section 66 is interposed between a fourth wavelength-multiplexed light amplifying basic unit 35 and a wavelength-multiplexed light amplifying unit 30c, designated at (A), placed at the forefront position (which will be referred to hereinafter as a wavelength-multiplexed light amplifying 30c(A)) for removing a wavelength-multiplexed optical signal component from a leakage optical signal outputted from the fourth wavelength-multiplexed light amplifying basic unit 35 to extract excitation light so that this excitation light is branched into a plurality of lights. The excitation light re-inputting section 66 is made up of a wavelength-multiplexed optical signal removing filter 11d and an optical branching (1:1 CPL) 1a.

The wavelength-multiplexed optical signal removing filter 11d is for eliminating the wavelength-multiplexed optical signal component from the leakage optical signal outputted from the fourth wavelength-multiplexed light amplifying basic unit 35 to extract excitation light.

Furthermore, the optical branching section 1a is connected to the wavelength-multiplexed optical signal removing filter 11d, and its output side is further connected to a signal input port of the second wavelength-multiplexed light amplifying basic unit 32 in the wavelength-multiplexed light amplifying unit 30c(A) and to a signal input port of the third wavelength-multiplexed light amplifying basic unit 33, thus putting the excitation light extracted by the wavelength-multiplexed optical signal removing filter 11d into the wavelength-multiplexed light amplifying unit 30c(A). For example, this function is realizable with a 1:1 optical coupler.

With this configuration, after passing through the connectors 6b and 6a, of large leakage excitation light developing from the fourth wavelength-multiplexed light amplifying basic unit 35, the signal light is blocked by the wavelength-multiplexed optical signal removing filter 11d, and the optical signal subjected to the filtering is branched into two which in turn, are inputted through the oblique connectors 6b and 6a to an input port $P_1$ of an optical branching section 1b and an input port P2 of an optical branching section 1c in the wavelength-multiplexed light amplifying unit 30c(A) (see FIG. 3).

Accordingly, since the leakage excitation light can be used again so that efficient amplification becomes also possible. Additionally, since the leakage excitation light is inputted to the most upstream side of the wavelength-multiplexed light amplifying units 30c connected in a multistage fashion, useless light amplification is preventable.

Furthermore, in addition to the wavelength-multiplexed light amplifying apparatus 31b (see FIG. 8), the excitation light re-inputting section 66 can also be connected to the wavelength-multiplexed light amplifying apparatus 31a shown in FIG. 7. In this case, the wavelength-multiplexed optical signal removing filter 11d removes a wavelength-multiplexed optical signal component from a leakage optical signal outputted from the fourth wavelength-multiplexed light amplifying basic unit 35 to extract excitation light, while the optical branching section 1c is connected to the wavelength-multiplexed optical signal removing filter 11d, and its output side is connected to the other input port of the wavelength-multiplexed light amplifying unit 35, with the excitation light extracted by the wavelength-multiplexed optical signal removing filter 11d is inputted to the wavelength-multiplexed light amplifying basic unit 30b.

Additionally, this excitation light re-inputting section 66 can also be used for the wavelength-multiplexed light amplifying apparatus shown in FIGS. 1, 10, 11 and 13.

Figure 10:
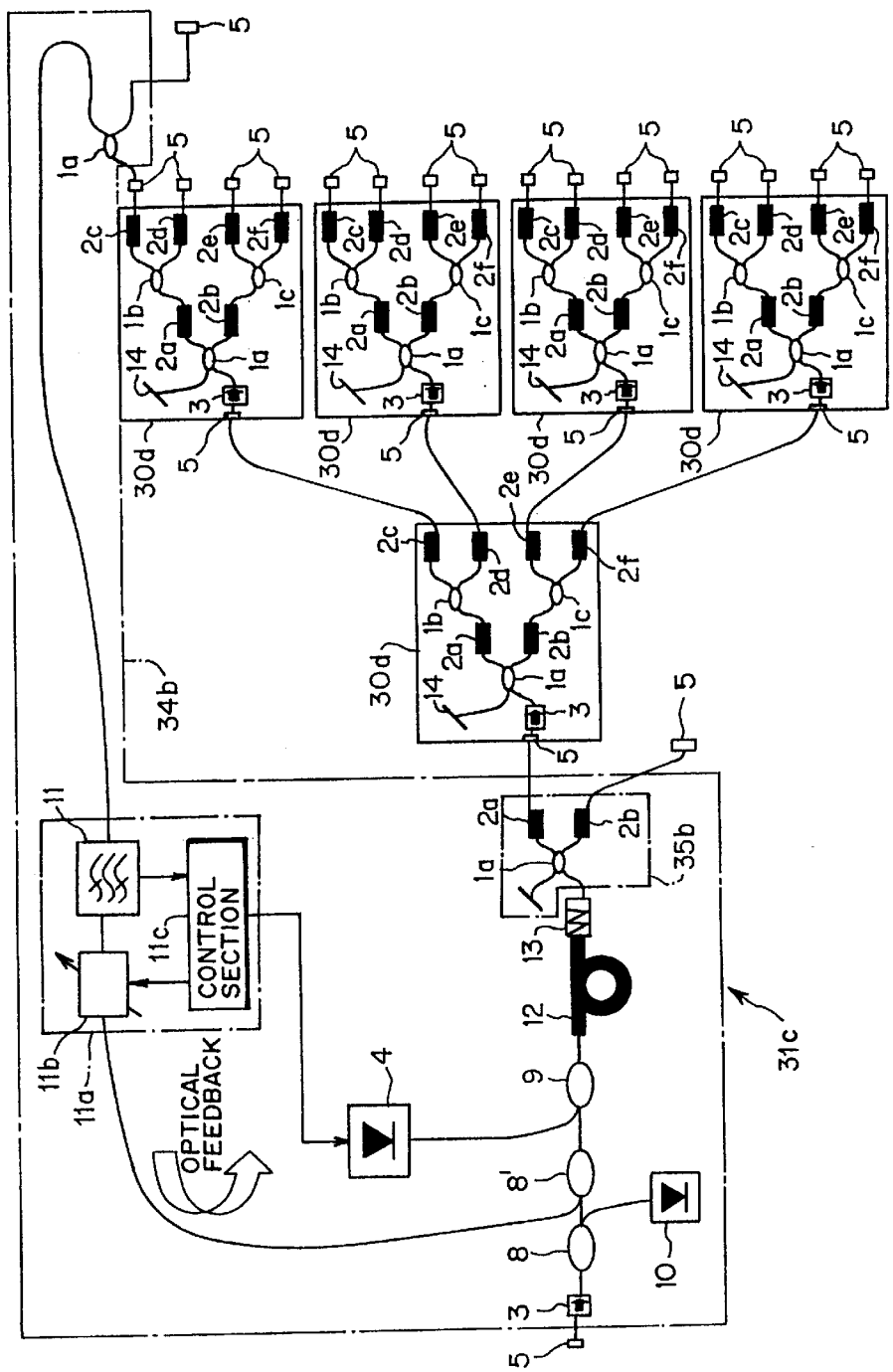
FIG. 10 is an illustration of a wavelength-multiplexed light amplifying apparatus according to a second modification of the first embodiment of this invention.

Thus, since the leakage excitation light can be reused, similarly efficient amplification is achievable. (A2) Description of a Second Modification of the First Embodiment of the Invention FIG. 10 is an illustration of a wavelength-multiplexed light amplifying apparatus according to a second modification of the first embodiment of this invention. In FIG. 10, a wavelength-multiplexed light amplifying apparatus, designated generally at numeral 31c, is for distributing one optical signal in 32 directions (of these, 16 distributions illustrated), and employs optical feedback control, principally uses an optical add-and-drop function at a place required.

In FIG. 10, the wavelength-multiplexed light amplifying apparatus 31c is made up of a plurality of wavelength-multiplexed light amplifying units 30d arranged in a multistage fashion and an optical feedback loop system 34b. The difference of this wavelength-multiplexed light amplifying unit 30d from the above-described wavelength-multiplexed light amplifying unit 30 is that all the free ports of this wavelength-multiplexed light amplifying unit 30d are terminated. Additionally, the optical feedback loop system 34b is provided with an optical branching section 1a, a gain control means 11a, an optical isolator 3, an optical coupler 8, an LD 10, an optical coupler 8', an excitation light source 4, a multiplexer 9, an EDFA 12 and a gain equalizer 13, and further equipped with a fourth wavelength-multiplexed light amplifying basic unit 35b. A port $P_1$ of this fourth wavelength-multiplexed light amplifying basic unit 35b is terminated by a terminator 14, and this optical feedback loop system 34b does not have an auxiliary excitation light source 4a (see FIG. 1 and other illustrations), but the excitation light source 4 has a power sufficient to excite the rearmost wavelength-multiplexed light amplifying unit 30d. The other components marked with the same reference numerals as those used above are identical to or correspond in function to those described above, and the description will be omitted for simplicity.

Furthermore, these wavelength-multiplexed light amplifying units 30d are arranged in a multistage fashion in a manner that the signal input port $P_1$ of the optical branching section 1a of the first wavelength-multiplexed light amplifying basic unit 31 in one wavelength-multiplexed light amplifying unit 30d is connected to the output side of the optical amplifying section 2c (2d, 2e, 2f) of the second wavelength-multiplexed light amplifying basic unit 32 or the third wavelength-multiplexed light amplifying basic unit 33 in the wavelength-multiplexed light amplifying unit 30d preceding the amplifying unit 30d. Similarly, an optical signal outputted from the optical amplifying section 2b in the fourth wavelength-multiplexed light amplifying basic unit 35b shown in FIG. 10 is, although omitted from the illustration, distributed into 16, thereby realizing the broadcast function.

This configuration operates similarly to that described above to offer the same effects. Additionally, since the optical power from the excitation light source 4 is distributed equally, there is no need to install the excitation light source 4 in the intermediate wavelength-multiplexed light amplifying units 30d.

(B) Description of a Second Embodiment of the Invention

It is also possible to employ a feedback loop system control method different from that in the first embodiment. That is, it is also possible to control the feedback loop system in an electrical area without controlling it in an optical area.

Figure 11:
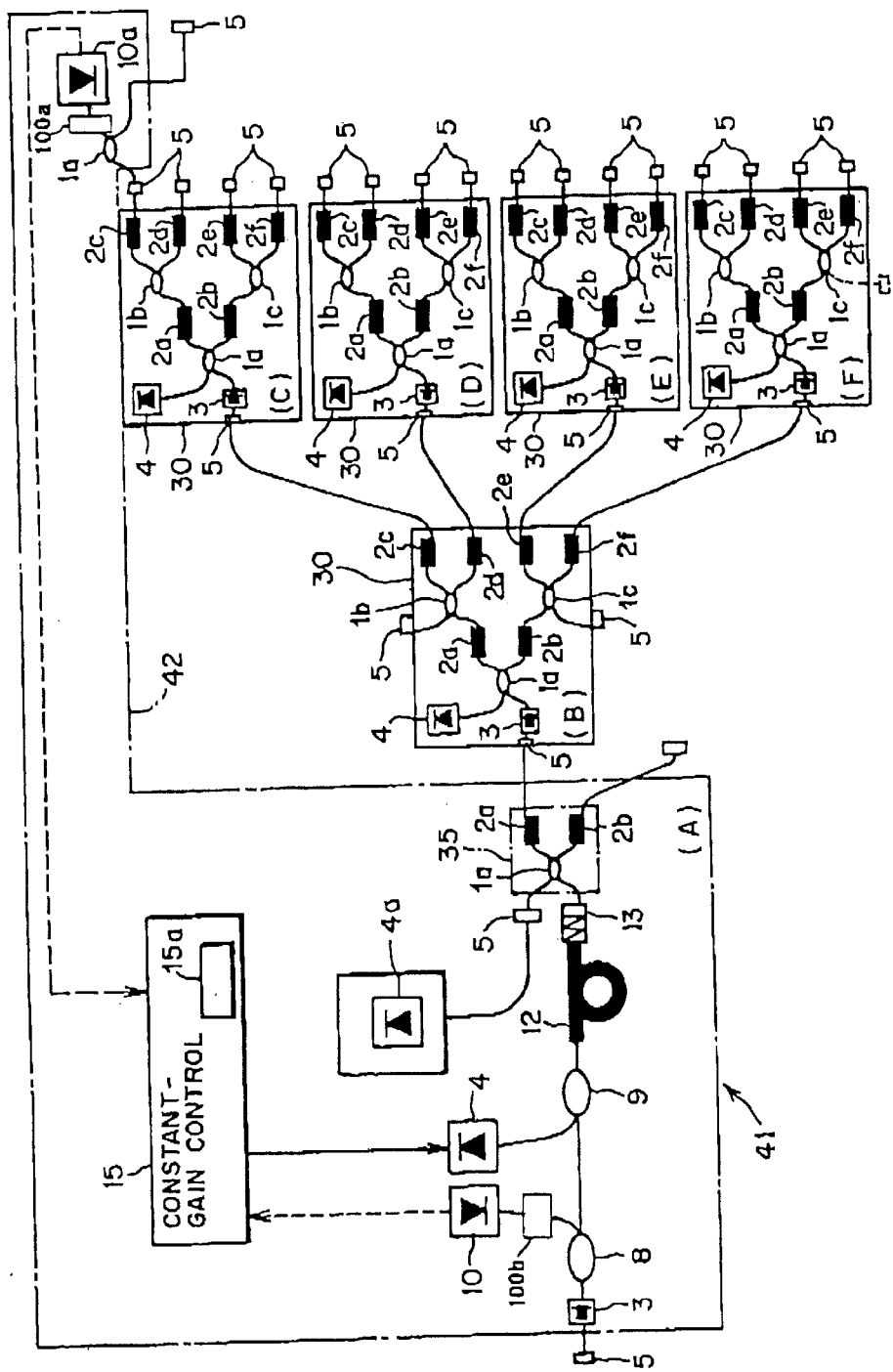
FIG. 11 is an illustration of a wavelength-multiplexed light amplifying apparatus according to a second embodiment of this invention.

FIG. 11 is an illustration of a wavelength-multiplexed light amplifying apparatus according to a second embodiment of this invention. A wavelength-multiplexed light amplifying apparatus, designated generally at reference numeral 41 in FIG. 11, is for distributing one optical signal in 32 directions (of these, 16 distributions illustrated), and uses control based upon an optical feedback. Furthermore, the wavelength-multiplexed light amplifying apparatus 41 in FIG. 11 is mainly used as an optical add-and-drop apparatus.

In FIG. 11, the wavelength-multiplexed light amplifying apparatus 41 is made up of a plurality of wavelength-multiplexed light amplifying units 30 ((B) to (F))] connected in a multistage fashion and an optical feedback loop system 42 (a left-side part in FIG. 11). Additionally, these wavelength-multiplexed light amplifying units 30 are arranged in a multistage fashion in a manner that the signal input port $P_1$ of the optical branching section 1a of a first wavelength-multiplexed light amplifying basic unit 31 in one wavelength-multiplexed light amplifying unit 30 is connected to the output side of an optical amplifying section 2c (2d, 2e, 2f) of a second wavelength-multiplexed light amplifying basic unit 32 or a third wavelength-multiplexed light amplifying basic unit 33 in the preceding wavelength-multiplexed light amplifying unit 30. Accordingly, when viewed from each of connectors 5 on the output sides, the branch and the amplification are conducted alternately. The other components marked with the same reference numerals as those used above are identical to or correspond in function to those described above, and the description thereof will be omitted for brevity.

Meanwhile, the optical feedback loop system 42 in FIG. 11 is constructed as follows. That is, this optical feedback loop system 42 is made up of an output monitor system section including an optical branching section 1a and an optical filter 100a, a PD 10a, a gain control means 15, an input monitor system section including an optical isolator 3, an optical coupler 8 and an optical filter 100b, a PD 10, and an optical signal outputting section including an excitation light source 4, a multiplexer 9, an EDFA 12, a gain equalizer 13, a fourth wavelength-multiplexed light amplifying basic unit 35, an auxiliary excitation light source 4a and a connector 5.

In this configuration, the optical branching section 1a, the PD 10a, the optical isolator 3, the optical coupler 8, the PD 10, the excitation light source 4, the multiplexer 9, the EDFA 12, the gain equalizer 13, the fourth wavelength-multiplexed light amplifying basic unit 35, the auxiliary excitation light source 4a and the connector 5 are identical to or correspond in function to those described above, respectively, and the description thereof will be omitted for brevity. Furthermore, the PD 10a has a function to output-monitor an optical signal, inputted to this optical feedback loop system 42, through the optical branching section 1a and the optical filter 100a.

On the other hand, to monitor an input level, the optical filter 100b is provided between the PD 10 and the optical coupler 8.

This optical filter 100b allows a passing of a signal light component as well as removes the excitation light component from the optical signal outputted from the optical coupler 8. And this function is also realized by using a long wavelength pass filter or a band pass filter, and the long wavelength pass filter is more profitable than the band pass filter as the optical filter 100b.

Thus, the optical amplifier of the present invention comprises an optical filter 100a, which is provided on the input side of above-described monitor (PD 10a), allows a passing of a signal light component as well as removes the excitation light component from the optical signal.

Further, the optical amplifier of the present invention comprises the optical filter 100b, which is provided between the optical coupler 8 and the PD 10, allows a passing of a signal light component as well as removes the excitation light component from the input light.

In other words, the wavelength-multiplexed light amplifying apparatus of the present invention comprises an optical filter 100a, which is provided on the input side of above-described monitor (PD 10a), allows a passing of a signal light component as well as removes the excitation light component from the optical signal outputted from the rearmost wavelength-multiplexed light amplifying unit 30

(indicated at (C))] of the plurality of wavelength-multiplexed light amplifying basic units 30 (indicated at (B)–(F))] arranged in a multistage fashion.

Further, the wavelength-multiplexed light amplifying apparatus of the present invention comprises an input monitor means and the input monitor means includes an optical filter 100b which allows a passing of a signal light component from the input light as well as removes the excitation light component from the input light.

From the foregoing, as for an output monitoring, one of the output lights from the optical branching section 1a in the optical feedback loop system 42 is inputted to the optical filter 100a and the component of the excitation light.

And as for the input monitoring, in the optical coupler 8, the light outputted from the optical isolator 3 is split into two. And in the optical filter 100b, the component of the wavelength band of the excitation light of one of the split light is inputted to the gain control means 15.

In this manner, by eliminating the excitation light component, an accuracy of the output monitoring and the input monitoring increases.

The gain control means 15 produces a gain control signal on the basis of the aforesaid output information and the detection result by the PD 10, and supplies the produced gain control signal to the excitation light source 4 provided on the input side of the gain equalizer 13 for controlling the excitation condition of the excitation light source 4. The gain control means 15 includes a control section 15a. The control section 15a receives an electric signal to control the excitation condition of the excitation light source 4.

Figure 12:
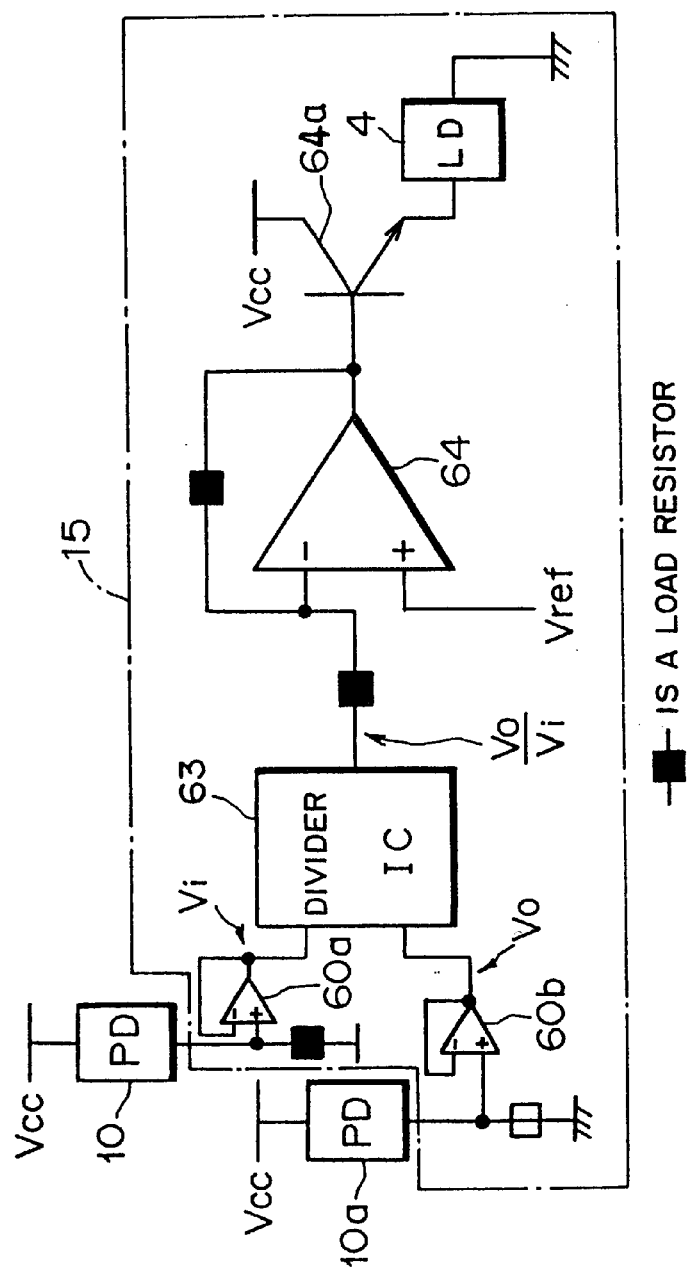
FIG. 12 is an illustration of one example of configuration of a gain control means in the second embodiment of this invention.

FIG. 12 is an illustration of one configuration example of the gain control means 15 in the second embodiment of this invention. A circuit shown in FIG. 12 is made up of the input monitor PD 10, the output monitor PD 10a and the gain control means 15. In FIG. 12, an input optical signal is detected by the PD 10, and then inputted as an electric signal to an amplifier 60a of the gain control means 15 to be amplified in this amplifier 60a, and further inputted as $V_i$ to a divider 63. Likewise, in FIG. 12, an output optical signal is detected by the PD 10a and inputted as an electric signal to an amplifier 60b of the gain control means 15 to be amplified in this amplifier 60b, and further inputted as $V_o$ to the divider 63. Additionally, in the divider 63, a calculation of $V_o/V_i$ is conducted and a signal representative of the multiplication of that calculation result by a reference voltage $V_{ref}$ is inverted and inputted to an amplifier 64. In the output of this amplifier 64, when the optical output is large (when $V_o/V_i$ is larger than 1), a negative voltage appears. Accordingly, the output of the amplifier 64 is inputted to a transistor 64a so that its base voltage decreases, which reduces the output of the excitation light source 4. The reverse operation is performed similarly. That is, the divider 63 performs the calculation of $V_o/V_i$, and if the $V_o/V_i$ is smaller than 1, tin the output of the amplifier 64, a positive voltage develops. Therefore, the output thereof is inputted to the transistor 64a so that its base voltage increases, which increases the output of the excitation light source 4.

Thus, an operational flow in the wavelength-multiplexed light amplifying apparatus 41 shown in FIG. 11 is as follows. That is, an optical signal outputted from the fourth wavelength-multiplexed light amplifying basic unit 35 ((A) in FIG. 11)] is inputted to the wavelength-multiplexed light amplifying unit 30 ((B) in FIG. 11)] where it is branched into four. These four branched optical signals are inputted to the wavelength-multiplexed light amplifying units 30 indicated at (C) to (F) in FIG. 11, thus accomplishing distribution into 16. Likewise, although not illustrated in FIG. 11, an optical signal outputted from the optical amplifying section 2b of the fourth wavelength-multiplexed light amplifying basic unit 35 also undergoes distribution into 16.

Furthermore, an optical signal outputted from the wavelength-multiplexed light amplifying unit 30 is inputted to the optical branching section 1a in the optical feedback loop system 42, and an optical signal from this optical branching section 1a is O/E-converted in the PD 10a so that its power is inputted as output information to the gain control means 15. Furthermore, the optical power from the preceding unit is detected in the PD 10 and inputted to the gain control means 15. Still furthermore, on the basis of the output information and the detection result in the input monitor, a gain control signal is produced in the gain control means 15, and is supplied to the excitation light source 4 provided on the input side of the gain equalizer 13 to control the excitation condition of the excitation light source 4. Moreover, an optical signal from the preceding unit and an optical signal from the excitation light source 4 controlled are multiplexed in the multiplexer 9 and an optical signal obtained by the multiplexing is amplified optically in the EDFA 12 and gain-equalized in the gain equalizer 13. An optical signal outputted from this gain equalizer 13 is coupled with an optical signal form the auxiliary excitation light source 4a in the optical branching section 1a in the fourth wavelength-multiplexed light amplifying basic unit 35, and then outputted again. Incidentally, although omitted in FIG. 11, an optical signal outputted from the optical amplifying section 2b in the fourth wavelength-multiplexed light amplifying basic unit 35 also undergoes distribution into 16, thereby realizing the broadcast function.

With this configuration, an optical signal from the fourth wavelength-multiplexed light amplifying basic unit 35 is broadcasted to be distributed into a desired number and the feedback control is implemented using the input monitor signal in the forefront unit and the output information in the rearmost unit, which enables appropriate wavelength-multiplexed light output control.

That is, in FIG. 11, an optical signal of 18 dBm inputted to the optical branching section 1a in the fourth wavelength-multiplexed light amplifying basic unit 35 becomes 15 dBm at the output of the optical branching section 1a, and additionally gets a gain of 3 dB in the optical amplifying section 2a to be outputted at 18 dBm from the optical amplifying section 2a. Furthermore, this optical signal of 18 dBm becomes 15 dBm because of branch into two in the optical branching section 1a of the first wavelength-multiplexed light amplifying basic unit 31 in the wavelength-multiplexed light amplifying unit 30 indicated at (B), and further gets a gain of 3 dB in the optical amplifying section 2a to again reach 18 dBm at the sections 1a to 1c are connected alternately, a resistance to the reflection develops, which eliminates the need for a configuration in which each of the optical amplifying sections 2a to 2f is interposed between optical isolators 3, so that the excess loss of the system including the optical amplifiers and distribution systems is reducible. Accordingly, regardless of no installation of the optical isolators, the stabilization condition of $R_1 \cdot R_2 \cdot G^2 \ll 1$ is satisfied, thus ensuring stable operation.

Still furthermore, since this wavelength-multiplexed light amplifying apparatus 41 utilizes a free port (one of two input port of each of the optical branching sections 1a to 1c) in the distribution systems, it is possible to eliminate the need for the multiplexer 9 which multiplexes the excitation light and signal light together, or to reduce the required number thereof.

Moreover, this wavelength-multiplexed light amplifying apparatus 41 can provide the expansion in the in-service. That is, after the introduction of this wavelength-multiplexed light amplifying apparatus 41, the branches according to the user's demand can be made very easily, and the expansion in the number of branches can be made easily without interrupting the current service: therefore, the service is improvable.

In addition, for example, if the unit (A) has a power sufficient to excite the following wavelength-multiplexed light amplifying units 30, the excitation light source 4 for the units (B) to (F) becomes unnecessary. Meanwhile, the excitation light source 4 can be installed for the unit (B) when needed, or the excitation light sources 4 can also be connected to all the wavelength-multiplexed light amplifying units 30 ((B) to (F))]. This signifies the flexible employment of the excitation method. Still additionally, it is also acceptable that one large-output excitation light source 4 is prepared and connected to the wavelength-multiplexed light amplifying units 30.

Furthermore, since, in this wavelength-multiplexed light amplifying apparatus 41, the optical amplifying sections (EDFA) 2a to 2f, the optical couplers 1a to 1c, the optical switches, the excitation light sources 4 and the optical isolators 3 constituting its optical components are designed to have the same characteristic, so that the wavelength-multiplexed light amplifying apparatus 41 is suitable for the mass production and has excellent expansion. For example, in FIG. 11, the units (B) to (F) except (A) are completely identical in configuration to each other, which enables the mass production.

Still furthermore, it can also be considered that the system is constructed by the wavelength-multiplexed light amplifying basic units 30b shown in FIG. 6, in place of the wavelength-multiplexed light amplifying units 30 shown in FIG. 11. That is, this wavelength-multiplexed light amplifying apparatus 41 is made up of the plurality of wavelength-multiplexed light amplifying basic units 30b connected in a multistage fashion and the optical feedback loop system 42.

Each of these wavelength-multiplexed light amplifying basic units 30b is composed of the optical branching section 1a having the two input ports $P_1$ and $P_2$ and the two output ports $P_3$ and $P_4$ for receiving a wavelength-multiplexed optical signal comprising optical signals of a plurality of wavelengths through the signal input port $P_2$ forming one of the two input ports $P_1$ and $P_2$ and for outputting the wavelength-multiplexed optical signal through the two output ports $P_3$ and P4, and the optical amplifying sections 2a and 2b connected to the output ports $P_3$ and $P_4$ of the optical branching section 1a, respectively. These wavelength-multiplexed light amplifying basic units 30b are connected in a multistage fashion in a manner that the signal input port $P_2$ of the optical branching section 1a is connected to the output side of the optical amplifying section 2a or 2b in the preceding wavelength-multiplexed light amplifying basic unit 30b.

Yet furthermore, the optical feedback loop system 42 is made up of the excitation light source 4, the multiplexer 9 for multiplexing an excitation light from the excitation light source 4 and a wavelength-multiplexed optical signal together, the gain equalizer 13 put between the multiplexer 9 and the signal input port $P_2$ of the forefront unit 30b (indicated at (A))] of the plurality of wavelength-multiplexed light amplifying basic units 30b arranged in a multistage fashion, and the gain control means 15 for controlling the gains of the plurality of wavelength-multiplexed light amplifying basic units 30b on the basis of output information from the rearmost unit 30b of the plurality of wavelength-multiplexed light amplifying basic units 30b arranged in the multistage fashion.

Moreover, the input monitor (PD 10) is provided to detect the input to the forefront unit 30b of the plurality of wavelength-multiplexed light amplifying basic units 30b disposed in the multistage fashion, and the gain control means 15 includes the control section 15a which produces a gain control signal on the basis of the output information and the detection result by the input monitor (PD 10) and supplies the produced gain control signal to the excitation light source 4 placed on the input side of the gain equalizer 13 to control the excitation condition of the excitation light source 4.

Incidentally, it is also possible that the system is constructed using only one wavelength-multiplexed light amplifying unit, as well as the system according to the first embodiment described above with reference to FIG. 7.

Figure 13:
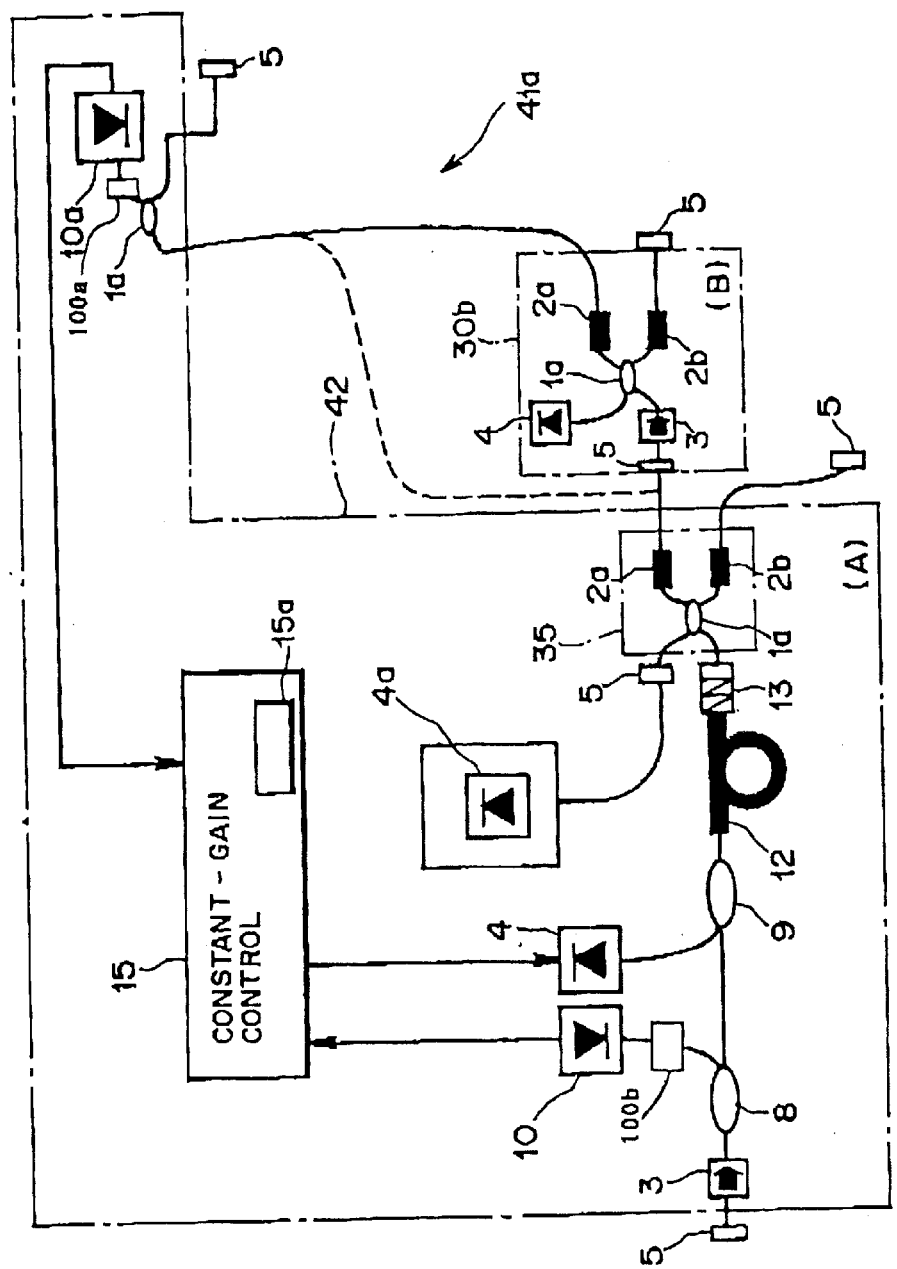
FIG. 13 is an illustration of another wavelength-multiplexed light amplifying apparatus according to the second embodiment of this invention.

FIG. 13 is an illustration of another wavelength-multiplexed light amplifying apparatus according to the second embodiment of this invention. A wavelength-multiplexed light amplifying apparatus 41a shown in FIG. 13 is made up of a wavelength-multiplexed light amplifying basic unit 30b and an optical feedback loop system 42. In this configuration, let it be considered that, as indicated by an broken line in FIG. 13, light outputted from a fourth wavelength-multiplexed light amplifying basic unit 35 in the optical feedback loop system 42 is inputted directly to an optical branching section 1a in the optical feedback loop system 42.

In FIG. 13, the fourth wavelength-multiplexed light amplifying basic unit 35 in the optical feedback loop system 42 is provided with the optical branching section 1a constructed as a 1:1 optical coupler and optical amplifying sections 2a and 2b having a gain equivalent to the branch loss in the optical branching section 1a or having a gain lower than that branch loss. Additionally, an auxiliary excitation light source 4a is connected to an input port $P_1$ of the optical branching section 1a, while an optical isolator 3 is connected through an optical coupler 8, a multiplexer 9, an EDFA 12 and a gain equalizer 13 to an signal input port $P_2$ thereof. Incidentally, the optical branching section 1a, the optical amplifying sections 2a and 2b and the connecting section between the optical branching section 1a and the optical amplifying sections 2a and 2b in the fourth wavelength-multiplexed light amplifying basic unit 35 can also be constructed using an optical waveguide made of a glass or a semiconductor.

Furthermore, the optical feedback loop system 42 includes an optical branching section 1a, an optical filter 100a, a PD 10a, a gain control means 15, a PD 10, an optical isolator 3, an optical coupler 8, an optical filter 100b, an excitation light source 4, a multiplexer 9, an EDFA 12, a gain equalizer 13, an auxiliary excitation light source 4a, a connector 5, and the fourth wavelength-multiplexed light amplifying basic unit 35. These are the as those described above, and the description thereof will be omitted for brevity. Additionally, the input to the fourth wavelength-multiplexed light amplifying basic unit 35 is detected by the PD 10, and the output optical power is detected by the PD 10a and outputted as output information. Still furthermore, in the control section 15a of the gain control means 15, a gain control signal is produced on the basis of the detection result and the output information and supplied to the excitation light source 4 placed on the input side of the gain equalizer 13 to control the excitation condition of the excitation light source 4.

Thus, this wavelength-multiplexed light amplifying apparatus 41a includes the fourth wavelength-multiplexed light amplifying basic unit 35 composed of the optical branching section 1a having two input ports $P_1$ and $P_2$ and two output ports $P_3$ and $P_4$ for receiving a wavelength-multiplexed optical signal comprising optical signals of a plurality of wavelengths through the signal input port $P_2$ forming one of the two input ports $P_1$ and $P_2$ and for outputting the wavelength-multiplexed optical signal through the two output ports $P_3$ and $P_4$ and optical amplifying sections 2a and 2b connected to the two output ports $P_3$ and $P_4$ of the optical branching section 1a, respectively, and further includes the excitation light source 4, the multiplexer 9 for multiplexing the excitation light from the excitation light source 4 and a wavelength-multiplexed optical signal together, the gain equalizer 13 put between the multiplexer 9 and the signal input port 2, in the fourth wavelength-multiplexed light amplifying basic unit 35, and the gain control means for controlling the gain of the fourth wavelength-multiplexed light amplifying basic unit 35 on the basis of the output signal from the fourth wavelength-multiplexed light amplifying basic unit 35.

With this configuration shown in FIG. 13, an optical signal from the fourth wavelength-multiplexed light amplifying basic unit 35 is, as indicated by an broken line, inputted directly to the optical branching section 1a in the optical feedback loop 42 for proper control, while another amplifying unit can be connected through the connector 5 to the optical amplifying section 2b of the fourth wavelength-multiplexed light amplifying basic unit 35 for user's extension.

In addition, in FIG. 13, apart from the case indicated by the broken line, in the case in which the optical signal from the fourth wavelength-multiplexed light amplifying basic unit 35 is inputted to the wavelength-multiplexed light amplifying basic unit 30b, needless to say, in the wavelength-multiplexed light amplifying basic unit 30b indicated at (B), the optical signal is distributed into two to be broadcasted, and the output optical signal from this wavelength-multiplexed light amplifying basic unit 30b is O/E-converted and fed back as output information, thereby accomplishing proper wavelength-multiplexed light output control. Additionally, the branch expansion becomes possible through the use of connectors 5.

In this way, even using only the fourth wavelength-multiplexed light amplifying basic unit 35, an optical feedback loop system is constructible, thus offering simplified equipment. Furthermore, if the user purchases this wavelength-multiplexed light amplifying basic unit 30b newly and additionally after the introduction of the wavelength-multiplexed light amplifying apparatus 41a, it is possible to increase the number of branches easily without interrupting the current service.

The present invention is not limited to the above-described embodiments, but can be used in various ways.

It is also possible to use a semi-fixed optical attenuator in place of the variable attenuator 11b, or to use connectors 6a and 6b in place of the connectors 5 in the second embodiment.

In addition, owing to the broadcast function, this invention is also applicable to a distribution system such as an optical subscriber system.

Figure 14:
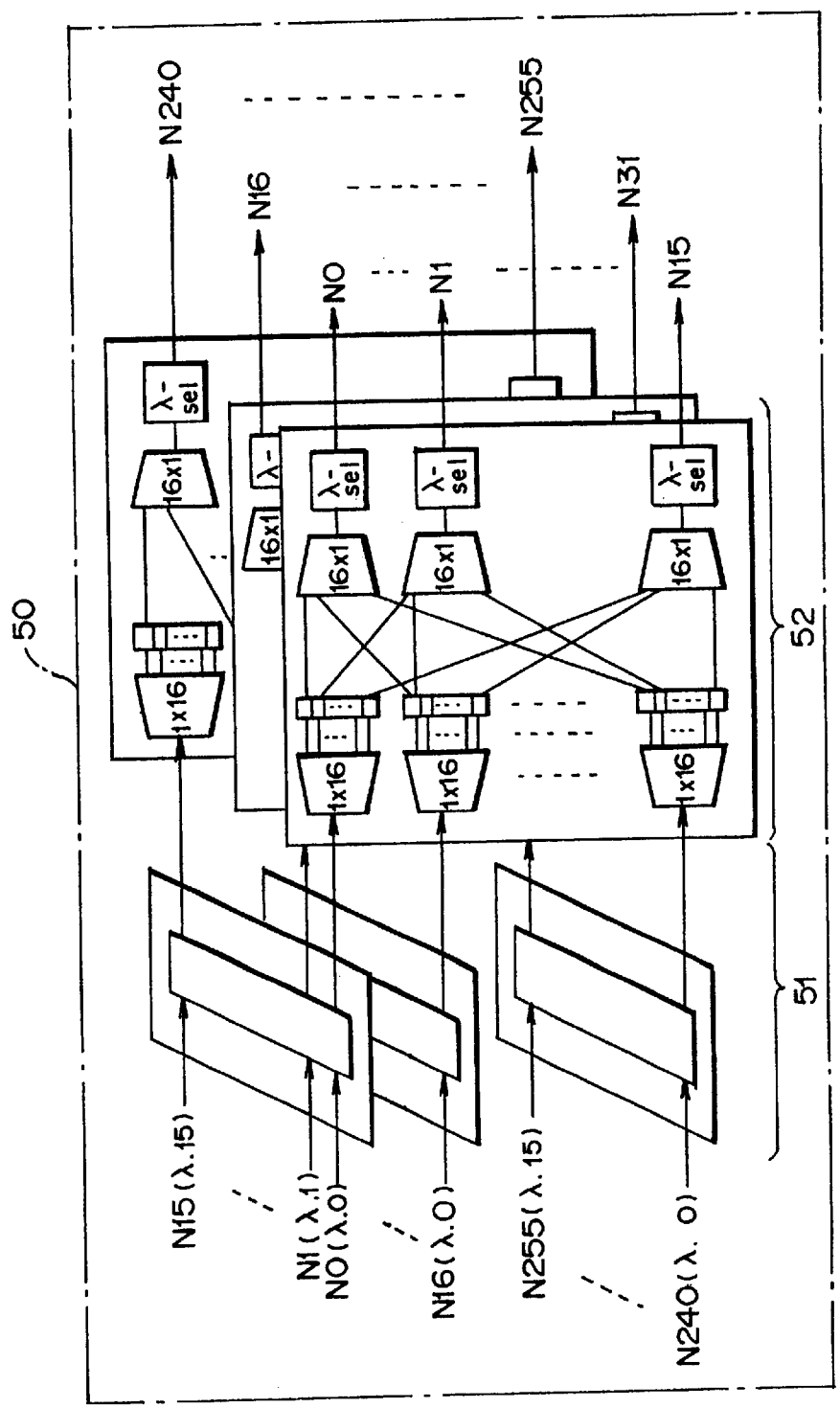
FIG. 14 is a block diagram schematically showing an optical cross-connect unit to which this invention is applicable.

FIG. 14 is a block diagram schematically showing an optical cross-connect system to which this invention is applicable. In FIG. 14, an optical cross-connect system 50 is a large-capacity optical switch applicable to a parallel super computer, an ATM core switch and others, and is made up of a broadcast section 51 for distributing a wavelength-multiplexed signal and a space switch/wavelength selector section 52. The wavelength-multiplexed light amplifying apparatus (see FIG. 1) according to this invention is applicable to a wavelength-multiplexed signal distributing function in the broadcast section 51 and in the space switch/wavelength selector section 52.

More specifically, this invention relates to a wavelength-multiplexed light amplifying apparatus applicable to an m×n matrix optical switch (switching) in the optical cross-connect system 50, and this wavelength-multiplexed light amplifying apparatus 31 is constructed using a plurality of wavelength-multiplexed light amplifying basic units 30b, where m and n represent natural numbers and, in this case, each is 356. Additionally, each of the wavelength-multiplexed light amplifying basic unit 30b is composed of an optical branching sections 1a and 1b each having two input ports $P_1$ and $P_2$ and two output ports $P_3$ and $P_4$ for receiving a wavelength-multiplexed optical signal comprising optical signals of a plurality of wavelengths through the signal input port $P_2$ forming one of the two input ports $P_1$ and $P_2$ to output the wavelength-multiplexed optical signal through the two output ports $P_3$ and $P_4$, and optical amplifying sections 2a to 2f connected to the two output ports $P_3$ and $P_4$ of the optical branching sections 1a and 1b.

Furthermore, these wavelength-multiplexed light amplifying basic units 30b are connected in a multistage fashion in a manner that the signal port $P_2$ of its optical branching section 1a is connected to the output side of the optical amplifying section 2a or 2c in the preceding wavelength-multiplexed light amplifying basic unit 30b, and an excitation light source 4 is connected to the other input port $P_1$ of the optical branching section 1a of the forefront unit 35 of the plurality of wavelength-multiplexed light amplifying basic units 30b.

Thus, this system is applicable to a distribution system such as an optical subscriber system, and the expansion on the in-service is easily feasible.

Moreover, although the description of the first embodiment has been made above in the case in which this wavelength-multiplexed light amplifying apparatus is applied to branch ports (see FIG. 2), if other parts are used, it is also possible to construct an optical add-and-drop apparatus using this wavelength-multiplexed light amplifying apparatus.

Figure 15:
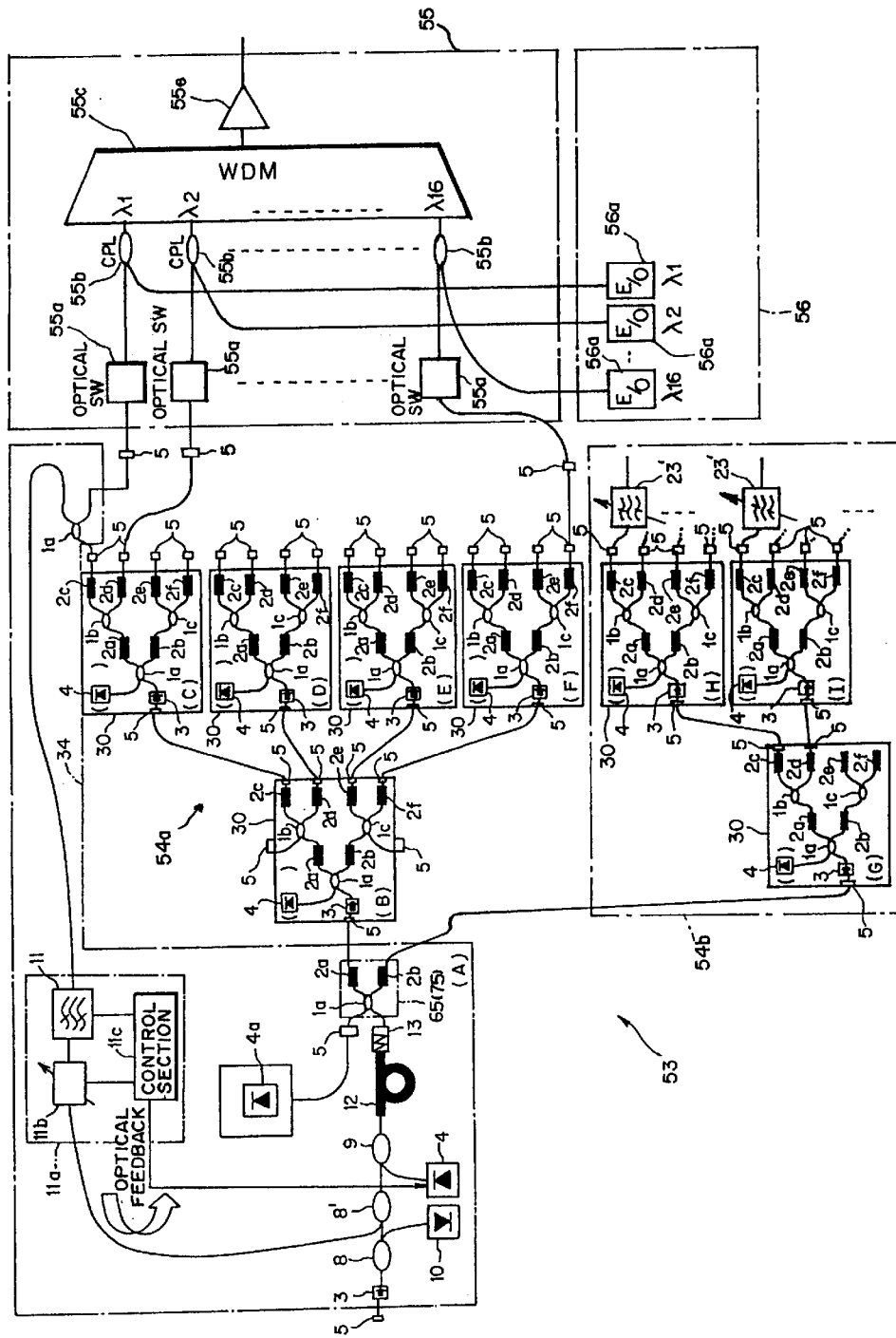
FIG. 15 is a block diagram schematically showing an optical add-and-drop apparatus to which this invention is applicable.

FIG. 15 is a block diagram schematically showing an optical add-and-drop apparatus (optical ADM system Optical Add-Drop Multiplexer) to which this invention is applied. In FIG. 15, an optical add-and-drop apparatus 53 using wavelength-multiplexed light amplifying basic units is for dropping an optical signal with an arbitrary wavelength from a wavelength-multiplexed signal or for adding an optical signal with an arbitrary wavelength, and is made up of an optical feedback loop system 34 (left-side part in the illustration), a first broadcast unit 54a comprising five types of wavelength-multiplexed light amplifying units 30 denoted at (B), (C), (D), (E) and (F), a second broadcast unit 54b comprising three types of wavelength-multiplexed light amplifying units 30 denoted at (G), (H) and (I), an optical carrier signal outputting section 56, and a selecting section 55. In this case, the number of users in the first broadcast unit 54a is 16, while the number of drops in the second broadcast unit 54b is 8.

An optical signal, for example, in which 64 wavelengths (ch1 to ch64) are multiplexed, from the left side in FIG. 15 is inputted to the second broadcast unit 54b where ch1 to ch32 are dropped for a maximum of 16 users, while other ch65 to ch96 from the optical carrier signal outputting section 56 are added thereto so that an optical signal in which 64 wavelengths (ch33 to ch96) are multiplexed is transmitted toward the right side in FIG. 15.

In FIG. 15, the optical feedback loop system 34 has a first-stage unit 65 for broadcasting a wavelength-multiplexed optical signal comprising optical signals of X kinds of wavelengths (X represents a natural number not less than 2).

Furthermore, the first broadcast unit 54a is connected to the output side of the first-stage unit 65 to broadcast a wavelength-multiplexed optical signal outputted from the first-stage unit 65, while the second broadcast unit 54b is connected to the output side of the first-stage unit 65 to broadcast a wavelength-multiplexed optical signal outputted from the first-stage unit 65 and to drop an optical signal. Furthermore, the optical carrier signal outputting section 56 is for outputting an optical carrier signal to add an optical signal, while the selecting section 55 is connected to the output side of the first broadcast unit 54a and further to the output side of the optical carrier signal outputting section 56 to selectively output a wavelength-multiplexed optical signal from the first broadcast unit 54a and an optical carrier signal from the optical carrier signal outputting section 56.

Furthermore, the aforesaid first-stage unit 65 is constructed as a first-stage wavelength-multiplexed light amplifying basic unit 75 including an optical branching section 1a having two input ports $P_1$ and $P_2$ and two output ports $P_3$ and $P_4$ for receiving a wavelength-multiplexed optical signal comprising optical signals of X kinds of wavelengths to output the wavelength-multiplexed optical signal through the two output ports $P_3$ and $P_4$, with the other signal input port $P_1$, being connected to an auxiliary excitation light source 4a (or an excitation light source 4), and further including optical amplifying sections 2a and 2b respectively connected to the two output ports $P_3$ and $P_4$ of the optical branching section 1a. Accordingly, the first-stage unit 65 signifies a special example of the first-stage wavelength-multiplexed light amplifying basic unit 75.

Still furthermore, the first broadcast unit 54a has five types of wavelength-multiplexed light amplifying basic units 30 (denoted at (B), (C), (D), (E) and (F))], and in each of the wavelength-multiplexed light amplifying basic units 30, the optical branching sections and the optical amplifying sections are connected alternately to each other, for example, in the order of the optical branching section 1a, the optical amplifying section 2a, the optical branching section 1b and optical amplifying section 2c. Thus, the first broadcast unit 54a has a plurality of multiplexing wavelength-multiplexed light amplifying basic units each having the same configuration as that of the first-stage wavelength-multiplexed light amplifying basic unit 75, and these multiplexing wavelength-multiplexed light amplifying basic units are connected in a multistage fashion in a manner that the signal input port $P_2$ of the optical branching section 1a is connected to the output side 2c (2d, 2e, 2f) of the optical amplifying section in the preceding multiplexing wavelength-multiplexed light amplifying basic unit. Furthermore, the first broadcast unit 54a is constructed such that one input port $P_2$ of the optical branching section 1a in the forefront unit of the plurality of multiplexing wavelength-multiplexed light amplifying basic units is connected to the output port of one optical amplifying section 2a in the first-stage wavelength-multiplexed light amplifying basic unit 75. Incidentally, in this instance, although the number of users is 16, the expansion of the wavelength-multiplexed light amplifying unit 30 allows accommodation of more users in the in-service.

On the other hand, the second broadcast unit 54b has three kinds of wavelength-multiplexed light amplifying basic units 30 (denoted at (G), (H) and (I))] to accommodate right users, and further permits additional connection of two wavelength-multiplexed light amplifying basic units 30 to achieve the expansion up to 16 users. Additionally, as well as the first broadcast unit 54a, in each of the wavelength-multiplexed light amplifying basic units 30, the optical branching sections and the optical amplifying sections are connected alternately to each other, for example, in the order of the optical branching section 1a, the optical amplifying section 2a, the optical branching section 1b and the optical amplifying section 2c. Accordingly, this second broadcast unit 54b has a plurality of distribution wavelength-multiplexed light amplifying basic units each having the same configuration as that of the first-stage wavelength-multiplexed light amplifying basic unit 75, and these distribution wavelength-multiplexed light amplifying basic units are connected in a multistage fashion in a manner that the signal input port $P_2$ of the optical branching section 1a is connected to the output side of the optical amplifying section 2c (2d, 2e, 2f) in the preceding distribution wavelength-multiplexed light amplifying basic unit. Still furthermore, the second broadcast unit 54b is constructed such that one input port $P_2$ of the optical branching section 1a in the forefront unit of the plurality of distribution wavelength-multiplexed light basic units is connected to the output port of the other optical amplifying section 2b in the first-stage wavelength-multiplexed light amplifying basic unit 75, and each of a plurality of drop optical filters 23' for selecting and outputting an optical signal with a predetermined wavelength is provided on the output side of the optical amplifying section 2c (2d, 2e, 2f) in the rearmost unit of the plurality of distribution wavelength-multiplexed light amplifying basic units.

In addition, in FIG. 15, the optical carrier signal outputting section 56 is for outputting an optical carrier signal with a predetermined wavelength, and this function is exhibited by an optical E/O converter 56a. Additionally, the optical E/O converter 56a is controlled so as to prevent an optical signal with the same wavelength as that of an optical signal to be allowed to pass from being outputted.

Furthermore, the selecting section 55 is composed of Y optical switches (switch sections) 55a, Y coupling sections 55b, a multiplexing section 55c and an amplifier 55e, where Y represents a natural number not less than 2. Each of the Y optical switches 55a is connected to the output side of the optical amplifying section 2c (2d, 2e, 2f) of the rearmost distribution wavelength-multiplexed light amplifying unit in the first broadcast unit 54a. Additionally, the Y coupling sections 55a are for coupling the wavelength-multiplexed optical signal lines of the optical switches 55a with the optical carrier signal lines from the optical carrier signal outputting section 56. For example, this function is exhibited by optical couplers. Furthermore, in the coupling sections 55b, optical signals outputted from two directions are coupled with each other. Still additionally, the multiplexing section 55c is for selecting and outputting only one wave form Y kinds of optical signals from the coupling sections 55b, with this function being exhibited by an AWG. Furthermore, one wave of the wavelength-multiplexed optical signal is selected by the number of the inputting port of this AWG, and optical signals with different wavelengths are multiplexed at every port and outputted. The amplifier 55e is for amplifying a wavelength-multiplexed optical signal. The Y optical switches 55a selectively conduct the switching between the operation of allowing Y kinds of wavelength-multiplexed optical signals from the first broadcast unit 54a to pass so that they are outputted from the multiplexing section 55c and the operation of outputting Y kinds of optical carrier signals from the optical carrier signal outputting section 56 through the multiplexing section 55c.

The wavelength-multiplexed light amplifying unit 30 and the optical feedback loop system 34 are the same as those described above, the description thereof will be omitted for simplicity.

Thus, the flow of an optical signal in the optical add-and-drop apparatus 53 using the wavelength-multiplexed light amplifying basic units shown in FIG. 15 is as follows. That is, a wavelength-multiplexed optical signal from the left side in FIG. 15 is inputted to the first-stage unit 65 after passing through the connector 5, the isolator 3, the optical couplers 8, 8', the multiplexer 9, the EDFA 12 and the gain equalizer 13 in the optical feedback loop system 34. Furthermore, in this first-stage unit 65, the output of the optical amplifier 2a is inputted to the first broadcast unit 54a so that an optical signal(s) with 64 wavelengths multiplexed is broadcasted.

On the other hand, the output of the optical amplifier 2b of the first-stage unit 65 is inputted to the second broadcast unit 54b so that an optical signal(s) with 64 wavelengths multiplexed is broadcasted, and a 64-wavelength-multiplexed (ch1 to ch64) optical signal appears at each of the output ports of the optical amplifying section 2c (2d, 2e, 2f) in the rearmost distribution wavelength-multiplexed light amplifying basic unit in the second broadcast unit 54b. Furthermore, an optical signal with a desired wavelength is taken out from this 64 wavelength-multiplexed (ch1 to ch64) optical signal in the drop optical filter 23', where the drop function is exhibited. Accordingly, the drop function of this second broadcast unit 54b is equivalent to the drop function displayed with the cooperation of the AOTF 20b and the branching section 21 in FIG. 2, and the drop optical filter 23' (see FIG. 15) corresponds to the tunable filter 23 in FIG. 2. Incidentally, this drop optical filter 23' can also be constructed using a wavelength-fixed optical filter.

Furthermore, in FIG. 15, the multiplexing section 55 receives an optical carrier signal from the optical carrier signal outputting section 56 and a wavelength-multiplexed optical signal from the first broadcast unit 54a so that the wavelength-multiplexed optical signal from the first broadcast unit 54a passes when the optical switch 55a is in the ON state, and Y kinds of optical signals are inputted to the coupling section 55b, where Y represents a natural number below X at the input. Additionally, in the multiplexing section 55c, an optical signal with $\lambda 1$ of $\lambda 1$ to $\lambda 16$ is selected at a first port, an optical signal with $\lambda 2$ of $\lambda 1$ to $\lambda 16$ is selected at a second port, and similarly an optical signal with $\lambda 16$ of $\lambda 1$ to $\lambda 16$ is selected at a 16th port. Still additionally, the outputs with $\lambda 1$ to $\lambda 16$ are again multiplexed, and then amplified in the amplifier 55e and outputted from the right side in FIG. 15. On the other hand, when the optical switch 55a is in the OFF state, the wavelength-multiplexed optical signal from the first broadcast unit 54a is shut off, and the optical carrier signals from the optical carrier signal outputting section 56 are inputted to the coupling section 55b, and are multiplexed in the multiplexing section 55c and then outputted as a wavelength-multiplexed optical signal therefrom. This wavelength-multiplexed optical signal is finally outputted from the right side in FIG. 15 after being amplified in the amplifier 55e.

With this configuration, the dropping operation is conducted in the second broadcast unit 54b of the optical add-and-drop apparatus 53 using the wavelength-multiplexed light amplifying basic units while the adding operation is performed in the multiplexing section 55c, that is, the add and drop function can be exhibited using the same wavelength-multiplexed light amplifying unit 30. Accordingly, the optical network is flexibly expandable and extensible using the features of this wavelength-multiplexed light amplifying apparatus.

In addition, the optical add-and-drop apparatus can employ another type.

For realizing an optical add-and-drop apparatus, a technical difficulty is that signal light is added to a wavelength dropped in that apparatus. That is, for the realization of the optical add-and-drop apparatus, in that apparatus, a desired wavelength must be sufficiently removed from wavelength-multiplexed signal light arranged at as an extremely narrow interval as, for example, 0.4 nm (n: nano, signifying $10^{-9}$), and another signal must be newly added to that wavelength.

In this case, technically difficult points are the following 1) and 2):

1) to remove a specific wavelength without signals having other wavelengths being affected by the wavelength dropping; and 2) in the case in which signal light is added newly to that wavelength, coherent crosstalk (intermodulation distortion) occurs between the added wavelength and the signal light left without removed.

Accordingly, one possible measure against these difficulties would be to make development based upon the use of an electrical area type add-and-drop apparatus. Furthermore, this measure enables effective utilization of wavelength slots (or bands). On the other hand, this 1 measure does not consider advantages/disadvantages or strong points/weak points of the add-and-drop in an optical area.

Figure 17:
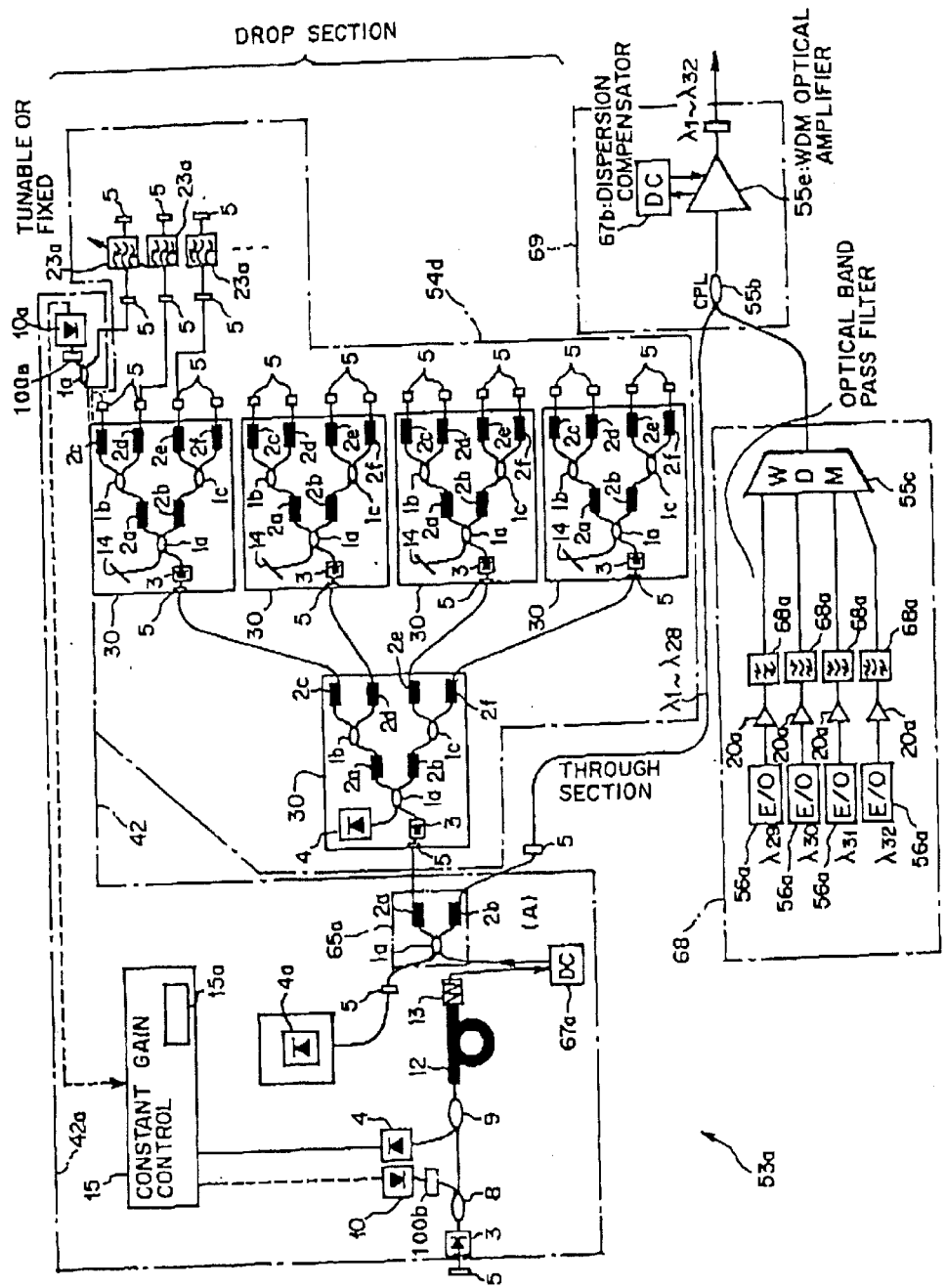
FIG. 17 is a block diagram showing a further optical add-and-drop apparatus to which this invention is applicable.

FIG. 17 is a block diagram showing a further optical add-and-drop apparatus to which this invention is applicable. In FIG. 17, an optical add-and-drop apparatus 53a considers the aforesaid advantages/disadvantages and further realizes an optical add-and-drop function easily. The optical add-and-drop apparatus 53a shown in FIG. 17 is made up of an optical feedback loop system 42a, a first-stage unit 65a, a first broadcast unit 54d, an additional signal outputting section 68 and a transmission outputting section 69.

The first-stage unit 65a has two input ports $P_1$ and $P_2$ and two output ports $P_3$ and $P_4$, and when a wavelength-multiplexed optical signal comprising optical signals with X kinds of wavelengths is inputted through a signal input port forming one of the input ports $P_1$ and $P_2$, a first wavelength-multiplexed optical signal is outputted from each of the output ports $P_3$ and $P_4$.

Furthermore, the first-stage unit 65a is for broadcasting the first wavelength-multiplexed optical signal comprising optical signals with X kinds of wavelengths, and includes an optical branching section 1a and an optical amplifying sections 2a and 2b, thus functioning as a first-stage wavelength-multiplexed light amplifying basic unit. In this optical branching section 1a, its signal input port (input port $P_1$) is connected to an excitation light source 4a, while its output ports $P_3$ and $P_4$ are connected to the optical amplifying sections 2a and 2b, respectively.

The optical feedback loop system 42a has a first dispersion compensator (DC) 67a in addition to the components described above. This first dispersion compensator 67a is connected to an EDFA (amplifying section) 12 and further to a signal input port of the optical branching section 1a in the first-stage unit 65a. Still additionally, the EDFA (amplifying section) 12 for amplifying the optical signal to output an amplified optical signal is placed on the input side of the first dispersion compensator 67a, and the first dispersion compensator 67a compensates for the dispersion of the amplified optical signal and puts a compensated optical signal subjected to the dispersion compensation in the signal input port of the optical branching section 1a.

The first broadcast unit 54d is connected to the output side of the first-stage unit 65a for broadcasting the first wavelength-multiplexed optical signal outputted from the first-stage unit 65a, and has five kinds of branching wavelength-multiplexed light amplifying basic units 30, designated at (B), (C), (D), (E) and (F) and identical in configuration to the first-stage wavelength-multiplexed light amplifying basic unit 75a. In each of these branching wavelength-multiplexed light amplifying basic units 30, the signal input port (input port $P_1$, $P_2$) of its optical branching section 1a (1b, 1c) is connected to the output side of the optical amplifying section 2a (2b, 2c) in each of the preceding branching wavelength-multiplexed light amplifying basic units 30, thus establishing a multistage connection therebetween.

In addition, the output port $P_3$ of the optical amplifying section 1a in the first-stage wavelength-multiplexed light amplifying basic unit 75a is connected to one input port $P_1$ of the optical branching section 1a in the forefront basic unit 30(B) of the plurality of branching wavelength-multiplexed light amplifying basic units 30. Still additionally, a plurality of dropping filters 23a each for selecting and outputting an optical signal with a predetermined wavelength are provided at the output sides of the optical amplifying sections 2c (2d, 2e, 2f) in the rearmost branching wavelength-multiplexed light amplifying basic units 30, designated at (C), (D), (E) and (F), of the aforesaid plurality of branching wavelength-multiplexed light amplifying basic units 30. Moreover, each of these plurality of dropping optical filters 23a is designed to be capable of setting a wavelength to be dropped variably. Incidentally, the plurality of dropping optical filters 23a can also employ a fixed-wavelength filter.

Accordingly, this first broadcast unit 54d copies a plurality of wavelength-multiplexed optical signals for wavelength dropping (a drop section) and uses these copied wavelength-multiplexed optical signals; hence, the optical add-and-drop apparatus 53a can devote itself to the extraction processing for a predetermined wavelength without paying attention to other wavelengths.

In addition, the configuration of this optical add-and-drop apparatus 53a is not made to perform the adding to a dropped wavelength, and does not accomplish the effective utilization of the wavelength slot (or band). This is because an optical apparatus is capable of realizing a wavelength slot showing a sufficient degree (for example, 128 waves, 240 waves) without conducting such operations.

The additional signal outputting section 68 is for multiplexing a plurality of optical carrier signals to output a second wavelength-multiplexed optical signal, and is composed of a plurality of optical carrier signal generating sections (E/O) 56a, optical amplifiers 20a, optical band pass filters 68a and a multiplexing section (WDM) 55c.

The plurality of optical carrier signal generating sections 56a are for outputting a plurality of optical carrier signals respectively. The optical amplifiers 20a are for amplifying and outputting the plurality of optical carrier signals. The optical band pass filters 68a are connected to the plurality of optical carrier signal generating sections 56a, respectively, for conducting the filtering of the optical carrier signals outputted from the optical amplifies 20a. Incidentally, since these optical amplifiers 20a and optical and pass filters 68a are provided for signal amplification, if the signal power is sufficient, the installation thereof becomes unnecessary.

Furthermore, the multiplexing section 55c is connected to the side of the plurality of optical carrier signal generating sections 56a for multiplexing the plurality of optical carrier signals from the plurality of optical carrier signal generating sections 56a to output a second wavelength-multiplexed optical signal. For example, a waveguide type diffraction grating (AWG) can a used therefor.

The transmission outputting section 69 is connected to the output side of the first-stage unit 65a and the output side of the additional signal outputting section 68 for coupling the first wavelength-multiplexed optical signal from the first-stage unit 65a with the second wavelength-multiplexed optical signal from the additional signal outputting section 68. The transmission outputting section 69 is composed of a coupling section (CPL) 55b, an amplifier 55e and a second dispersion compensator 67b. The coupling section 55b is connected to the first-stage unit 65a and further to the additional signal outputting section 68 for coupling the first wavelength-multiplexed optical signal from the first-stage unit 65a with the second wavelength-multiplexed optical signal from the additional signal outputting section 68 to output a third wavelength-multiplexed optical signal. The amplifier 55e is for amplifying the third wavelength-multiplexed optical signal from the coupling section 55b and for outputting the amplified third wavelength-multiplexed optical signal, that is, it is for amplifying a wavelength-multiplexed optical signal. The second dispersion compensator (DC) 67b is connected to the optical amplifier 55e of the transmission outputting section 69 for compensating for the dispersion of the amplified third wavelength-multiplexed optical signal to put a compensation optical signal after the dispersion compensation.

This configuration performs the add-and-drop processing. In this case, in terms of the number of wavelengths, for example, the number of input wavelengths is 32 waves. Of 32 waves, first to 28th waves are allocated to "drop" and "through", while 29th to 32th waves are allocated to "add".

First, a wavelength-multiplexed optical signal ($\lambda_1$ to $\lambda_{32}$) is inputted from the left side of FIG. 17 and amplified in the first-stage unit 65a, and subsequently a first wavelength multiplexed optical signal ($\lambda_1$ to $\lambda_{28}$) is inputted to the dropping first broadcast unit 54d and the wavelength multiplexed optical signal ($\lambda_1$ to $\lambda_{28}$) is inputted to the through transmission outputting section 69.

Furthermore, the copies of a plurality of wavelength-multiplexed signals are made for the wavelength dropping in the first broadcast unit 54b, and desired wavelengths ($\lambda_1$ to $\lambda_{28}$) are dropped in the dropping optical filters 23a. Unlike the configuration shown in FIG. 15, the adding processing is not conducted in connection with the dropped wavelengths.

On the other hand, the second wavelength-multiplexed optical signal ($\lambda_{28}$ to $\lambda_{32}$) to be added is inputted from the additional signal outputting section 68 to the transmission outputting section 69. Additionally, the coupling section 55b of the transmission outputting section 68 couples the first wavelength-multiplexed optical signal ($\lambda_1$ to $\lambda_{28}$) with the second wavelength-multiplexed optical signal ($\lambda_2$ to $\lambda_{32}$) from the additional signal outputting section 68 so that a third wavelength-multiplexed optical signal ($\lambda_1$ to $\lambda_{32}$) is outputted therefrom and is then amplified in the optical amplifier 55e and outputted to the next relay point.

Thus, in the optical add-and-drop apparatus 53a, when a predetermined wavelength is dropped and signal light is added, a desired wavelength can be sufficiently eliminated or dropped from a wavelength-multiplexed signal light arranged at an extremely small interval and another signal is added newly to that wavelength before transmission, accordingly exhibiting an add-and-drop function.

In consequence, the following two points are realizable. That is:

1) Since the copy of a wavelength-multiplexed signal is used, a desired wavelength can be dropped in inconsideration of the influence on the other wavelengths.

2) Even in the case in which signal light is added newly to that wavelength, no coherent crosstalk occurs between the signal light with a specific wavelength to be added and the signal light left without removed.

In addition, since the copy of a wavelength-multiplexed signal can be made in this way, it is possible to offer services to many terminal users.

Incidentally, this method is applicable also in the case of 64 wavelengths, 128 wavelengths and 240 wavelengths, and the number of wavelengths to be dropped and the number of wavelengths to be added are variable. For instance, in the case of 128 wavelengths, of these, 1st to 96th wavelengths are allocated to "drop" and "through" while 97th to 128th wavelengths are assigned to "add".

The present invention is also applicable to another application in which an optical signal is distributed according to wavelengths. Additionally, this invention covers all changes and modifications of the embodiments herein which do not constitute departures from the spirit and scope of the invention.

What is claimed is:

1. A wavelength-multiplexed light amplifying apparatus comprising:
   a plurality of wavelength-multiplexed light amplifying units each including:
      a first wavelength-multiplexed light amplifying basic unit composed of an optical branching section having two input ports and two output ports for receiving a wavelength-multiplexed optical signal, which has a plurality of wavelengths, through a signal input port forming one of said two input ports to output said wavelength-multiplexed optical signal through said two output ports and optical amplifying sections respectively connected to said two output ports of said optical branching section;
      a second wavelength-multiplexed light amplifying basic unit having the same configuration as that of said first wavelength-multiplexed light amplifying basic unit and having a signal input port whose input side is connected to an output side of one optical amplifying section of said first wavelength-multiplexed light amplifying basic unit; and
      a third wavelength-multiplexed light amplifying basic unit having the same configuration as that of said first wavelength-multiplexed light amplifying basic unit and having a signal input port whose input side is connected to an output side of the other optical amplifying section of said first wavelength-multiplexed light amplifying basic unit,
      with said wavelength-multiplexed light amplifying units being connected in a multistage fashion in a manner that said signal input port of said optical branching section in said first wavelength-multiplexed light amplifying basic unit is connected to an output side of said optical amplifying section of one of said second wavelength-multiplexed light amplifying basic unit and said third wavelength-multiplexed light amplifying basic unit in said preceding wavelength-multiplexed light amplifying unit;
   a fourth wavelength-multiplexed light amplifying basic unit having the same configuration as that of said first wavelength-multiplexed light amplifying basic unit and having one optical amplifying section whose output side is connected to said signal input port of said first wavelength-multiplexed light amplifying basic unit in the forefront unit of said plurality of wavelength-multiplexed light amplifying units arranged in said multistage fashion;
   an excitation light source;
   a multiplexing section for multiplexing an excitation light from said excitation light source and said wavelength-multiplexed optical signal together;
   a gain equalizer interposed between said multiplexing section and a signal input port of said fourth wavelength multiplexed light amplifying basic unit;
   an output monitoring unit to monitor a filtered light of an output of a rearmost unit of said plurality of said wavelength-multiplexed light amplifying basic unit; and
   a gain control unit to control gains of said plurality of wavelength-multiplexed light amplifying units, arranged in said multistage fashion, on the basis of at least an output of the output monitoring unit.

2. A wavelength-multiplexed light amplifying apparatus comprising:
   a plurality of wavelength-multiplexed light amplifying basic units each including an optical branching section having two input ports and two output ports for receiving a wavelength-multiplexed optical signal, which has a plurality of wavelengths, through a signal input port forming one of said two input ports to output said wavelength-multiplexed optical signal through said two output ports and optical amplifying sections respectively connected to said two output ports of said optical branching section, with said wavelength-multiplexed light amplifying basic units being connected in a multistage fashion in a manner that said signal input port of said optical branching section is connected to an output side of said optical amplifying section of the preceding wavelength-multiplexed light amplifying basic unit;
   an excitation light source;
   a multiplexing section for multiplexing an excitation light from said excitation light source and said wavelength-multiplexed optical signal together;
   a gain equalizer interposed between said multiplexing section and said signal input port of the forefront unit of said plurality of wavelength-multiplexed light amplifying basic units arranged in said multistage fashion;
   an output monitoring unit to monitor a filtered light of an output of a rearmost unit of said plurality of said wavelength-multiplexed light amplifying basic unit; and
   a gain control unit to control gains of said plurality of wavelength-multiplexed light amplifying basic units, arranged in said multistage fashion, on the basis of at least an output of the output monitoring unit.

3. A wavelength-multiplexed light amplifying apparatus comprising:

a wavelength-multiplexed light amplifying basic unit including an optical branching section having two input ports and two output ports to receive a wavelength multiplexed optical signal, which has a plurality of wavelengths, through a signal input port forming one of said two input ports to output said wavelength-multiplexed optical signal through said two output ports and optical amplifying sections respectively connected to said two output ports of the optical branching section;

an excitation light source;

a multiplexing section to multiplex an excitation light from said excitation light source and said wavelength-multiplexed optical signal together;

a gain equalizer interposed between said multiplexing section and said signal input port of said wavelength-multiplexed light amplifying basic unit;

an output monitoring unit to monitor a filtered light of an output of said wavelength-multiplexed light amplifying basic unit; and gain control means unit to control a gain of said wavelength-multiplexed light amplifying basic unit on the basis of at least an output of the output monitoring unit.

4. A wavelength-multiplexed light amplifying apparatus as defined in claim 1, wherein said optical branching section of said wavelength-multiplexed light amplifying basic unit is constructed as a 1:1 optical coupler.

5. A wavelength-multiplexed light amplifying apparatus as defined in claim 2, wherein said optical branching section of said wavelength-multiplexed light amplifying basic unit is constructed as a 1:1 optical coupler.

6. A wavelength-multiplexed light amplifying apparatus as defined in claim 3, wherein said optical branching section of said wavelength-multiplexed light amplifying basic unit is constructed as a 1:1 optical coupler.

7. A wavelength-multiplexed light amplifying apparatus as defined in claim 1, wherein said optical amplifying section of said wavelength-multiplexed light amplifying basic unit is constructed to have one of a gain equivalent to a branch loss in said optical branching section and a gain lower than said branch loss.

8. A wavelength-multiplexed light amplifying apparatus as defined in claim 2, wherein said optical amplifying section of said wavelength-multiplexed light amplifying basic unit is constructed to have one of a gain equivalent to a branch loss in said optical branching section and a gain lower than said branch loss.

9. A wavelength-multiplexed light amplifying apparatus as defined in claim 3, wherein said optical amplifying section of said wavelength-multiplexed light amplifying basic unit is constructed to have one of a gain equivalent to a branch loss in said optical branching section and a gain lower than said branch loss.

10. A wavelength-multiplexed light amplifying apparatus as defined in claim 1, wherein said optical branching section, said optical amplifying section and a connecting section between said optical branching section and said optical amplifying section in said wavelength-multiplexed light amplifying basic unit are constructed with an optical waveguide made from one of a glass and a semiconductor.

11. A wavelength-multiplexed light amplifying apparatus as defined in claim 2, wherein said optical branching section, said optical amplifying section and a connecting section between said optical branching section and said optical amplifying section in said wavelength-multiplexed light amplifying basic unit are constructed with an optical waveguide made from one of a glass and a semiconductor.

12. A wavelength-multiplexed light amplifying apparatus as defined in claim 3, wherein said optical branching section, said optical amplifying section and a connecting section between said optical branching section and said optical amplifying section in said wavelength-multiplexed light amplifying basic unit are constructed with an optical waveguide made from one of a glass and a semiconductor.

13. A wavelength-multiplexed light amplifying apparatus as defined in claim 1, wherein an auxiliary excitation light source is connected to the other input port of at least one of said plurality of wavelength-multiplexed light amplifying basic units.

14. A wavelength-multiplexed light amplifying apparatus as defined in claim 2, wherein an auxiliary excitation light source is connected to the other input port of at least one of said plurality of wavelength-multiplexed light amplifying basic units.

15. A wavelength-multiplexed light amplifying apparatus as defined in claim 3, wherein an auxiliary excitation light source is connected to the other input port of said wavelength-multiplexed light amplifying basic unit.

16. A wavelength-multiplexed light amplifying apparatus as defined in claim 1, wherein an isolator is connected to said signal input port of said first wavelength-multiplexed light amplifying basic unit in at least one of said plurality of wavelength-multiplexed light amplifying units.

17. A wavelength-multiplexed light amplifying apparatus as defined in claim 2, wherein an isolator is connected to said signal input port in at least one of said plurality of wavelength-multiplexed light amplifying basic units.

18. A wavelength-multiplexed light amplifying apparatus as defined in claim 3 wherein an isolator is connected to said signal input port in said wavelength-multiplexed light amplifying basic unit.

19. A wavelength-multiplexed light amplifying apparatus as defined in claim 1, wherein, in at least two of said plurality of wavelength-multiplexed light amplifying units, said output side of said optical amplifying section of each of said second and third wavelength-multiplexed light amplifying basic units in the preceding wavelength-multiplexed light amplifying unit and said input side of said signal input port of said first wavelength-multiplexed light amplifying basic unit in each of the following wavelength-multiplexed light amplifying units is connected through an oblique connector to each other.

20. A wavelength-multiplexed light amplifying apparatus as defined in claim 2, wherein, in at least two of said plurality of wavelength-multiplexed light amplifying basic units, said output side of said optical amplifying section in the preceding wavelength-multiplexed light amplifying basic unit and said input side of said signal input port of the following wavelength-multiplexed light amplifying basic unit is connected through an oblique connector to each other.

21. A wavelength-multiplexed light amplifying apparatus as defined in claim 1, wherein said gain control means includes:

a filter for selecting an optical signal with a desired wavelength from said output information; and an optical attenuator for attenuating the desired wavelength optical signal extracted through said filter for laser resonance and further for supplying the attenuated optical signal to an input side of said gain equalizer.

22. A wavelength-multiplexed light amplifying apparatus as defined in claim 2, wherein said gain control unit includes:

a filter for selecting an optical signal with a desired wavelength from said output information; and an optical attenuator for attenuating the desired wavelength optical signal extracted through said filter for laser resonance and further for supplying the attenuated optical signal to an input side of said gain equalizer.

23. A wavelength-multiplexed light amplifying apparatus as defined in claim 3, wherein said gain control unit includes:

a filter for selecting an optical signal with a desired wavelength from said output information; and an optical attenuator for attenuating the desired wavelength optical signal extracted through said filter for laser resonance and further for supplying the attenuated optical signal to an input side of said gain equalizer.

24. A wavelength-multiplexed light amplifying apparatus as defined in claim 23, wherein said filter is constructed as a filter for selecting an optical signal with a wavelength which is out of a wavelength band needed for transmission.

25. A wavelength-multiplexed light amplifying apparatus as defined in claim 1, wherein an input monitoring unit is provided to detect an input to said fourth wavelength-multiplexed light amplifying basic unit, and said gain control unit includes a control section for producing a gain control signal on the basis of said output information and a detection result by said input monitoring unit and further for supplying said gain control signal to said excitation light source provided on an input side of said gain equalizer to control an excitation state of said excitation light source.

26. A wavelength-multiplexed light amplifying apparatus as defined in claim 2, wherein an input monitoring unit is provided to detect an input to the forefront unit of said plurality of wavelength-multiplexed light amplifying basic units disposed in the multistage fashion, and said gain control unit includes a control section for producing a gain control signal on the basis of said output information and a detection result by said input monitoring unit and further for supplying said gain control signal to said excitation light source provided on an input side of said gain equalizer to control an excitation state of said excitation light source.

27. A wavelength-multiplexed light amplifying apparatus as defined in claim 3, wherein an input monitoring unit is provided to detect an input to said wavelength-multiplexed light amplifying basic unit, and said gain control unit includes a control section for producing a gain control signal on the basis of said output information and a detection result by said input monitoring unit and further for supplying said gain control signal to said excitation light source provided on an input side of said gain equalizer to control an excitation state of said excitation light source.

28. A wavelength-multiplexed light amplifying apparatus made to be connected to an branching port of a multiplexing/branching unit which receives a wavelength-multiplexed optical signal composed from optical signals of M kinds of wavelengths and a wavelength-multiplexed optical signal composed from optical signals of N kinds of wavelengths and further which branches the received optical signals into a wavelength-multiplexed optical signal composed from optical signals of (M+N−L) kinds of wavelengths and a wavelength-multiplexed optical signal composed from optical signals of L kinds of wavelengths, said wavelength-multiplexed light amplifying apparatus comprising:

a plurality of wavelength-multiplexed light amplifying basic units each including an optical branching section having two input ports and two output ports for receiving said wavelength-multiplexed optical signal, composed from said optical signals of L kinds of wavelengths, through a signal input port forming one of said two input ports to output said wavelength-multiplexed optical signal through said two output ports and optical amplifying sections respectively connected to said two output ports of said optical branching section, with said wavelength-multiplexed light amplifying basic units being connected in a multistage fashion in a manner that said signal input port of said optical branching section in one wavelength-multiplexed basic unit is connected to an output side of said optical amplifying section of another preceding wavelength-multiplexed light amplifying basic unit;

an excitation light source connected to the other input port of said optical branching section of the forefront unit of said plurality of wavelength-multiplexed light amplifying basic units; and an output monitoring unit to monitor a filtered light of an output of a rearmost unit of said plurality of wavelength-multiplexed light amplifying basic units.

29. A wavelength-multiplexed light amplifying apparatus for use in an m×n matrix optical switch in an optical cross-connect unit, said system comprising:

a plurality of wavelength-multiplexed light amplifying basic units each including an optical branching section having two input ports and two output ports for receiving a wavelength-multiplexed optical signal, composed from an optical signal with a plurality of wavelengths, through a signal input port forming one of said two input ports to output said wavelength-multiplexed optical signal through said two output ports and optical amplifying sections respectively connected to said two output ports of said optical branching section, with said wavelength-multiplexed light amplifying basic units being connected in a multistage fashion in a manner that said signal input port of said optical branching section in one wavelength-multiplexed basic unit is connected to an output side of said optical amplifying section of another preceding wavelength-multiplexed light amplifying basic unit;

an excitation light source connected to the other input port of said optical branching section of the forefront unit of said plurality of wavelength-multiplexed light amplifying basic units; and an output monitoring unit to monitor a filtered light of an output of a rearmost unit of said plurality of said wavelength-multiplexed light amplifying basic unit.

30. An optical add-and-drop apparatus using wavelength-multiplexed light amplifying basic units, said system comprising:

a first-stage unit for distributing a wavelength-multiplexed optical signal composed from optical signals of X kinds of wavelengths;

a first broadcast unit connected to an output side of said first-stage unit for distributing said wavelength-multiplexed optical signal outputted from said first-stage unit;

a second broadcast unit connected to said output side of said first-stage unit for distributing said wavelength-multiplexed optical signal outputted from said first-stage unit and for dropping an optical signal;

an optical carrier signal outputting section for outputting an optical carrier signal and for adding an optical signal; and a selecting section connected to an output side of said first broadcast unit and to an output side of said optical carrier signal outputting section for selectively outputting said wavelength-multiplexed optical signal from said first broadcast unit and said optical carrier signal from said optical carrier signal outputting section, wherein said first-stage unit is constructed as a first-stage wavelength-multiplexed light amplifying basic unit composed of:

an optical branching section having two input ports and two output ports for receiving said wavelength-multiplexed optical signal, which has X kinds of wavelengths, through a signal input port forming one of said two input ports to output said wavelength-multiplexed optical signal through said two output ports, with the other signal input port being connected to an excitation light source; and optical amplifying sections respectively connected to the two output ports of said optical branching section, said first broadcast unit includes:

a plurality of multiplexing wavelength-multiplexed light amplifying basic units each identical in configuration to said first-stage wavelength-multiplexed light amplifying basic unit, with said plurality of multiplexing wavelength-multiplexed light amplifying basic units being connected in a multistage fashion in a manner that said signal input port of said optical branching section in one multiplexing wavelength-multiplexed light amplifying basic unit is connected to an output side of said optical amplifying section in the preceding multiplexing wavelength-multiplexed light amplifying basic unit and with one input port of said optical branching section in the forefront unit of said plurality of multiplexing wavelength-multiplexed light amplifying basic units being connected to an output port of one optical amplifying section in said first-stage wavelength-multiplexed light amplifying basic unit, said second broadcast unit includes:

a plurality of distribution wavelength-multiplexed light amplifying basic units each identical in configuration to said first-stage wavelength-multiplexed light amplifying basic unit, with said plurality of distribution wavelength-multiplexed light amplifying basic units being connected in a multistage fashion in a manner that a signal input port of an optical branching section in one distribution wavelength-multiplexed light amplifying basic unit is connected to an output side of an optical amplifying section in the preceding another distribution wavelength-multiplexed light amplifying basic unit and with one input port of an optical branching section in the forefront unit of said plurality of distribution wavelength-multiplexed light amplifying basic units being connected to an output port of the other optical amplifying section in said first-stage wavelength-multiplexed light amplifying basic unit; and a plurality of dropping optical filters each for selectively outputting an optical signal with a predetermined wavelength to an output side of said optical amplifying section in the rearmost unit of said plurality of distribution wavelength-multiplexed light amplifying basic units, said selecting section includes:

switch sections, Y in number, connected to output sides of said optical amplifying sections of the rearmost distribution wavelength-multiplexed light amplifying basic unit of said first broadcast unit for conducting switching between passage and interruption of said wavelength-multiplexed optical signal, coupling sections, Y in number, for conducting coupling between a wavelength-multiplexed optical signal line of said switching sections and an optical carrier signal line from said optical carrier signal outputting section; and a multiplexing section for wavelength-multiplexing Y kinds of optical signals from said coupling sections to output a wavelength-multiplexed optical signal, wherein said switching sections are selectively operable to switch an operation of allowing Y kinds of wavelength-multiplexed optical signals from said first broadcast unit to pass to be outputted through said multiplexing section and an operation of allowing Y kinds of optical carrier signals from said optical carrier signal outputting section to pass to be outputted through said multiplexing section; and an output monitoring unit to monitor a filtered light of an output of a rearmost unit of said plurality of said wavelength-multiplexed light amplifying basic unit.

31. A wavelength-multiplexed light amplifying apparatus comprising:

an optical amplifying medium to amplify input light;

an optical branching/amplifying section to branch the optical signal, outputted from said optical amplifying medium, into a plurality of branched optical signals and further to amplify each of the branched optical signals to compensate for a loss resulting from the branching;

a monitoring unit to monitor both a filtered signal light component of an output of the optical branching/amplifying section and a filtered optical signal; and a gain control unit connected to said optical branching/amplifying section for to control a gain of said optical amplifying medium on the basis of an output of the monitoring unit based on both the filtered signal light component and the filtered optical signal.

32. A wavelength-multiplexed light amplifying apparatus as defined in claim 1, further comprising an excitation light re-inputting section provided between said fourth wavelength-multiplexed light amplifying basic unit and at least said forefront wavelength-multiplexed light amplifying unit for removing a wavelength-multiplexed optical signal component from a leakage optical signal outputted from said fourth wavelength-multiplexed light amplifying basic unit to extract an excitation light and further for branching the extracted excitation light into a plurality of excitation lights to output said plurality of excitation lights.

33. A wavelength-multiplexed light amplifying apparatus as defined in claim 2, further comprising an excitation light re-inputting section provided between the forefront unit of said wavelength-multiplexed light amplifying basic units connected in a multistage fashion and at least said forefront wavelength-multiplexed light amplifying unit for removing a wavelength-multiplexed optical signal component from a leakage optical signal outputted from said forefront wavelength-multiplexed light amplifying basic unit to extract an excitation light and further for branching the extracted excitation light into a plurality of excitation lights to output said plurality of excitation lights.

34. A wavelength-multiplexed light amplifying apparatus as defined in claim 3, further comprising a fourth wavelength-multiplexed light amplifying basic unit identical in configuration to said wavelength-multiplexed light amplifying basic unit, with an output side of one optical amplifying section being connected to said signal input port of said wavelength-multiplexed light amplifying unit; and an excitation light re-inputting section provided between said fourth wavelength-multiplexed light amplifying basic unit and said wavelength-multiplexed light amplifying basic unit to remove a wavelength-multiplexed optical signal component from a leakage optical signal outputted from said fourth wavelength-multiplexed light amplifying basic unit to extract an excitation light and further to branch the extracted excitation light into a plurality of excitation lights to output said plurality of excitation lights.

35. A wavelength-multiplexed light amplifying apparatus as defined in claim 32, wherein said excitation light re-inputting section includes:

a filter for removing a wavelength-multiplexed optical signal component from the leakage optical signal outputted from said fourth wavelength-multiplexed light amplifying basic unit to extract an excitation light; and an optical branching section which is connected to aid filter and an output side of which is connected to at least said signal input port of said second wavelength-multiplexed light amplifying basic unit in said forefront wavelength-multiplexed light amplifying unit and said signal input port of said third wavelength-multiplexed light amplifying basic unit, for putting said excitation light extracted by said filter in said forefront wavelength-multiplexed light amplifying unit.

36. A wavelength-multiplexed light amplifying apparatus as defined in claim 33, wherein said excitation light re-inputting section includes:

a filter for removing a wavelength-multiplexed optical signal component from the leakage optical signal outputted from said forefront wavelength-multiplexed light amplifying basic unit to extract an excitation light; and an optical branching section which is connected to aid filter and an output side of which is connected to at least said signal input port of said second wavelength-multiplexed light amplifying basic unit in said forefront wavelength-multiplexed light amplifying unit and said signal input port of said third wavelength-multiplexed light amplifying basic unit, for putting said excitation light extracted by said filter in said forefront wavelength-multiplexed light amplifying unit.

37. A wavelength-multiplexed light amplifying apparatus as defined in claim 34, wherein said excitation light re-inputting section includes:

a filter to remove the wavelength-multiplexed optical signal component from a leakage optical signal outputted from said fourth wavelength-multiplexed light amplifying basic unit to extract an excitation light; and an optical branching section which is connected to the other input port of said wavelength-multiplexed light amplifying basic unit, to put said excitation light extracted by said filter in said wavelength-multiplexed light amplifying basic unit.

38. An optical add-and-drop apparatus using wavelength-multiplexed light amplifying basic units, said apparatus comprising:

a first-stage unit for broadcasting a first wavelength-multiplexed optical signal composed from optical signals of X kinds of wavelengths:

a first broadcast unit connected to an output side of said first-stage unit for broadcasting said first wavelength-multiplexed optical signal outputted from said first-stage unit;

an additional signal outputting section for multiplexing a plurality of optical carrier signals to output second wavelength-multiplexed optical signal; and a transmission outputting section connected to an output side of said first-stage unit and an output side of said additional signal outputting section for coupling said first wavelength-multiplexed optical signal from said first-stage unit with said second wavelength-multiplexed optical signal from said additional signal outputting section, wherein said first-stage unit is constructed as a first-stage wavelength-multiplexed light amplifying basic unit composed of:

an optical branching section having two input ports and two output ports for receiving said wavelength-multiplexed optical signal, composed from said optical signals of X kinds of wavelengths, through a signal input port forming one of said two input ports to output said first wavelength-multiplexed optical signal through said two output ports, with the other signal input port being connected to an excitation light source; and optical amplifying sections respectively connected to the two output ports of said optical branching section, said first broadcast unit includes a plurality of branching wavelength-multiplexed light amplifying basic units each identical in configuration to said first-stage wavelength-multiplexed light amplifying basic unit, with said plurality of branching wavelength-multiplexed light amplifying basic units being connected in a multistage fashion in a manner that said signal input port of said optical branching section in one multiplexing wavelength-multiplexed light amplifying basic unit is connected to an output side of said optical amplifying section in the preceding branching wavelength-multiplexed light amplifying basic unit, with one input port of said optical branching section in the forefront unit of said plurality of branching wavelength-multiplexed light amplifying basic units being connected to an output port of one optical amplifying section in said first-stage wavelength-multiplexed light amplifying basic unit and with a plurality of dropping optical filters each for selecting the optical signal having a predetermined wavelength being provided at an output side of said optical amplifying section of the rearmost basic unit of said plurality of branching wavelength-multiplexed light amplifying basic units, said additional signal outputting section includes:

a plurality of optical carrier signal generating sections each for outputting an optical carrier signal; and a multiplexing section connected to the side of the plurality of optical carrier signal generating sections for multiplexing said plurality of optical carrier signals from said plurality of optical carrier signal outputting sections to output said second wavelength-multiplexed optical signal, said transmission outputting section includes:

a coupling section connected to said first stage unit and further to said additional signal outputting section or coupling said first wavelength-multiplexed optical signal from said first-stage unit with said second wavelength-multiplexed optical signal from said additional signal outputting section to output a third wavelength-multiplexed optical signal; and an optical amplifier for amplifying said third wavelength-multiplexed optical signal from said coupling section to output the amplified third wavelength multiplexed optical signal including:

an excitation light source;

a multiplexing section for multiplexing an excitation light from said excitation light source and said wavelength-multiplexed optical signal together;

a gain equalizer interposed between said multiplexing section and a signal input port of said fourth wavelength-multiplexed light amplifying basic unit;

an output monitoring unit to monitor a filtered light of an output of a rearmost unit of said plurality of wavelength-multiplexed light amplifying basic units; and a gain control unit to control gains of said plurality of wavelength-multiplexed light amplifying basic units, arranged in said multistage fashion, on the basis of at least an output of the monitoring unit.

39. An optical add-and-drop apparatus as defined in claim 38, further comprising:

an amplifying section provided on an input side of aid first-stage unit for amplifying an optical signal to output an amplified optical signal; and a first dispersion compensating section connected to aid amplifying section and further to said signal input port of said optical branching section in said first-stage unit for compensating for dispersion of the amplified optical signal to put a compensation optical signal subjected to the dispersion compensation in said signal port of said optical branching section.

40. An optical add-and-drop apparatus as defined in claim 39, further comprising a second dispersion compensating section connected to said optical amplifier of aid transmission outputting section for compensating for dispersion of the amplified third wavelength-multiplexed optical signal to put a compensation optical signal subjected to the dispersion compensation.

41. An optical amplifier comprising:

a pumping light source to emit a pumping light;

a beam splitter to split an input light and the pumping light, and amplifying the input light;

a monitor to monitor filtered light of an output of the beam splitter; and a controller controlling a power of the pumping light in accordance with an output of the monitor.

42. A wavelength-multiplexed light amplifying apparatus as defined in claim 3, wherein the output of the monitoring unit is further based on a filtered signal light component of the wavelength-multiplexed optical signal.

43. A wavelength-multiplexed light amplifying apparatus as defined in claim 3, wherein the filtering of the signal light component includes eliminating excitation light.

44. A wavelength-multiplexed light amplifying apparatus comprising:

a wavelength-multiplexed light amplifying basic unit including an optical branching section having two input ports and two output ports to receive a wavelength multiplexed optical signal, which has a plurality of wavelengths, through a signal input port forming one of said two input ports to output said wavelength-multiplexed optical signal through said two output ports and optical amplifying sections respectively connected to said two output ports of the optical branching section;

an excitation light source;

a multiplexing section to multiplex an excitation light from said excitation light source and said wavelength-multiplexed optical signal together;

a gain equalizer interposed between said multiplexing section and said signal input port of said wavelength multiplexed light amplifying basic unit;

a monitoring unit to monitor a filtered signal light component of the wavelength-multiplexed optical signal; and a gain control unit to control a gain of said wavelength-multiplexed light amplifying basic unit on the basis of an output of the monitoring unit.

45. A wavelength-multiplexed light amplifying apparatus as defined in claim 44, wherein said optical branching section of said wavelength-multiplexed light amplifying basic unit is constructed as a 1:1 optical coupler.

46. A wavelength-multiplexed light amplifying apparatus as defined in claim 44, wherein said optical amplifying section of said wavelength-multiplexed light amplifying basic unit is constructed to have one of a gain equivalent to a branch loss in said optical branching section and a gain lower than said branch loss.

47. A wavelength-multiplexed light amplifying apparatus as defined in claim 44, wherein said optical branching section, said optical amplifying section and a connecting section between said optical branching section and said optical amplifying section in said wavelength-multiplexed light amplifying basic unit are constructed with an optical waveguide made from one of a glass and a semiconductor.

48. A wavelength-multiplexed light amplifying apparatus as defined in claim 44, wherein an auxiliary excitation light source is connected to the other input port of said wavelength-multiplexed light amplifying basic unit.

49. A wavelength-multiplexed light amplifying apparatus as defined in claim 44, wherein an isolator is connected to said signal input port in said wavelength-multiplexed light amplifying basic unit.

50. A wavelength-multiplexed light amplifying apparatus as defined in claim 44, further comprising a fourth wavelength-multiplexed light amplifying basic unit identical in configuration to said wavelength-multiplexed light amplifying basic unit, with an output side of one optical amplifying section being connected to one of said signal input ports of said wavelength-multiplexed light amplifying basic unit; and an excitation light re-inputting section provided between said fourth wavelength-multiplexed light amplifying basic unit and said wavelength-multiplexed light amplifying basic unit to remove a wavelength-multiplexed optical signal component from a leakage optical signal outputted from said fourth wavelength-multiplexed light amplifying basic unit to extract an excitation light and further to branch the extracted excitation light into a plurality of excitation lights to output said plurality of excitation lights.

51. A wavelength-multiplexed light amplifying apparatus as defined in claim 44, wherein said excitation light re-inputting section includes:
- a filter to remove the wavelength-multiplexed optical signal component from a leakage optical signal outputted from said fourth wavelength-multiplexed light amplifying basic unit to extract an excitation light; and
- an optical branching section which is connected to the other input port of said wavelength-multiplexed light amplifying basic unit, to put said excitation light extracted by said filter in said wavelength-multiplexed light amplifying basic unit.

52. A wavelength-multiplexed light amplifying apparatus as defined in claim 44, wherein the filtering of the signal light component includes eliminating excitation light.

53. A wavelength-multiplexed light amplifying apparatus as defined in claim 25, wherein said input monitoring unit allows a passing of a signal light component as well as removes an excitation light component.

54. A wavelength-multiplexed light amplifying apparatus as defined in claim 26, wherein said input monitoring unit allows a passing of a signal light component as well as removes an excitation light component.

55. A wavelength-multiplexed light amplifying apparatus as defined in claim 27, wherein said input monitoring unit allows a passing of a signal light component as well as removes an excitation light component.

56. A wavelength-multiplexed light amplifying apparatus as defined in claim 28, wherein said input monitoring unit is provided to detect an input to a forefront unit of said wavelength-multiplexed light amplifying basic units.

57. A wavelength-multiplexed light amplifying apparatus as defined in claim 56, wherein said input monitoring unit allows a passing of a signal light component as well as removes an excitation light component.

58. A wavelength-multiplexed light amplifying apparatus for use in an $m^x n$ matrix optical switch in an optical cross-connect unit as defined in claim 29, wherein an input is provided to detect an input monitoring unit to a forefront unit of said wavelength-multiplexed light amplifying basic units.

59. A wavelength-multiplexed light amplifying apparatus for use in an $m^x n$ matrix optical switch in an optical cross-connect unit as defined in claim 58, wherein said input monitoring unit allows a passing of a signal light component as well as removes an excitation light component.

60. An optical add-and-drop apparatus using wavelength-multiplexed light amplifying basic units as defined in claim 30, wherein an input monitoring unit is provided to detect an input to a forefront unit of said wavelength-multiplexed light amplifying basic units.

61. An optical add-and-drop apparatus using wavelength-multiplexed light amplifying basic units as defined in claim 60, wherein an input monitoring unit allows a passing of a signal light component as well as removes an excitation light component.

62. An optical add-and-drop apparatus using wavelength-multiplexed light amplifying basic units as defined in claim 38, wherein an input monitoring unit is provided to detect an input to a forefront unit of said wavelength-multiplexed light amplifying basic units.

63. An optical add-and-drop apparatus using wavelength-multiplexed light amplifying basic units as defined in claim 62, wherein an input monitoring unit allows a passing of a signal light component as well as removes an excitation light component.

64. A wavelength-multiplexed light amplifying apparatus as defined in claim 3, wherein the output of the output monitoring unit is further based on a filtered signal light component of the wavelength-multiplexed optical signal.

65. A wavelength-multiplexed light amplifying apparatus as defined in claim 3, further comprising an optical filter provided on an input side of a monitoring unit, said monitoring unit monitoring an optical signal, to allow a passing of a signal light component as well as remove an excitation light component of an output of a rearmost unit of said plurality of wavelength-multiplexed light amplifying basic units.

* * * * *